(12) United States Patent
Kim et al.

(10) Patent No.: US 11,764,364 B2
(45) Date of Patent: Sep. 19, 2023

(54) CATHODE, LITHIUM-AIR BATTERY COMPRISING THE SAME, AND METHOD OF PREPARING THE CATHODE

(71) Applicant: Samsung Electronics Co., Ltd., Suwon-si (KR)

(72) Inventors: Taeyoung Kim, Seoul (KR); Hyunpyo Lee, Seoul (KR); Mokwon Kim, Suwon-si (KR); Jungock Park, Yongin-si (KR); Heungchan Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 94 days.

(21) Appl. No.: 17/153,271

(22) Filed: Jan. 20, 2021

(65) Prior Publication Data
US 2021/0257628 A1    Aug. 19, 2021

(30) Foreign Application Priority Data
Feb. 4, 2020    (KR) .................. 10-2020-0013300

(51) Int. Cl.
*H01M 4/86*    (2006.01)
*C01G 23/00*    (2006.01)
(Continued)

(52) U.S. Cl.
CPC ........ *H01M 4/8621* (2013.01); *C01G 23/005* (2013.01); *C01G 37/14* (2013.01);
(Continued)

(58) Field of Classification Search
CPC .. H01M 4/8621; H01M 4/832; H01M 4/8828; H01M 4/8875; H01M 4/8882;
(Continued)

(56) References Cited

U.S. PATENT DOCUMENTS 8,669,015 B2    3/2014    Kang et al.
2010/0310934 A1*    12/2010    Yang .................. H01M 4/525
                                                             252/519.15
(Continued)

FOREIGN PATENT DOCUMENTS

EP    3447832 A1    2/2019
EP    3486983 A1    5/2019
(Continued)

OTHER PUBLICATIONS

English machine translation of Jin et al. (WO 2017147793 A1) (Year: 2017).*
(Continued)

*Primary Examiner* — Brian R Ohara
*Assistant Examiner* — Aaron J Salter
(74) *Attorney, Agent, or Firm* — CANTOR COLBURN LLP

(57) ABSTRACT

A cathode configured to use oxygen as a cathode active material includes: a porous film including a metal oxide, where a porosity of the porous film is about 50 volume percent to about 95 volume percent, based on a total volume of the porous film, and an amount of an organic component in the porous film is 0 to about 2 weight percent, based on a total weight of the porous film.

19 Claims, 8 Drawing Sheets

(51) Int. Cl.
  *C01G 37/14* (2006.01)
  *C01G 45/12* (2006.01)
  *C01G 51/00* (2006.01)
  *C01G 53/00* (2006.01)
  *C01G 55/00* (2006.01)
  *H01M 4/38* (2006.01)
  *H01M 4/88* (2006.01)
  *H01M 4/90* (2006.01)
  *H01M 12/08* (2006.01)
  *H01M 4/02* (2006.01)

(52) U.S. Cl.
  CPC ......... *C01G 45/1257* (2013.01); *C01G 51/70* (2013.01); *C01G 53/42* (2013.01); *C01G 55/004* (2013.01); *H01M 4/382* (2013.01); *H01M 4/8828* (2013.01); *H01M 4/8875* (2013.01); *H01M 4/8882* (2013.01); *H01M 4/9016* (2013.01); *H01M 12/08* (2013.01); *C01P 2006/40* (2013.01); *H01M 2004/027* (2013.01); *H01M 2004/8689* (2013.01)

(58) Field of Classification Search
  CPC ............... H01M 4/9016; H01M 12/18; H01M 2004/027; H01M 2004/8689; C01P 2006/40; C01G 23/005; C01G 37/14; C01G 45/1257; C01G 51/70; C01G 53/42; C01G 55/004
  See application file for complete search history.

(56) References Cited

U.S. PATENT DOCUMENTS

| | | | |
|---|---|---|---|
| 2011/0059355 A1* | 3/2011 | Zhang | H01M 4/8652 429/188 |
| 2013/0082229 A1 | 4/2013 | Chen | |
| 2013/0143133 A1* | 6/2013 | Barde | H01M 4/8615 429/405 |
| 2014/0162131 A1 | 6/2014 | Friend et al. | |
| 2016/0190550 A1* | 6/2016 | Choi | H01M 4/505 252/182.1 |
| 2017/0194651 A1 | 7/2017 | Hellstrom et al. | |
| 2018/0190993 A1 | 7/2018 | Nishiura et al. | |
| 2019/0036186 A1* | 1/2019 | Kim | H01M 4/8807 |
| 2019/0103643 A1 | 4/2019 | Hart et al. | |
| 2019/0148803 A1 | 5/2019 | Lee et al. | |
| 2020/0203747 A1 | 6/2020 | Shimada et al. | |
| 2021/0126240 A1 | 4/2021 | Lee et al. | |
| 2021/0242469 A1* | 8/2021 | Lee | H01M 4/861 |

FOREIGN PATENT DOCUMENTS

| | | | | |
|---|---|---|---|---|
| JP | 2010244827 A | 10/2010 | | |
| KR | 1020070002254 A | 1/2007 | | |
| KR | 1020150045673 A | 4/2015 | | |
| KR | 1020160131217 A | 11/2016 | | |
| KR | 1020170109374 A | 9/2017 | | |
| WO | 9918620 A2 | 4/1999 | | |
| WO | 0036677 A1 | 6/2000 | | |
| WO | WO-2017147793 A1 * | 9/2017 | ............ H01M 12/08 |
| WO | 2018212344 A1 | 11/2018 | | |
| WO | 20190129316 A1 | 7/2019 | | |
| WO | 2019170074 A1 | 9/2019 | | |

OTHER PUBLICATIONS

Extended European Search Report dated Nov. 4, 2021 of EP Patent Application No. 21152254.5.
European Search Report for European Patent Application No. 21152254.5 dated Jun. 30, 2021.
European Search Report for European Patent Application No. 21152257.8 dated Jun. 29, 2021.
Extended European Search Report issued in EP Patent Application No. 21152257.8, dated Nov. 5, 2021, 16 pp.
Notice of Allowance dated Jan. 12, 2023 in U.S. Appl. No. 17/128,305.

\* cited by examiner

CATHODE, LITHIUM-AIR BATTERY COMPRISING THE SAME, AND METHOD OF PREPARING THE CATHODE

CROSS-REFERENCE TO RELATED APPLICATION

This application claims priority to and the benefit of Korean Patent Application No. 10-2020-0013300, filed on Feb. 4, 2020, in the Korean Intellectual Property Office, and all the benefits accruing therefrom under 35 U.S.C. § 119, the content of which is incorporated herein in its entirety by reference.

BACKGROUND

1. Field

The disclosure relates to a cathode, a lithium-air battery including the same, and a method of preparing the cathode.

2. Description of Related Art

Lithium-air batteries utilize lithium itself as an anode, and because there is no need to store air as a cathode active material in the batteries, it is possible to achieve high-capacity batteries.

The theoretical specific energy of a lithium-air battery is very high, at 3500 Wh/kg or more. Such energy density corresponds to approximately ten times that of lithium-ion batteries.

A cathode of lithium-air battery is prepared by mixing a carbon-based conductive material and a binder. Due to the generation of a radical, the carbon-based conductive material and the binder, easily decompose.

Thus there remains a need for a cathode having improved chemical stability.

SUMMARY

Provided is a chemically stable cathode.
Provided is a lithium-air battery including the cathode.
Provided is a method of preparing the cathode.
Additional aspects will be set forth in part in the description which follows and, in part, will be apparent from the description.

According to an aspect, a cathode configured to use oxygen as a cathode active material includes:
a porous film including a metal oxide;
wherein a porosity of the porous film is about 50 volume percent to about 95 volume percent, based on a total volume of the porous film, and an amount of an organic component in the porous film is 0 weight percent to about 2 weight percent, based on a total weight of the porous film.

According to an aspect, there is provided a lithium-air battery including:
the cathode;
an anode including lithium; and
an electrolyte positioned between the cathode and the anode.

According to an aspect, there is provided a method of preparing a cathode, including:
providing a composition including a metal oxide and a binder;
disposing the composition on a base;
drying the composition to form a coating layer;
molding the coating layer to prepare a sheet; and
heat-treating the sheet in an oxidizing atmosphere at about 900° C. to about 1,300° C. to prepare the cathode.

According to an aspect, a cathode configured to use oxygen as a cathode active material includes:
a porous film including a metal oxide,
wherein the metal oxide is a lithium containing metal oxide represented by Formula 1,

$$Li_xA_yG_zO_{3-\delta}$$ Formula 1 wherein, in Formula 1,
A and G are each independently at least one of a Group 2 to a Group 16 element,
$0<x<1$, $0<y<1$, $0<x+y\leq 1$, $0<z\leq 1.5$, and $0\leq\delta\leq 1.5$, and
wherein an amount of an organic component in the cathode is 0 weight percent to about 2 weight percent, based on a total weight of the cathode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
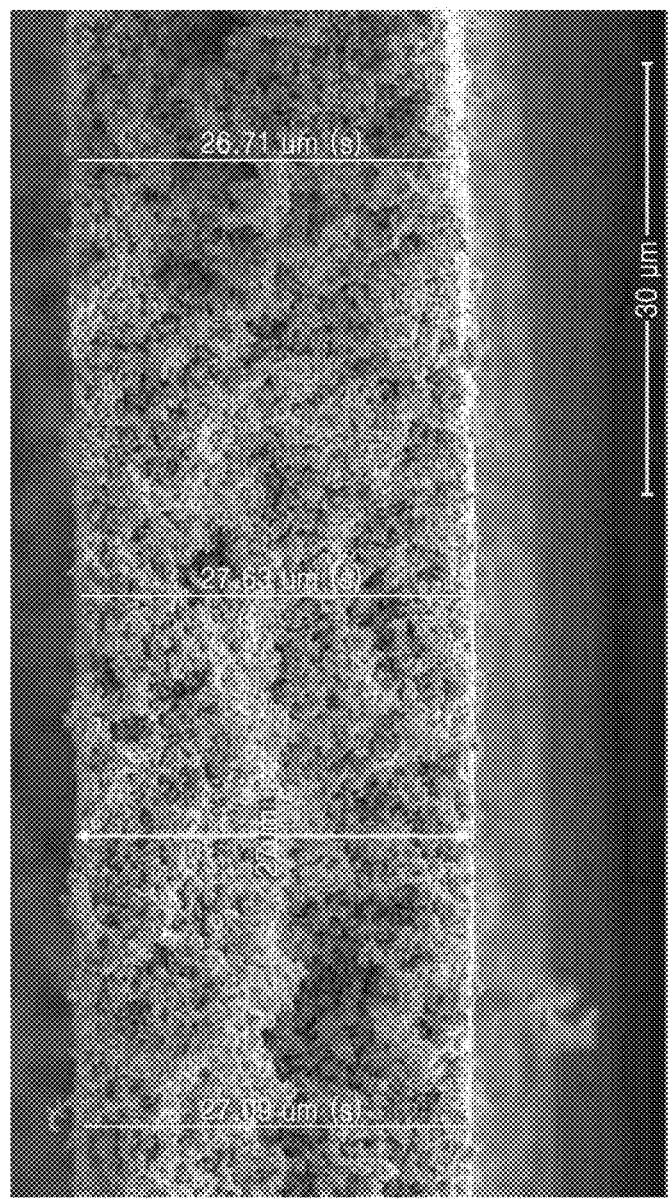
FIG. 1 is a scanning electron microscope image of a cross-section of a porous film formed in Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The present inventive concept described below may be modified in various forms and have many embodiments, and particular embodiments are illustrated in the drawings and described in detail in the detailed description. However, the present inventive concept should not be construed as limited to the particular embodiments, but should be understood to cover all modifications, equivalents or replacements included in the technical scope of the present inventive concept.

The terminology used herein is for the purpose of explaining particular embodiments only and is not intended to limit the present inventive concept. The singular forms include the plural forms as well, unless the context clearly indicates otherwise. It will be further understood that the terms "comprise" or "comprising" when used herein, specify the presence of stated features, numbers, steps, operations, elements, parts, components, materials, or combinations thereof, but do not preclude the presence or addition of one or more other features, numbers, steps, operations, elements, parts, components, materials, or combinations thereof. "/" used hereinafter may be interpreted as "and" or interpreted as "or" according to circumstances.

In the drawings, the thicknesses of layers and regions are enlarged or reduced for clear explanation. The same reference numerals are designated for similar elements throughout. When a layer, film, region, plate, or the like is referred to as being "on" another part, it can be directly on the other part, or intervening parts may be present. The terms "first," "second," and the like may be used for describing various elements throughout, but the elements are not limited by the terms. The terms are used to only distinguish one element from other elements.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

In the disclosure, the "size" of a pore represents the average diameter of pores in case of spherical pores, or represents the average length of the primary axes of pores in non-spherical pores. In the disclosure, the "pore" is an open pore. The average diameter of pores may be measured by, for example, a nitrogen adsorption method. Alternatively, the average diameter of pores may be, for example, an arithmetic average of pore sizes, which are automatically or manually measured by software from a scanning electron microscope image.

In the disclosure, the "size" of a particle represents an average diameter of particles in case of spherical particles, or an average length of primary axes in non-spherical particles. The average diameter of particles is the median diameter (D50) of particles and is defined by a particle diameter corresponding to accumulated diameter distribution at 50%, which represents the particle diameter of 50% in a sample. The median diameter (D50) of particles may be measured using a particle size analyzer (PSA), e.g., using light scattering.

In the disclosure, an "organic component" includes an organic material, residues thereof, or modifications thereof, and is a component which may be removed through vaporization and/or decomposition in a temperature range of about 25° C. to about 900° C. In addition, the organic component includes, for example, an organic material such as a binder, a dispersant and a plasticizer, residues thereof or modifications thereof, and includes a carbon-based material such as a carbon-based conductive material, residues thereof or modifications thereof as long as they are materials that may be removed through vaporization and/or decomposition in a temperature range of about 25° C. to about 900° C. An atmosphere for performing thermal decomposition is not limited and may be an oxidizing atmosphere including oxygen or air, etc., a reducing atmosphere including hydrogen, etc., or an inert atmosphere including nitrogen, argon, etc. For example, the amount of the organic component included in a cathode may be measured from the weight change of the cathode by thermal gravimetric analysis (TGA) in a temperature range of about 25° C. to about 900° C.

Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989. Further, the ionic conductivity may be determined by a DC polarization method as disclosed in Evaluation method 2.

As used herein, the term "inorganic material" refers to a material that does not include a carbon-hydrogen bond (C—H bond) or a carbon-halogen bond (C—X bond, where X is F, Cl, Br, or I) or, in other words, to any material that is not an organic material. For example, carbon fiber is an inorganic material, and a polymer binder or polymer dispersant is an organic material.

A spinel compound is a compound that is isostructural with spinel, i.e., $MgAl_2O_4$.

A perovskite compound is a compound that is isostructural with perovskite, i.e., $CaTiO_3$.

A layered compound is a compound having a layered structure, such as a compound which is isostructural with α-$NaFeO_2$, such as $LiCoO_2$.

A garnet compound is a compound that is isostructural with garnet, i.e., a compound of the formula $X_3Y_2(SiO_4)_3$, wherein X is a divalent cation, such as $Ca^{2+}$, $Mg^{2+}$, $Fe^{2+}$, $Mn^{2+}$, or a combination thereof, and Y is a trivalent cation, such as $Al^{3+}$, $Fe^{3+}$, $Cr^{3+}$, or a combination thereof.

A NASICON compound, as used herein, refers to a compound that is isostructural with NASICON, which has the chemical formula $Na_{1+x}Zr_2Si_xP_{3-x}O_{12}$, wherein $0<x<3$.

A LISICON compound, as used herein, refers to a compound with the formula $Li_{2+2x}Zn_{1-x}GeO_4$, wherein $0<x<1$, or a compound that has a crystal structure isostructural with LISICON.

Tavorite is a compound of the formula $LiFe(PO_4)(OH)$, or a compound that has a crystal structure isostructural with tavorite.

A triplite compound is a compound that is isostructural with triplite, which has the formula $(Mn_xFe_{1-x})_2PO_4(F_yOH_{1-y})$ wherein $0<x<1$ and $0<y<1$.

An anti-perovskite compound is a compound that is isostructural with perovskite, i.e., $CaTiO_3$, except that the anion and cation positions are reversed, such as in $Li_3OBr$.

A silicate means a compound comprising a unit of the formula $[SiO^{(4-2x)-}_{(4-x)}]$, wherein $0 \leq x < 2$.

A borate means a compound comprising $BO_3$ or $BO_4$ units, such as $Ca_3(BO_3)_2$.

X-ray diffraction angles and intensities Cu Kα radiation.

Hereinafter, a cathode according to an exemplary embodiment, a lithium-air battery including the same, and a method of preparing the cathode will be described in further detail.

The cathode according to an embodiment is configured to use oxygen as a cathode active material and includes a porous film having a porosity of 50 volume percent to about 95 volume percent, based on a total volume of the porous film, wherein the porous film includes a metal oxide, and the amount of an organic component in the porous film is 0 weight percent (wt %) to about 2 wt % or less, based on the total weight of the porous film.

The metal oxide included in the cathode is structurally and chemically stable to a radical, which, and while not wanting to be bound by theory, can be generated during charge or discharge. The decomposition of the cathode including the metal oxide by radicals generated in an electrochemical reaction is suppressed when compared with a cathode including a carbon-based conductive material. Accordingly, the charge and discharge characteristics of a lithium-air battery including such cathode are improved. The metal oxide included in the cathode is, for example, a lithium-containing metal oxide. The lithium-containing metal oxide is an oxide including lithium and one or more metals other than the lithium. When the amount of an organic component included in the porous film is 2 wt % or less, based on the total weight of the porous film, side reactions that occur due to the decomposition of the organic component during electrochemical reaction is suppressed, and thus, the deterioration of the porous film is prevented. The porous film, for example, may not substantially include the organic component. The amount of the organic component included in the porous film may be about 2 wt % or less, about 1 wt % or less, about 0.5 wt % or less, about 0.3 wt % or less, about 0.1 wt % or less, about 0.05 wt % or less, about 0.01 wt % or less, or about 0.001 wt % or less, based on the total weight of the porous film. The amount of the organic component included in the porous film may be, for example, greater than 0 wt % to about 2 wt %, about 0.0001 wt % to about 1.5 wt %, about 0.001 wt % to about 1 wt %, about 0.01 wt % to about 0.8 wt %, about 0.05 wt % to about 0.75 wt %, about 0.1 wt % to about 0.7 wt %, or about 0.5 wt % to about 0.65 wt %, based on the total weight of the porous inorganic film. The porous film, for example, may not include the organic component, i.e., the amount of the organic component included in the porous film may be 0 wt %. The porous film may be, for example, an inorganic film. The porous inorganic film may be composed of, for example, a lithium-containing metal oxide. The porous inorganic film may be, for example, a porous film not including a carbon-based material such as a carbon-based conductive material. The porous inorganic film may be, for example, a porous film not including an organic component such as an organic binder.

In the disclosure, the "porous inorganic film" may not include an added organic material and is a porous film formed using substantially an inorganic material. The porous inorganic film may include an organic component including an organic material, residues thereof or modifications thereof, used in a preparation process, and the amount of the organic component including the organic material, the residues thereof, or the modifications thereof may be about 2 wt % or less, about 1 wt % or less, about 0.5 wt % or less, about 0.3 wt % or less, about 0.1 wt % or less, about 0.05 wt % or less, about 0.01 wt % or less, about 0.001 wt % or less, based on the total weight of the porous inorganic film. The amount of the organic component included in the porous inorganic film may be, for example, substantially 0 wt %. The amount of the organic material, residue, or modification thereof contained in the porous inorganic film may be, for example, greater than 0 wt % to about 2 wt %, about 0.0001 wt % to about 1.5 wt %, about 0.001 wt % to about 1 wt %, about 0.01 wt % to about 0.8 wt %, about 0.05 wt % to about 0.75 wt %, about 0.1 wt % to about 0.7 wt %, or about 0.5 wt % to about 0.65 wt %, based on the total weight of the porous inorganic film. Alternatively, the porous inorganic film may show the weight change by vaporization and/or decomposition of the organic component during TGA at about 25° C. to about 900° C. of about 2 wt % or less, about 1 wt % or less, about 0.5 wt % or less, about 0.3 wt % or less, about 0.1 wt % or less, about 0.05 wt % or less, about 0.01 wt % or less, or about 0.001 wt % or less, based on the initial weight of the porous inorganic film. The weight change of the porous inorganic film during TGA at about 25° C. to about 900° C. may be, for example, substantially 0 wt %.

The porous film may be, for example, a self-standing film. Accordingly, the porous film is improved because the porous film can be easily handled and transported, and may be easily applied to various types of batteries. The self-standing film means a film maintaining a film shape without a supporting layer.

The thickness of the porous film may be, for example, about 1 micrometer (μm) to about 1000 μm, about 1 μm to about 500 μm, about 1 μm to about 400 μm, about 1 μm to about 300 μm, about 1 μm to about 200 μm, about 1 μm to about 100 μm, about 1 μm to about 80 μm, about 1 μm to about 70 μm, about 1 μm to about 60 μm, about 1 μm to about 50 μm, about 5 μm to about 45 μm, about 10 μm to about 40 μm, or about 20 μm to about 40 μm. If the thickness of the porous film is too thin, mechanical strength may be weakened, and if the porous film is excessively thick, the energy density of a battery may be degraded.

The porosity of the porous film may be, for example, about 50% or more, about 55% or more, about 60% or more, about 65% or more, about 70% or more, about 75% or more, about 80% or more, about 85% or more, or about 90% or more. The porosity of the porous film may be, for example, about 50% to about 99%, about 51% to about 99%, about 55% to about 99%, about 60% to about 99%, about 65% to about 95%, about 70% to about 95%, about 75% to about 95%, about 80% to about 95%, about 85% to about 95%, or about 90% to about 95%. The porosity is the percentage of volume occupied by pores among the total volume of the porous film. When the porous film has a porosity in these ranges, the energy density of a battery including the cathode may increase.

The local porosity of the porous film may be changed according to, for example, the position in the porous film. For example, the porous film may include one side and the other side opposite to the one side, and the porosity in a region around the one side may be greater than or less than the porosity in a region around the other side. For example, the porosity in a region around the one side of the porous film may be 50% or more, and the porosity in a region around the other side opposite to the one side may be 50% or less. For example, the porosity in a region around the one side of the porous film may be about 50% to about 99%, and the porosity in a region around the other side opposite to the one side may be about 1% to about 50%. For example, the porous film may have a porosity gradient from the one side to the other side opposite to the one side. For example, the porous film may have the highest porosity at the one side and the lowest porosity at the other side opposite to the one side.

The loading level of the porous film may be, for example, 4 milligrams per square centimeter ($mg/cm^2$) or more, 4.2 $mg/cm^2$ or more, 4.4 $mg/cm^2$ or more, 4.6 $mg/cm^2$ or more, 4.8 $mg/cm^2$ or more, 5 $mg/cm^2$ or more, 5.2 $mg/cm^2$ or more, 5.4 $mg/cm^2$ or more, 5.6 $mg/cm^2$ or more, or 5.8 $mg/cm^2$ or more. The loading level of the porous film may be, for example, about 4 $mg/cm^2$ to about 10 $mg/cm^2$, about 4.2 $mg/cm^2$ to about 9.5 $mg/cm^2$, about 4.4 $mg/cm^2$ to about 9 $mg/cm^2$, about 4.6 $mg/cm^2$ to about 8.5 $mg/cm^2$, about 4.8 $mg/cm^2$ to about 8 $mg/cm^2$, about 5 $mg/cm^2$ to about 8 $mg/cm^2$, about 5.2 $mg/cm^2$ to about 7.5 $mg/cm^2$, about 5.4 $mg/cm^2$ to about 7 $mg/cm^2$, about 5.6 $mg/cm^2$ to about 7 $mg/cm^2$, or about 5.8 $mg/cm^2$ to about 7 $mg/cm^2$. when the porous film has a loading level in these ranges, and porosity of 50% or more, a battery having a high energy density of 800 Wh/kg or more may be achieved. The loading level is a weight of the lithium-containing metal oxide positioned per unit area of the porous film.

The size of the pores included in the porous film may be, for example, about 1 micrometer (μm) or less, about 900 nanometers (nm) or less, about 800 nm or less, about 700 nm or less, about 600 nm or less, about 500 nm or less, about 400 nm or less, about 300 nm or less, or about 200 nm or less. The size of the pores included in the porous film may be, for example, about 1 nm to about 1000 nm, about 10 nm to about 900 nm, about 50 nm to about 800 nm, about 100 nm to about 700 nm, about 100 nm to about 600 nm, about 100 nm to about 500 nm, about 100 nm to about 400 nm, about 100 nm to about 300 nm, or about 100 nm to about 200 nm. When the porous film includes small pores having a size of less than 1 μm, high specific surface area may result. Accordingly, the area of a reaction site where an electrode reaction may occur increases in an electrode including the porous film, and as a result, the high efficiency characteristics of a battery including the porous film may be improved.

The pores included in the porous film may be arranged irregularly and non-periodically in the porous film. Accordingly, the porous film including irregular and non-periodic pores is distinguished from a porous film formed using an inorganic material of the prior art, which is prepared by anodic oxidation, and includes periodically and regularly arranged pores.

The size of the lithium-containing metal oxide included in the porous film may be about 10 nm to about 500 nm, about 50 nm to about 450 nm, about 100 nm to about 400 nm, about 150 nm to about 350 nm, about 200 nm to about 350 nm, or about 250 nm to about 350 nm.

The lithium-containing metal oxide included in the porous film is, for example, a crystalline lithium ion conductor. When the lithium-containing metal oxide includes lithium and has crystallinity, the migration path of lithium ions is provided. Accordingly, the lithium-containing metal oxide is a lithium ion conductor. When the lithium-containing metal oxide is the lithium ion conductor, the cathode may not additionally include a separate electrolyte.

The lithium-containing metal oxide included in the porous film may be, for example, a crystalline electronic conductor. When the lithium-containing metal oxide has crystallinity and electronic conductivity, the migration path of electrons is provided.

Accordingly, the lithium-containing metal oxide is an electron conductor. When the lithium-containing metal oxide is an electron conductor, the cathode may not additionally include a separate conductive material The lithium-containing metal oxide included in the porous film may be, for example, a mixed conductor which has lithium ionic conductivity and electronic conductivity, simultaneously. The mixed conductor, for example, has electronic conductivity of about $1\times10^{-6}$ S/cm or more and ionic conductivity of about $1\times10^{-7}$ S/cm or more at 25° C. The mixed conductor, for example, has electronic conductivity of about $5\times10^{-6}$ S/cm or more and ionic conductivity of about $5\times10^{-7}$ S/cm or more at 25° C. The mixed conductor, for example, has electronic conductivity of about $1\times10^{-5}$ S/cm or more and ionic conductivity of about $1\times10^{-6}$ S/cm or more at 25° C. The mixed conductor, for example, has electronic conductivity of about $5\times10^{-5}$ S/cm or more and ionic conductivity of about $5\times10^{-6}$ S/cm or more at 25° C. The mixed conductor, for example, has electronic conductivity of about $1\times10^{-4}$ S/cm or more and ionic conductivity of about $1\times10^{-5}$ S/cm or more at 25° C. The mixed conductor, for example, has electronic conductivity of about $5\times10^{-4}$ S/cm or more and ionic conductivity of about $5\times10^{-5}$ S/cm or more at 25° C. The mixed conductor, for example, has electronic conductivity of about $1\times10^{-3}$ S/cm or more and ionic conductivity of about $1\times10^{-4}$ S/cm or more at 25° C. The mixed conductor, for example, has electronic conductivity of about $5\times10^{-3}$ S/cm or more and ionic conductivity of about $5\times10^{-4}$ S/cm or more at 25° C. The mixed conductor, for example, has electronic conductivity of about $1\times10^{-2}$ S/cm or more and ionic conductivity of about $1\times10^{-3}$ S/cm or more at 25° C. The mixed conductor, for example, has electronic conductivity of about $1\times10^{-1}$ S/cm or more and ionic conductivity of about $1\times10^{-2}$ S/cm or more at 25° C. At a temperature of 25° C., the mixed conductor may have, for example, an electronic conductivity of about $1\times10^{-6}$ S/cm to about $1\times10^{1}$ S/cm, about $2\times10^{-6}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm. At a temperature of 25° C., the mixed conductor may have, for example, an ionic conductivity of about $1\times10^{-7}$ S/cm to about $1\times10^{1}$ S/cm, about $2\times10^{-7}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm. When the lithium-containing metal oxide provides ionic conductivity and electronic conductivity at the same time as a mixed conductor, a cathode may be prepared by using a porous film including the lithium-containing metal oxide without a separate conductive material and electrolyte.

The lithium-containing metal oxide may be, for example, one or more compounds selected from spinel compounds and perovskite compounds. When the lithium-containing metal oxide includes a compound having such a crystalline structure, the decomposition of a cathode due to radicals generated in an electrochemical reaction may be suppressed.

The lithium-containing metal oxide includes, for example, a perovskite compound represented by Formula 1:

$$Li_xA_yG_zO_{3-\delta}$$ Formula 1

In Formula 1, each A and G are independently at least one of a Group 2 to a Group 16 element, and $0<x<1$, $0<y<1$, $0<x+y\leq1$, $0<z\leq1.5$, and $0\leq\delta\leq1.5$. In an aspect, $\delta$ represents an oxygen vacancy content.

The perovskite compound is a compound having a perovskite crystalline structure, i.e., is isostructural with perovskite, or has a perovskite-like crystal structure.

For example, in Formula 1, A may be at least one of H, Na, K, Rb, Cs, Ca, Sr, Ba, Y, La, Ce, Pr, Nd, Pm, Sm, Gd, Tb, Dy, Ho, and Er, G may be one or more selected from Ti, Pd, Pb, Fe, Ir, Co, Rh, Mn, Ni, Cr, Ru, Re, Sn, V, Ge, W, Zr, Ti, Mo, Hf, U, Nb, Th, Ta, Bi, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and $0.2<x\leq0.7$, $0<y\leq0.7$, $0<x+y<1$, $0<z\leq1.2$, and $0\leq\delta\leq1.2$.

For example, in Formula 1, A may be at least one of La, Ce, Pr, Gd, Ca, Sr, or Ba, M may be one or more of Ti, Mn, Ni, Ru, Cr, Co, Ir, Fe, Pd, Pb, Rh, Sn, V, Re, Ge, W, Zr, Mo, Nb, Ta, Hf, or Bi, and $0.2<x\leq0.5$, $0.4<y\leq0.7$, $0<x+y<1$, $0.8<z\leq1.2$, and $0\leq\delta\leq1.0$. In an aspect, $\delta$ is an oxygen vacancy content.

The perovskite compound may have, for example, an $ABO_3$ phase. In some A-sites, vacancy and lithium (Li) are arranged, and the perovskite compound has a crystalline phase having orthorhombic, cubic, monoclinic, or triclinic symmetry, or a combination thereof, in which oxygen vacancy is present. In addition, when the lithium concentration in an A-site is optimized, lithium ionic conductivity is excellent, and when a metal (G) having low oxygen vacancy producing energy is introduced into a B-site, electronic conductivity is increased.

The perovskite compound includes, for example, a $MO_6$ octahedron. Six oxygens form apexes in the $MO_6$ octahedron, a structure where M in Formula 1 is positioned at the center of the octahedron, and the octahedra are corner sharing. A structure, in which lanthanum (La), lithium (Li), and vacancy are randomly distributed according to a composition ratio in a space formed through the connection of the apexes of the octahedron. In the perovskite compound, for example, lithium ions are conducted through a vacancy containing lanthanum (La) layer, and electrons are conducted to a metal (M) ion layer.

According to the results of X-ray diffraction analysis, the perovskite compound shows, for example, a primary peak at a diffraction angle of $2\theta=32.5°\pm2.5°$, and minor peaks at a diffraction angle ($2\theta$) of $46.5°\pm2.5°$ and/or at the angle of diffraction ($2\theta$) of $57.5°\pm2.5°$, when analyzed using Cu K$\alpha$ radiation. The primary peak means a peak having the strongest intensity, and a minor peak has weaker intensity than the primary peak.

For example, the ratio ($I_b/I_a$) of the peak intensity at a diffraction angle of $2\theta=32.5°\pm2.5°$ ($I(32.5°\pm2.5°)$: $I_a$) and the peak intensity at a diffraction angle of $2\theta=46.5°\pm2.5°$ ($I(46.5°\pm2.5°)$: $I_b$) in the X-ray diffraction of the perovskite compound, is about 0.1 or more, for example, about 0.1 to about 0.9, for example, about 0.2 to about 0.6. The ratio ($I_c/I_a$) of the peak intensity at a diffraction angle of $2\theta=32.5°\pm2.5°$ ($I(32.5°\pm2.5°)$: $I_a$) and the peak intensity at a diffraction angle of $2\theta=57.5°\pm2.5°$ ($I(57.5°\pm2.5°)$: $I_c$) in the X-ray diffraction of the perovskite compound, is about 0.1 or more, for example, about 0.1 to about 0.9, for example, about 0.2 to about 0.8, for example, about 0.2 to about 0.4.

The perovskite compound includes, for example, at least one of
$Li_{0.34}La_{0.55}TiO_{3-\delta}$ ($0\leq\delta\leq1.0$), $Li_{0.34}La_{0.55}MnO_{3-\delta}$ ($0\leq\delta\leq1.0$), $Li_{0.34}La_{0.55}NiO_{3-\delta}$ ($0\leq\delta\leq1.0$),
$Li_{0.34}La_{0.55}CrO_{3-\delta}$ ($0\leq\delta\leq1.0$), $Li_{0.34}La_{0.55}CoO_{3-\delta}$ ($0\leq\delta\leq1.0$),
$Li_{0.34}La_{0.55}IrO_{3-\delta}$ ($0\leq\delta\leq1.0$), $Li_{0.34}La_{0.55}RuO_{3-\delta}$ ($0\leq\delta\leq1.0$), $Li_{0.34}La_{0.55}FeO_{3-\delta}$ ($0\leq\delta\leq1.0$),
$Li_{0.34}La_{0.55}PdO_{3-\delta}$ ($0\leq\delta\leq1.0$),
$Li_{0.34}La_{0.55}PbO_{3-\delta}$ ($0\leq\delta\leq1.0$), $Li_{0.34}La_{0.55}RhO_{3-\delta}$ ($0\leq\delta\leq1.0$),
$Li_{0.34}La_{0.55}SnO_{3-\delta}$ ($0\leq\delta\leq1.0$),
$Li_{0.34}La_{0.55}VO_{3-\delta}$ ($0\leq\delta\leq1.0$), $Li_{0.34}La_{0.55}ReO_{3-\delta}$ ($0\leq\delta\leq1.0$), $Li_{0.34}La_{0.55}GeO_{3-\delta}$ ($0\leq\delta\leq1.0$),
$Li_{0.34}La_{0.55}WO_{3-\delta}$ ($0\leq\delta\leq1.0$), $Li_{0.34}La_{0.55}ZrO_{3-\delta}$ ($0\leq\delta\leq1.0$), $Li_{0.34}La_{0.55}MoO_{3-\delta}$ ($0\leq\delta\leq1.0$),
$Li_{0.34}La_{0.55}NbO_{3-\delta}$ ($0\leq\delta\leq1.0$), $Li_{0.34}La_{0.55}TaO_{3-\delta}$ ($0\leq\delta\leq1.0$), $Li_{0.34}La_{0.55}HfO_{3-\delta}$ ($0\leq\delta\leq1.0$),
$Li_{0.34}La_{0.55}BiO_{3-\delta}$ ($0\leq\delta\leq1.0$),
$Li_{0.10}La_{0.63}TiO_{3-\delta}$ ($0\leq\delta\leq1.0$), $Li_{0.10}La_{0.63}MnO_{3-\delta}$ ($0\leq\delta\leq1.0$), $Li_{0.10}La_{0.63}NiO_{3-\delta}$ ($0\leq\delta\leq10$),
$Li_{0.10}La_{0.63}CrO_{3-\delta}$ ($0\leq\delta\leq1.0$), $Li_{0.10}La_{0.63}CoO_{3-\delta}$ ($0\leq\delta\leq1.0$),
$Li_{0.10}La_{0.63}IrO_{3-\delta}$ ($0\leq\delta\leq1.0$), $Li_{0.10}La_{0.63}RuO_{3-\delta}$ ($0\leq\delta\leq1.0$), $Li_{0.10}La_{0.63}FeO_{3-\delta}$ ($0\leq\delta\leq1.0$),
$Li_{0.10}La_{0.63}PdO_{3-\delta}$ ($0\leq\delta\leq1.0$),
$Li_{0.10}La_{0.63}PbO_{3-\delta}$ ($0\leq\delta\leq1.0$), $Li_{0.10}La_{0.63}RhO_{3-\delta}$ ($0\leq\delta\leq1.0$),
$Li_{0.10}La_{0.63}SnO_{3-\delta}$ ($0\leq\delta\leq1.0$),
$Li_{0.10}La_{0.63}VO_{3-\delta}$ ($0\leq\delta\leq1.0$), $Li_{0.10}La_{0.63}ReO_{3-\delta}$ ($0\leq\delta\leq1.0$), $Li_{0.10}La_{0.63}GeO_{3-\delta}$ ($0\leq\delta\leq1.0$),
$Li_{0.10}La_{0.63}WO_{3-\delta}$ ($0\leq\delta\leq1.0$), $Li_{0.10}La_{0.63}ZrO_{3-\delta}$ ($0\leq\delta\leq1.0$), $Li_{0.10}La_{0.63}MoO_{3-\delta}$ ($0\leq\delta\leq1.0$),
$Li_{0.10}La_{0.63}NbO_{3-\delta}$ ($0\leq\delta\leq1.0$), $Li_{0.10}La_{0.63}TaO_{3-\delta}$ ($0\leq\delta\leq1.0$), $Li_{0.10}La_{0.63}HfO_{3-\delta}$ ($0\leq\delta\leq1.0$),
$Li_{0.10}La_{0.63}BiO_{3-\delta}$ ($0\leq\delta\leq1.0$),
$Li_{0.20}La_{0.60}TiO_{3-\delta}$ ($0\leq\delta\leq1.0$), $Li_{0.20}La_{0.60}MnO_{3-\delta}$ ($0\leq\delta\leq1.0$), $Li_{0.20}La_{0.60}NiO_{3-\delta}$ ($0\leq\delta\leq1.0$),
$Li_{0.20}La_{0.60}CrO_{3-\delta}$ ($0\leq\delta\leq1.0$), $Li_{0.20}La_{0.60}CoO_{3-\delta}$ ($0\leq\delta\leq1.0$),
$Li_{0.20}La_{0.60}IrO_{3-\delta}$ ($0\leq\delta\leq1.0$), $Li_{0.20}La_{0.60}RuO_{3-\delta}$ ($0\leq\delta\leq1.0$), $Li_{0.20}La_{0.60}FeO_{3-\delta}$ ($0\leq\delta\leq1.0$),
$Li_{0.20}La_{0.60}PdO_{3-\delta}$ ($0\leq\delta\leq1.0$),
$Li_{0.20}La_{0.60}PbO_{3-\delta}$ ($0\leq\delta\leq1.0$), $Li_{0.20}La_{0.60}RhO_{3-\delta}$ ($0\leq\delta\leq1.0$),
$Li_{0.20}La_{0.60}SnO_{3-\delta}$ ($0\leq\delta\leq1.0$),
$Li_{0.20}La_{0.60}VO_{3-\delta}$ ($0\leq\delta\leq1.0$), $Li_{0.20}La_{0.60}ReO_{3-\delta}$ ($0\leq\delta\leq1.0$), $Li_{0.20}La_{0.60}GeO_{3-\delta}$ ($0\leq\delta\leq1.0$),
$Li_{0.20}La_{0.60}WO_{3-\delta}$ ($0\leq\delta\leq1.0$), $Li_{0.20}La_{0.60}ZrO_{3-\delta}$ ($0\leq\delta\leq1.0$), $Li_{0.20}La_{0.60}MoO_{3-\delta}$ ($0\leq\delta\leq1.0$),
$Li_{0.20}La_{0.60}NbO_{3-\delta}$ ($0\leq\delta\leq1.0$), $Li_{0.20}La_{0.60}TaO_{3-\delta}$ ($0\leq\delta\leq1.0$), $Li_{0.20}La_{0.60}HfO_{3-\delta}$ ($0\leq\delta\leq1.0$),
$Li_{0.20}La_{0.60}BiO_{3-\delta}$ ($0\leq\delta\leq1.0$),
$Li_{0.30}La_{0.57}TiO_{3-\delta}$ ($0\leq\delta\leq1.0$), $Li_{0.30}La_{0.57}MnO_{3-\delta}$ ($0\leq\delta\leq1.0$), $Li_{0.30}La_{0.57}NiO_{3-\delta}$ ($0\leq\delta\leq1.0$),
$Li_{0.30}La_{0.57}CrO_{3-\delta}$ ($0\leq\delta\leq1.0$), $Li_{0.30}La_{0.57}CoO_{3-\delta}$ ($0\leq\delta\leq1.0$),
$Li_{0.30}La_{0.57}IrO_{3-\delta}$ ($0\leq\delta\leq1.0$), $Li_{0.30}La_{0.57}RuO_{3-\delta}$ ($0\leq\delta\leq1.0$), $Li_{0.30}La_{0.57}FeO_{3-\delta}$ ($0\leq\delta\leq1.0$),
$Li_{0.30}La_{0.57}PdO_{3-\delta}$ ($0\leq\delta\leq1.0$),
$Li_{0.30}La_{0.57}PbO_{3-\delta}$ ($0\leq\delta\leq1.0$), $Li_{0.30}La_{0.57}RhO_{3-\delta}$ ($0\leq\delta\leq1.0$),
$Li_{0.30}La_{0.57}SnO_{3-\delta}$ ($0\leq\delta\leq1.0$),
$Li_{0.30}La_{0.57}VO_{3-\delta}$ ($0\leq\delta\leq1.0$), $Li_{0.30}La_{0.57}ReO_{3-\delta}$ ($0\leq\delta\leq1.0$), $Li_{0.30}La_{0.57}GeO_{3-\delta}$ ($0\leq\delta\leq1.0$),
$Li_{0.30}La_{0.57}WO_{3-\delta}$ ($0\leq\delta\leq1.0$), $Li_{0.30}La_{0.57}ZrO_{3-\delta}$ ($0\leq\delta\leq1.0$), $Li_{0.30}La_{0.57}MoO_{3-\delta}$ ($0\leq\delta\leq1.0$),
$Li_{0.30}La_{0.57}NbO_{3-\delta}$ ($0\leq\delta\leq1.0$), $Li_{0.30}La_{0.57}TaO_{3-\delta}$ ($0\leq\delta\leq1.0$), $Li_{0.30}La_{0.57}HfO_{3-\delta}$ ($0\leq\delta\leq1.0$),
$Li_{0.30}La_{0.57}BiO_{3-\delta}$ ($0\leq\delta\leq1.0$),
$Li_{0.40}La_{0.53}TiO_{3-\delta}$ ($0\leq\delta\leq1.0$), $Li_{0.40}La_{0.53}MnO_{3-\delta}$ ($0\leq\delta\leq1.0$), $Li_{0.40}La_{0.53}NiO_{3-\delta}$ ($0\leq\delta\leq1.0$),
$Li_{0.40}La_{0.53}CrO_{3-\delta}$ ($0\leq\delta\leq1.0$), $Li_{0.40}La_{0.53}CoO_{3-\delta}$ $Li_{0.40}La_{0.53}RuO_{3-\delta}$ (0≤δ≤10), $Li_{0.40}La_{0.53}PbO_{3-\delta}$ (0≤δ≤1.0), $Li_{0.40}La_{0.53}SnO_{3-\delta}$ (0≤δ≤1.0), $Li_{0.40}La_{0.53}VO_{3-\delta}$ (0≤δ≤1.0), $Li_{0.40}La_{0.53}GeO_{3-\delta}$ (0≤δ≤1.0), $Li_{0.40}La_{0.53}WO_{3-\delta}$ (0≤δ≤1.0), $Li_{0.40}La_{0.53}MoO_{3-\delta}$ (0≤δ≤1.0), $Li_{0.40}La_{0.53}NbO_{3-\delta}$ (0≤δ≤1.0), $Li_{0.40}La_{0.53}HfO_{3-\delta}$ (0≤δ≤1.0), $Li_{0.40}La_{0.53}BiO_{3-\delta}$ (0≤δ≤1.0), $Li_{0.40}La_{0.53}IrO_{3-\delta}$ (0≤δ≤1.0), $Li_{0.40}La_{0.53}FeO_{3-\delta}$ (0≤δ≤1.0), $Li_{0.40}La_{0.53}PdO_{3-\delta}$ (0≤δ≤1.0), $Li_{0.40}La_{0.53}RhO_{3-\delta}$ (0≤δ≤1.0), $Li_{0.40}La_{0.53}ReO_{3-\delta}$ (0≤δ≤1.0), $Li_{0.40}La_{0.53}ZrO_{3-\delta}$ (0≤δ≤1.0), $Li_{0.40}La_{0.53}TaO_{3-\delta}$ (0≤δ≤1.0), $Li_{0.45}La_{0.52}TiO_{3-\delta}$ (0≤δ≤1.0), $Li_{0.45}La_{0.52}MnO_{3-\delta}$ (0≤δ≤1.0), $Li_{0.45}La_{0.52}NiO_{3-\delta}$ (0≤δ≤1.0), $Li_{0.45}La_{0.52}CrO_{3-\delta}$ (0≤δ≤1.0), $Li_{0.45}La_{0.52}CoO_{3-\delta}$ (0≤δ≤1.0), $Li_{0.45}La_{0.52}IrO_{3-\delta}$ (0≤δ≤1.0), $Li_{0.45}La_{0.52}RuO_{3-\delta}$ (0≤δ≤1.0), $Li_{0.45}La_{0.52}TiO_{3-\delta}$ (0≤δ≤1.0), $Li_{0.45}La_{0.52}FeO_{3-\delta}$ (0≤δ≤1.0), $Li_{0.45}La_{0.52}PdO_{3-\delta}$ (0≤δ≤1.0), $Li_{0.45}La_{0.52}PbO_{3-\delta}$ (0≤δ≤1.0), $Li_{0.45}La_{0.52}RhO_{3-\delta}$ (0≤δ≤1.0), $Li_{0.45}La_{0.52}SnO_{3-\delta}$ (0≤δ≤1.0), $Li_{0.45}La_{0.52}VO_{3-\delta}$ (0≤δ≤1.0), $Li_{0.45}La_{0.52}GeO_{3-\delta}$ (0≤δ≤1.0), $Li_{0.45}La_{0.52}WO_{3-\delta}$ (0≤δ≤1.0), $Li_{0.45}La_{0.52}ZrO_{3-\delta}$ (0≤δ≤1.0), $Li_{0.45}La_{0.52}MoO_{3-\delta}$ (0≤δ≤1.0), $Li_{0.45}La_{0.52}NbO_{3-\delta}$ (0≤δ≤1.0), $Li_{0.45}La_{0.52}TaO_{3-\delta}$ (0≤δ≤1.0), $Li_{0.45}La_{0.52}HfO_{3-\delta}$ (0≤δ≤1.0), $Li_{0.45}La_{0.52}BiO_{3-\delta}$ (0≤δ≤1.0), $Li_{0.34}Ce_{0.55}TiO_{3-\delta}$ (0≤δ≤1.0), $Li_{0.34}Ce_{0.55}MnO_{3-\delta}$ (0≤δ≤1.0), $Li_{0.34}Ce_{0.55}NiO_{3-\delta}$ (0≤δ≤1.0), $Li_{0.34}Ce_{0.55}CrO_{3-\delta}$ (0≤δ≤1.0), $Li_{0.34}Ce_{0.55}CoO_{3-\delta}$ (0≤δ≤1.0), $Li_{0.34}Ce_{0.55}IrO_{3-\delta}$ (0≤δ≤1.0), $Li_{0.34}Ce_{0.55}RuO_{3-\delta}$ (0≤δ≤1.0), $Li_{0.34}Ce_{0.55}FeO_{3-\delta}$ (0≤δ≤1.0), $Li_{0.34}Ce_{0.55}PdO_{3-\delta}$ (0≤δ≤1.0), $Li_{0.34}Ce_{0.55}PbO_{3-\delta}$ (0≤δ≤1.0), $Li_{0.34}Ce_{0.55}RhO_{3-\delta}$ (0≤δ≤1.0), $Li_{0.34}Ce_{0.55}SnO_{3-\delta}$ (0≤δ≤1.0), $Li_{0.34}Ce_{0.55}VO_{3-\delta}$ (0≤δ≤1.0), $Li_{0.34}Ce_{0.55}ReO_{3-\delta}$ (0≤δ≤1.0), $Li_{0.34}Ce_{0.55}GeO_{3-\delta}$ (0≤δ≤1.0), $Li_{0.34}Ce_{0.55}WO_{3-\delta}$ (0≤δ≤1.0), $Li_{0.34}Ce_{0.55}ZrO_{3-\delta}$ (0≤δ≤1.0), $Li_{0.34}Ce_{0.55}MoO_{3-\delta}$ (0≤δ≤1.0), $Li_{0.34}Ce_{0.55}NbO_{3-\delta}$ (0≤δ≤1.0), $Li_{0.34}Ce_{0.55}TaO_{3-\delta}$ (0≤δ≤1.0), $Li_{0.34}Ce_{0.55}HfO_{3-\delta}$ (0≤δ≤1.0), $Li_{0.34}Ce_{0.55}BiO_{3-\delta}$ (0≤δ≤1.0), $Li_{0.10}Ce_{0.63}TiO_{3-\delta}$ (0≤δ≤1.0), $Li_{0.10}Ce_{0.63}MnO_{3-\delta}$ (0≤δ≤1.0), $Li_{0.10}Ce_{0.63}NiO_{3-\delta}$ (0≤δ≤1.0), $Li_{0.10}Ce_{0.63}CrO_{3-\delta}$ (0≤δ≤1.0), $Li_{0.10}Ce_{0.63}CoO_{3-\delta}$ (0≤δ≤1.0), $Li_{0.10}Ce_{0.63}IrO_{-\delta}$ (0≤δ≤1.0)$_3$, $Li_{0.10}Ce_{0.63}RuO_{3-\delta}$ (0≤δ≤1.0), $Li_{0.10}Ce_{0.63}FeO_{3-\delta}$ (0≤δ≤1.0), $Li_{0.10}Ce_{0.63}PdO_{3-\delta}$ (0≤δ≤1.0), $Li_{0.10}Ce_{0.63}PbO_{3-\delta}$ (0≤δ≤1.0), $Li_{0.10}Ce_{0.63}RhO_{3-\delta}$ (0≤δ≤1.0), $Li_{0.10}Ce_{0.63}SnO_{3-\delta}$ (0≤δ≤1.0), $Li_{0.10}Ce_{0.63}VO_{3-\delta}$ (0≤δ≤10), $Li_{0.10}Ce_{0.63}ReO_{3-\delta}$ (0≤δ≤1.0), $Li_{0.10}Ce_{0.63}GeO_{3-\delta}$ (0≤δ≤1.0), $Li_{0.10}Ce_{0.63}WO_{3-\delta}$ (0≤δ≤1.0), $Li_{0.10}Ce_{0.63}ZrO_{3-\delta}$ (0≤δ≤1.0), $Li_{0.10}Ce_{0.63}MoO_{3-\delta}$ (0≤δ≤1.0), $Li_{0.10}Ce_{0.63}NbO_{3-\delta}$ (0≤δ≤1.0), $Li_{0.10}Ce_{0.63}TaO_{3-\delta}$ (0≤δ≤1.0), $Li_{0.10}Ce_{0.63}HfO_{3-\delta}$ (0≤δ≤1.0), $Li_{0.10}Ce_{0.63}BiO_{3-\delta}$ (0≤δ≤1.0), $Li_{0.20}Ce_{0.60}TiO_{3-\delta}$ (0≤δ≤1.0), $Li_{0.20}Ce_{0.60}MnO_{3-\delta}$ (0≤δ≤1.0), $Li_{0.20}Ce_{0.60}NiO_{3-\delta}$ (0≤δ≤1.0), $Li_{0.20}Ce_{0.60}CrO_{3-\delta}$ (0≤δ≤1.0), $Li_{0.20}Ce_{0.60}CoO_{3-\delta}$ (0≤δ≤1.0), $Li_{0.20}Ce_{0.60}IrO_{3-\delta}$ (0≤δ≤1.0), $Li_{0.20}Ce_{0.60}RuO_{3-\delta}$ (0≤δ≤1.0), $Li_{0.20}Ce_{0.60}FeO_{3-\delta}$ (0≤δ≤1.0), $Li_{0.20}Ce_{0.60}PdO_{3-\delta}$ (0≤δ≤1.0), $Li_{0.20}Ce_{0.60}PbO_{3-\delta}$ (0≤δ≤1.0), $Li_{0.20}Ce_{0.60}RhO_{3-\delta}$ (0≤δ≤1.0), $Li_{0.20}Ce_{0.60}SnO_{3-\delta}$ (0≤δ≤1.0), $Li_{0.20}Ce_{0.60}VO_{3-\delta}$ (0≤δ≤1.0), $Li_{0.20}Ce_{0.60}ReO_{3-\delta}$ (0≤δ≤1.0), $Li_{0.20}Ce_{0.60}GeO_{3-\delta}$ (0≤δ≤1.0), $Li_{0.20}Ce_{0.60}WO_{3-\delta}$ (0≤δ≤1.0), $Li_{0.20}Ce_{0.60}ZrO_{3-\delta}$ (0≤δ≤1.0), $Li_{0.20}Ce_{0.60}MoO_{3-\delta}$ (0≤δ≤1.0), $Li_{0.20}Ce_{0.60}NbO_{3-\delta}$ (0≤δ≤1.0), $Li_{0.20}Ce_{0.60}TaO_{3-\delta}$ (0≤δ≤1.0), $Li_{0.20}Ce_{0.60}HfO_{3-\delta}$ (0≤δ≤1.0), $Li_{0.20}Ce_{0.60}BiO_{3-\delta}$ (0≤δ≤1.0), $Li_{0.30}Ce_{0.57}TiO_{3-\delta}$ (0≤δ≤1.0), $Li_{0.30}Ce_{0.57}MnO_{3-\delta}$ (0≤δ≤1.0), $Li_{0.30}Ce_{0.57}NiO_{3-\delta}$ (0≤δ≤1.0), $Li_{0.30}Ce_{0.57}CrO_{3-\delta}$ (0≤δ≤1.0), $Li_{0.30}Ce_{0.57}CoO_{3-\delta}$ (0≤δ≤1.0), $Li_{0.30}Ce_{0.57}IrO_{3-\delta}$ (0≤δ≤1.0), $Li_{0.30}Ce_{0.57}RuO_{3-\delta}$ (0≤δ≤1.0), $Li_{0.30}Ce_{0.57}FeO_{3-\delta}$ (0≤δ≤1.0), $Li_{0.30}Ce_{0.57}PdO_{3-\delta}$ (0≤δ≤1.0), $Li_{0.30}Ce_{0.57}PbO_{3-\delta}$ (0≤δ≤1.0), $Li_{0.30}Ce_{0.57}RhO_{3-\delta}$ (0≤δ≤1.0), $Li_{0.30}Ce_{0.57}SnO_{3-\delta}$ (0≤δ≤1.0), $Li_{0.30}Ce_{0.57}VO_{3-\delta}$ (0≤δ≤1.0), $Li_{0.30}Ce_{0.57}ReO_{3-\delta}$ (0≤δ≤1.0), $Li_{0.30}Ce_{0.57}GeO_{3-\delta}$ (0≤δ≤1.0), $Li_{0.30}Ce_{0.57}WO_{3-\delta}$ (0≤δ≤1.0), $Li_{0.30}Ce_{0.57}ZrO_{3-\delta}$ (0≤δ≤1.0), $Li_{0.30}Ce_{0.57}MoO_{3-\delta}$ (0≤δ≤1.0), $Li_{0.30}Ce_{0.57}NbO_{3-\delta}$ (0≤δ≤1.0), $Li_{0.30}Ce_{0.57}TaO_{3-\delta}$ (0≤δ≤1.0), $Li_{0.30}Ce_{0.57}HfO_{3-\delta}$ (0≤δ≤1.0), $Li_{0.30}Ce_{0.57}BiO_{3-\delta}$ (0≤δ≤1.0), $Li_{0.40}Ce_{0.53}TiO_{3-\delta}$ (0≤δ≤1.0), $Li_{0.40}Ce_{0.53}MnO_{3-\delta}$ (0≤δ≤1.0), $Li_{0.40}Ce_{0.53}NiO_{3-\delta}$ (0≤δ≤1.0), $Li_{0.40}Ce_{0.53}CrO_{3-\delta}$ (0≤δ≤1.0), $Li_{0.40}Ce_{0.53}CoO_{3-\delta}$ (0≤δ≤1.0), $Li_{0.40}Ce_{0.53}IrO_{3-\delta}$ (0≤δ≤1.0), $Li_{0.40}Ce_{0.53}RuO_{3-\delta}$ (0≤δ≤1.0), $Li_{0.40}Ce_{0.53}FeO_{3-\delta}$ (0≤δ≤1.0), $Li_{0.40}Ce_{0.53}PdO_{3-\delta}$ (0≤δ≤1.0), $Li_{0.40}Ce_{0.53}PbO_{3-\delta}$ (0≤δ≤1.0), $Li_{0.40}Ce_{0.53}RhO_{3-\delta}$ (0≤δ≤1.0), $Li_{0.40}Ce_{0.53}SnO_{3-\delta}$ (0≤δ≤1.0), $Li_{0.40}Ce_{0.53}VO_{3-\delta}$ (0≤δ≤1.0), $Li_{0.40}Ce_{0.53}ReO_{3-\delta}$ (0≤δ≤1.0), $Li_{0.40}Ce_{0.53}GeO_{3-\delta}$ (0≤δ≤1.0), $Li_{0.40}Ce_{0.53}WO_{3-\delta}$ (0≤δ≤1.0), $Li_{0.40}Ce_{0.53}ZrO_{3-\delta}$ (0≤δ≤1.0), $Li_{0.40}Ce_{0.53}MoO_{3-\delta}$ (0≤δ≤10), $Li_{0.40}Ce_{0.53}NbO_{3-\delta}$ (0≤δ≤1.0), $Li_{0.40}Ce_{0.53}TaO_{3-\delta}$ (0≤δ≤1.0), $Li_{0.40}Ce_{0.53}HfO_{3-\delta}$ (0≤δ≤1.0), $Li_{0.40}Ce_{0.53}BiO_{3-\delta}$ (0≤δ≤1.0), $Li_{0.45}Ce_{0.52}TiO_{3-\delta}$ (0≤δ≤1.0), $Li_{0.45}Ce_{0.52}MnO_{3-\delta}$ (0≤δ≤1.0), $Li_{0.45}Ce_{0.52}NiO_{3-\delta}$ (0≤δ≤1.0), $Li_{0.45}Ce_{0.52}CrO_{3-\delta}$ (0≤δ≤1.0), $Li_{0.45}Ce_{0.52}CoO_{3-\delta}$ (0≤δ≤1.0), $Li_{0.45}Ce_{0.52}IrO_{3-\delta}$ (0≤δ≤1.0), $Li_{0.45}Ce_{0.52}RuO_{3-\delta}$ (0≤δ≤1.0), $Li_{0.45}Ce_{0.52}FeO_{3-\delta}$ (0≤δ≤1.0), $Li_{0.45}Ce_{0.52}PdO_{3-\delta}$ (0≤δ≤1.0), $Li_{0.45}Ce_{0.52}PbO_{3-\delta}$ (0≤δ≤1.0), $Li_{0.45}Ce_{0.52}RhO_{3-\delta}$ (0≤δ≤1.0), $Li_{0.45}Ce_{0.52}SnO_{3-\delta}$ (0≤δ≤1.0), $Li_{0.45}Ce_{0.52}VO_{3-\delta}$ (0≤δ≤1.0), $Li_{0.45}Ce_{0.52}ReO_{3-\delta}$ (0≤δ≤1.0), $Li_{0.45}Ce_{0.52}WO_{3-\delta}$ (0≤δ≤1.0), $Li_{0.45}Ce_{0.52}GeO_{3-\delta}$ (0≤δ≤1.0), $Li_{0.45}Ce_{0.52}ZrO_{3-\delta}$ (0≤δ≤1.0), $Li_{0.45}Ce_{0.52}MoO_{3-\delta}$ (0≤δ≤1.0), $Li_{0.45}Ce_{0.52}NbO_{3-\delta}$ (0≤δ≤1.0), $Li_{0.45}Ce_{0.52}TaO_{3-\delta}$ (0≤δ≤1.0), $Li_{0.45}Ce_{0.52}HfO_{3-\delta}$ (0≤δ≤1.0), $Li_{0.45}Ce_{0.52}BiO_{3-\delta}$ (0≤δ≤1.0), $Li_{0.34}Pr_{0.55}TiO_{3-\delta}$ (0≤δ≤1.0), $Li_{0.34}Pr_{0.55}MnO_{3-\delta}$ (0≤δ≤1.0), $Li_{0.34}Pr_{0.55}NiO_{3-\delta}$ (0≤δ≤1.0), $Li_{0.34}Pr_{0.55}CrO_{3-\delta}$ (0≤δ≤1.0), $Li_{0.34}Pr_{0.55}CoO_{3-\delta}$ (0≤δ≤1.0), $Li_{0.34}Pr_{0.55}IrO_{3-\delta}$ (0≤δ≤1.0), $Li_{0.34}Pr_{0.55}RuO_{3-\delta}$ (0≤δ≤1.0), $Li_{0.34}Pr_{0.55}FeO_{3-\delta}$ (0≤δ≤1.0), $Li_{0.34}Pr_{0.55}PdO_{3-\delta}$ (0≤δ≤1.0), $Li_{0.34}Pr_{0.55}PbO_{3-\delta}$ (0≤δ≤1.0), $Li_{0.34}Pr_{0.55}RhO_{3-\delta}$ (0≤δ≤1.0), $Li_{0.34}Pr_{0.55}SnO_{3-\delta}$ (0≤δ≤1.0), $Li_{0.34}Pr_{0.55}VO_{3-\delta}$ (0≤δ≤1.0), $Li_{0.34}Pr_{0.55}ReO_{3-\delta}$ (0≤δ≤1.0), $Li_{0.34}Pr_{0.55}GeO_{3-\delta}$ (0≤δ≤1.0), $Li_{0.34}Pr_{0.55}WO_{3-\delta}$ (0≤δ≤1.0), $Li_{0.34}Pr_{0.55}ZrO_{3-\delta}$ (0≤δ≤1.0), $Li_{0.34}Pr_{0.55}MoO_{3-\delta}$ (0≤δ≤1.0), $Li_{0.34}Pr_{0.55}NbO_{3-\delta}$ (0≤δ≤1.0), $Li_{0.34}Pr_{0.55}TaO_{3-\delta}$ (0≤δ≤1.0), $Li_{0.34}Pr_{0.55}HfO_{3-\delta}$ (0≤δ≤1.0), $Li_{0.34}Pr_{0.55}BiO_{3-\delta}$ (0≤δ≤1.0), $Li_{0.10}Pr_{0.63}TiO_{3-\delta}$ (0≤δ≤1.0), $Li_{0.10}Pr_{0.63}MnO_{3-\delta}$ (0≤δ≤1.0), $Li_{0.10}Pr_{0.63}NiO_{3-\delta}$ (0≤δ≤1.0), $Li_{0.10}Pr_{0.63}CrO_{3-\delta}$ (0≤δ≤1.0), $Li_{0.10}Pr_{0.63}CoO_{3-\delta}$ (0≤δ≤1.0), $Li_{0.10}Pr_{0.63}IrO_{3-\delta}$ (0≤δ≤1.0), $Li_{0.10}Pr_{0.63}RuO_{3-\delta}$ (0≤δ≤1.0), $Li_{0.10}Pr_{0.63}FeO_{3-\delta}$ (0≤δ≤1.0), $Li_{0.10}Pr_{0.63}PdO_{3-\delta}$ (0≤δ≤1.0), $Li_{0.10}Pr_{0.63}PbO_{3-\delta}$ (0≤δ≤1.0), $Li_{0.10}Pr_{0.63}RhO_{3-\delta}$ (0≤δ≤1.0), $Li_{0.10}Pr_{0.63}SnO_{3-\delta}$ (0≤δ≤1.0), $Li_{0.10}Pr_{0.63}VO_{3-\delta}$ (0≤δ≤1.0), $Li_{0.10}Pr_{0.63}ReO_{3-\delta}$ (0≤δ≤1.0), $Li_{0.10}Pr_{0.63}GeO_{3-\delta}$ (0≤δ≤1.0), $Li_{0.10}Pr_{0.63}WO_{3-\delta}$ (0≤δ≤1.0), $Li_{0.10}Pr_{0.63}ZrO_{3-\delta}$ (0≤δ≤1.0), $Li_{0.10}Pr_{0.63}MoO_{3-\delta}$ (0≤δ≤1.0), $Li_{0.10}Pr_{0.63}NbO_{3-\delta}$ (0≤δ≤1.0), $Li_{0.10}Pr_{0.63}TaO_{3-\delta}$ (0≤δ≤1.0), $Li_{0.10}Pr_{0.63}HfO_{3-\delta}$ (0≤δ≤1.0), $Li_{0.10}Pr_{0.63}BiO_{3-\delta}$ (0≤δ≤1.0), $Li_{0.20}Pr_{0.60}TiO_{3-\delta}$ (0≤δ≤1.0), $Li_{0.20}Pr_{0.60}MnO_{3-\delta}$ (0≤δ≤1.0), $Li_{0.20}Pr_{0.60}NiO_{3-\delta}$ (0≤δ≤1.0), $Li_{0.20}Pr_{0.60}CrO_{3-\delta}$ (0≤δ≤1.0), $Li_{0.20}Pr_{0.60}CoO_{3-\delta}$ (0≤δ≤1.0), $Li_{0.20}Pr_{0.60}IrO_{3-\delta}$ (0≤δ≤1.0), $Li_{0.20}Pr_{0.60}RuO_{3-\delta}$ (0≤δ≤1.0), $Li_{0.20}Pr_{0.60}FeO_{3-\delta}$ (0≤δ≤1.0), $Li_{0.20}Pr_{0.60}PdO_{3-\delta}$ (0≤δ≤1.0), $Li_{0.20}Pr_{0.60}PbO_{3-\delta}$ (0≤δ≤1.0), $Li_{0.20}Pr_{0.60}RhO_{3-\delta}$ (0≤δ≤1.0), $Li_{0.20}Pr_{0.60}SnO_{3-\delta}$ (0≤δ≤1.0), $Li_{0.20}Pr_{0.60}VO_{3-\delta}$ (0≤δ≤1.0), $Li_{0.20}Pr_{0.60}ReO_{3-\delta}$ (0≤δ≤1.0), $Li_{0.20}Pr_{0.60}GeO_{3-\delta}$ (0≤δ≤1.0), $Li_{0.20}Pr_{0.60}WO_{3-\delta}$ (0≤δ≤1.0), $Li_{0.20}Pr_{0.60}ZrO_{3-\delta}$ (0≤δ≤1.0), $Li_{0.20}Pr_{0.60}MoO_{3-\delta}$ (0≤δ≤1.0), $Li_{0.20}Pr_{0.60}NbO_{3-\delta}$ (0≤δ≤1.0), $Li_{0.20}Pr_{0.60}TaO_{3-\delta}$ (0≤δ≤1.0), $Li_{0.20}Pr_{0.60}HfO_{3-\delta}$ (0≤δ≤1.0), $Li_{0.20}Pr_{0.60}BiO_{3-\delta}$ (0≤δ≤1.0), $Li_{0.30}Pr_{0.57}TiO_{3-\delta}$ (0≤δ≤1.0), $Li_{0.30}Pr_{0.57}MnO_{3-\delta}$ (0≤δ≤1.0), $Li_{0.30}Pr_{0.57}NiO_{3-\delta}$ (0≤δ≤1.0), $Li_{0.30}Pr_{0.57}CrO_{3-\delta}$ (0≤δ≤1.0), $Li_{0.30}Pr_{0.57}CoO_{3-\delta}$ (0≤δ≤1.0), $Li_{0.30}Pr_{0.57}IrO_{3-\delta}$ (0≤δ≤1.0), $Li_{0.30}Pr_{0.57}RuO_{3-\delta}$ (0≤δ≤1.0), $Li_{0.30}Pr_{0.57}FeO_{3-\delta}$ (0≤δ≤1.0), $Li_{0.30}Pr_{0.57}PdO_{3-\delta}$ (0≤δ≤1.0), $Li_{0.30}Pr_{0.57}PbO_{3-\delta}$ (0≤δ≤1.0), $Li_{0.30}Pr_{0.57}RhO_{3-\delta}$ (0≤δ≤1.0), $Li_{0.30}Pr_{0.57}SnO_{3-\delta}$ (0≤δ≤1.0), $Li_{0.30}Pr_{0.57}VO_{3-\delta}$ (0≤δ≤1.0), $Li_{0.30}Pr_{0.57}ReO_{3-\delta}$ (0≤δ≤1.0), $Li_{0.30}Pr_{0.57}GeO_{3-\delta}$ (0≤δ≤1.0), $Li_{0.30}Pr_{0.57}WO_{3-\delta}$ (0≤δ≤1.0), $Li_{0.30}Pr_{0.57}ZrO_{3-\delta}$ (0≤δ≤1.0), $Li_{0.30}Pr_{0.57}MoO_{3-\delta}$ (0≤δ≤1.0), $Li_{0.30}Pr_{0.57}NbO_{3-\delta}$ (0≤δ≤1.0), $Li_{0.30}Pr_{0.57}TaO_{3-\delta}$ (0≤δ≤1.0), $Li_{0.30}Pr_{0.57}HfO_{3-\delta}$ (0≤δ≤1.0), $Li_{0.30}Pr_{0.57}BiO_{3-\delta}$ (0≤δ≤1.0), $Li_{0.40}Pr_{0.53}TiO_{3-\delta}$ (0≤δ≤1.0), $Li_{0.40}Pr_{0.53}MnO_{3-\delta}$ (0≤δ≤1.0), $Li_{0.40}Pr_{0.53}NiO_{3-\delta}$ (0≤δ≤1.0), $Li_{0.40}Pr_{0.53}CrO_{3-\delta}$ (0≤δ≤1.0), $Li_{0.40}Pr_{0.53}CoO_{3-\delta}$ (0≤δ≤1.0), $Li_{0.40}Pr_{0.53}IrO_{3-\delta}$ (0≤δ≤1.0), $Li_{0.40}Pr_{0.53}RuO_{3-\delta}$ (0≤δ≤1.0), $Li_{0.40}Pr_{0.53}FeO_{3-\delta}$ (0≤δ≤1.0), $Li_{0.40}Pr_{0.53}PdO_{3-\delta}$ (0≤δ≤1.0), $Li_{0.40}Pr_{0.53}PbO_{3-\delta}$ (0≤δ≤1.0), $Li_{0.40}Pr_{0.53}RhO_{3-\delta}$ (0≤δ≤1.0), $Li_{0.40}Pr_{0.53}SnO_{3-\delta}$ (0≤δ≤1.0), $Li_{0.40}Pr_{0.53}VO_{3-\delta}$ (0≤δ≤1.0), $Li_{0.40}Pr_{0.53}ReO_{3-\delta}$ (0≤δ≤1.0), $Li_{0.40}Pr_{0.53}GeO_{3-\delta}$ (0≤δ≤1.0), $Li_{0.40}Pr_{0.53}WO_{3-\delta}$ (0≤δ≤1.0), $Li_{0.40}Pr_{0.53}ZrO_{3-\delta}$ (0≤δ≤1.0), $Li_{0.40}Pr_{0.53}MoO_{3-\delta}$ (0≤δ≤1.0), $Li_{0.40}Pr_{0.53}NbO_{3-\delta}$ (0≤δ≤1.0), $Li_{0.40}Pr_{0.53}TaO_{3-\delta}$ (0≤δ≤1.0), $Li_{0.40}Pr_{0.53}HfO_{3-\delta}$ (0≤δ≤1.0), $Li_{0.40}Pr_{0.53}BiO_{3-\delta}$ (0≤δ≤1.0), $Li_{0.45}Pr_{0.52}TiO_{3-\delta}$ (0≤δ≤1.0), $Li_{0.45}Pr_{0.52}MnO_{3-\delta}$ (0≤δ≤1.0), $Li_{0.45}Pr_{0.52}NiO_{3-\delta}$ (0≤δ≤1.0), $Li_{0.45}Pr_{0.52}CrO_{3-\delta}$ (0≤δ≤1.0), $Li_{0.45}Pr_{0.52}CoO_{3-\delta}$ (0≤δ≤1.0), $Li_{0.45}Pr_{0.52}IrO_{3-\delta}$ (0≤δ≤1.0), $Li_{0.45}Pr_{0.52}RuO_{3-\delta}$ (0≤δ≤1.0), $Li_{0.45}Pr_{0.52}FeO_{3-\delta}$ (0≤δ≤1.0), $Li_{0.45}Pr_{0.52}PdO_{3-\delta}$ (0≤δ≤1.0), $Li_{0.45}Pr_{0.52}PbO_{3-\delta}$ (0≤δ≤1.0), $Li_{0.45}Pr_{0.52}RhO_{3-\delta}$ (0≤δ≤1.0), $Li_{0.45}Pr_{0.52}SnO_{3-\delta}$ (0≤δ≤1.0), $Li_{0.45}Pr_{0.52}VO_{3-\delta}$ (0≤δ≤1.0), $Li_{0.45}Pr_{0.52}ReO_{3-\delta}$ (0≤δ≤1.0), $Li_{0.45}Pr_{0.52}GeO_{3-\delta}$ (0≤δ≤1.0), $Li_{0.45}Pr_{0.52}WO_{3-\delta}$ (0≤δ≤1.0), $Li_{0.45}Pr_{0.52}ZrO_{3-\delta}$ (0≤δ≤1.0), $Li_{0.45}Pr_{0.52}MoO_{3-\delta}$ (0≤δ≤1.0), $Li_{0.45}Pr_{0.52}NbO_{3-\delta}$ (0≤δ≤1.0), $Li_{0.45}Pr_{0.52}TaO_{3-\delta}$ (0≤δ≤1.0), $Li_{0.45}Pr_{0.52}HfO_{3-\delta}$ (0≤δ≤1.0), $Li_{0.45}Pr_{0.52}BiO_{3-\delta}$ (0≤δ≤1.0), $Li_{0.10}Ca_{0.80}TiO_{3-\delta}$ (0≤δ≤1.0), $Li_{0.10}Ca_{0.80}MnO_{3-\delta}$ (0≤δ≤1.0), $Li_{0.10}Ca_{0.80}NiO_{3-\delta}$ (0≤δ≤1.0), $Li_{0.10}Ca_{0.80}CrO_{3-\delta}$ (0≤δ≤1.0), $Li_{0.10}Ca_{0.80}CoO_{3-\delta}$ (0≤δ≤1.0), $Li_{0.10}Ca_{0.80}IrO_{3-\delta}$ (0≤δ≤1.0), $Li_{0.10}Ca_{0.80}RuO_{3-\delta}$ (0≤δ≤1.0), $Li_{0.10}Ca_{0.80}FeO_{3-\delta}$ (0≤δ≤1.0), $Li_{0.10}Ca_{0.80}PdO_{3-\delta}$ (0≤δ≤1.0), $Li_{0.10}Ca_{0.80}PbO_{3-\delta}$ (0≤δ≤1.0), $Li_{0.10}Ca_{0.80}RhO_{3-\delta}$ (0≤δ≤1.0), $Li_{0.10}Ca_{0.80}SnO_{3-\delta}$ (0≤δ≤1.0), $Li_{0.10}Ca_{0.80}VO_{3-\delta}$ (0≤δ≤1.0), $Li_{0.10}Ca_{0.80}ReO_{3-\delta}$ (0≤δ≤1.0), $Li_{0.10}Ca_{0.80}GeO_{3-\delta}$ (0≤δ≤1.0), $Li_{0.10}Ca_{0.80}WO_{3-\delta}$ (0≤δ≤1.0), $Li_{0.10}Ca_{0.80}ZrO_{3-\delta}$ (0≤δ≤1.0), $Li_{0.10}Ca_{0.80}MoO_{3-\delta}$ (0≤δ≤1.0), $Li_{0.10}Ca_{0.80}NbO_{3-\delta}$ (0≤δ≤1.0), $Li_{0.10}Ca_{0.80}TaO_{3-\delta}$ (0≤δ≤1.0), $Li_{0.10}Ca_{0.80}HfO_{3-\delta}$ (0≤δ≤1.0), $Li_{0.10}Ca_{0.80}BiO_{3-\delta}$ (0≤δ≤1.0), $Li_{0.20}Ca_{0.60}TiO_{3-\delta}$ (0≤δ≤1.0), $Li_{0.20}Ca_{0.60}MnO_{3-\delta}$ (0≤δ≤1.0), $Li_{0.20}Ca_{0.60}NiO_{3-\delta}$ (0≤δ≤1.0), $Li_{0.20}Ca_{0.60}CrO_{3-\delta}$ (0≤δ≤1.0), $Li_{0.20}Ca_{0.60}CoO_{3-\delta}$ (0≤δ≤1.0), $Li_{0.20}Ca_{0.60}IrO_{3-\delta}$ (0≤δ≤1.0), $Li_{0.20}Ca_{0.60}RuO_{3-\delta}$ (0≤δ≤1.0), $Li_{0.20}Ca_{0.60}FeO_{3-\delta}$ (0≤δ≤1.0), $Li_{0.20}Ca_{0.60}PdO_{3-\delta}$ (0≤δ≤1.0), $Li_{0.20}Ca_{0.60}PbO_{3-\delta}$ (0≤δ≤1.0), $Li_{0.20}Ca_{0.60}RhO_{3-\delta}$ (0≤δ≤1.0), $Li_{0.20}Ca_{0.60}SnO_{3-\delta}$ (0≤δ≤1.0), $Li_{0.20}Ca_{0.60}VO_{3-\delta}$ (0≤δ≤1.0), $Li_{0.20}Ca_{0.60}ReO_{3-\delta}$ (0≤δ≤1.0), $Li_{0.20}Ca_{0.60}GeO_{3-\delta}$ (0≤δ≤1.0), $Li_{0.20}Ca_{0.60}WO_{3-\delta}$ (0≤δ≤1.0), $Li_{0.20}Ca_{0.60}ZrO_{3-\delta}$ (0≤δ≤1.0), $Li_{0.20}Ca_{0.60}MoO_{3-\delta}$ (0≤δ≤1.0), $Li_{0.20}Ca_{0.60}NbO_{3-\delta}$ (0≤δ≤1.0), $Li_{0.20}Ca_{0.60}TaO_{3-\delta}$ (0≤δ≤1.0), $Li_{0.20}Ca_{0.60}HfO_{3-\delta}$ (0≤δ≤1.0), $Li_{0.20}Ca_{0.60}BiO_{3-\delta}$ (0≤δ≤1.0), $Li_{0.25}Ca_{0.50}TiO_{3-\delta}$ (0≤δ≤1.0), $Li_{0.25}Ca_{0.50}MnO_{3-\delta}$ (0≤δ≤1.0), $Li_{0.25}Ca_{0.50}NiO_{3-\delta}$ (0≤δ≤1.0), $Li_{0.25}Ca_{0.50}CrO_{3-\delta}$ (0≤δ≤1.0), $Li_{0.25}Ca_{0.50}CoO_{3-\delta}$ (0≤δ≤1.0), $Li_{0.25}Ca_{0.50}IrO_{3-\delta}$ (0≤δ≤1.0), $Li_{0.25}Ca_{0.50}RuO_{3-\delta}$ (0≤δ≤1.0), $Li_{0.25}Ca_{0.50}FeO_{3-\delta}$ (0≤δ≤1.0), $Li_{0.25}Ca_{0.50}PdO_{3-\delta}$ (0≤δ≤1.0), $Li_{0.25}Ca_{0.50}PbO_{3-\delta}$ (0≤δ≤1.0), $Li_{0.25}Ca_{0.50}RhO_{3-\delta}$ (0≤δ≤1.0), $Li_{0.25}Ca_{0.50}SnO_{3-\delta}$ (0≤δ≤1.0), $Li_{0.25}Ca_{0.50}VO_{3-\delta}$ (0≤δ≤1.0), $Li_{0.25}Ca_{0.50}ReO_{3-\delta}$ (0≤δ≤1.0), $Li_{0.25}Ca_{0.50}GeO_{3-\delta}$ (0≤δ≤1.0), $Li_{0.25}Ca_{0.50}WO_{3-\delta}$ (0≤δ≤1.0), $Li_{0.25}Ca_{0.50}ZrO_{3-\delta}$ (0≤δ≤1.0), $Li_{0.25}Ca_{0.50}MoO_{3-\delta}$ (0≤δ≤1.0), $Li_{0.25}Ca_{0.50}NbO_{3-\delta}$ (0≤δ≤1.0), $Li_{0.25}Ca_{0.50}TaO_{3-\delta}$ (0≤δ≤1.0), $Li_{0.25}Ca_{0.50}HfO_{3-\delta}$ (0≤δ≤1.0), $Li_{0.25}Ca_{0.50}BiO_{3-\delta}$ (0≤δ≤1.0), $Li_{0.30}Ca_{0.40}TiO_{3-\delta}$ (0≤δ≤1.0), $Li_{0.30}Ca_{0.40}MnO_{3-\delta}$ (0≤δ≤1.0), $Li_{0.30}Ca_{0.40}NiO_{3-\delta}$ (0≤δ≤1.0), $Li_{0.30}Ca_{0.40}CrO_{3-\delta}$ (0≤δ≤1.0), $Li_{0.30}Ca_{0.40}CoO_{3-\delta}$ (0≤δ≤1.0), $Li_{0.30}Ca_{0.40}IrO_{3-\delta}$ (0≤δ≤1.0), $Li_{0.30}Ca_{0.40}RuO_{3-\delta}$ (0≤δ≤1.0), $Li_{0.30}Ca_{0.40}FeO_{3-\delta}$ (0≤δ≤1.0), $Li_{0.30}Ca_{0.40}PdO_{3-\delta}$ (0≤δ≤1.0), $Li_{0.30}Ca_{0.40}PbO_{3-\delta}$ (0≤δ≤1.0), $Li_{0.30}Ca_{0.40}RhO_{3-\delta}$ (0≤δ≤1.0), $Li_{0.30}Ca_{0.40}SnO_{3-\delta}$ (0≤δ≤1.0), $Li_{0.30}Ca_{0.40}VO_{3-\delta}$ (0≤δ≤1.0), $Li_{0.30}Ca_{0.40}ReO_{3-\delta}$ (0≤δ≤1.0), $Li_{0.30}Ca_{0.40}GeO_{3-\delta}$ (0≤δ≤1.0), $Li_{0.30}Ca_{0.40}WO_{3-\delta}$ (0≤δ≤1.0), $Li_{0.30}Ca_{0.40}ZrO_{3-\delta}$ (0≤δ≤1.0), $Li_{0.30}Ca_{0.40}MoO_{3-\delta}$ (0≤δ≤1.0), $Li_{0.30}Ca_{0.40}NbO_{3-\delta}$ (0≤δ≤1.0), $Li_{0.30}Ca_{0.40}TaO_{3-\delta}$ (0≤δ≤1.0), $Li_{0.30}Ca_{0.40}HfO_{3-\delta}$ (0≤δ≤1.0), $Li_{0.30}Ca_{0.40}BiO_{3-\delta}$ (0≤δ≤1.0), $Li_{0.40}Ca_{0.20}TiO_{3-\delta}$ (0≤δ≤1.0), $Li_{0.40}Ca_{0.20}MnO_{3-\delta}$ (0≤δ≤1.0), $Li_{0.40}Ca_{0.20}NiO_{3-\delta}$ (0≤δ≤1.0), $Li_{0.40}Ca_{0.20}CrO_{3-\delta}$ (0≤δ≤1.0), $Li_{0.40}Ca_{0.20}CoO_{3-\delta}$ (0≤δ≤1.0), $Li_{0.40}Ca_{0.20}IrO_{3-\delta}$ (0≤δ≤1.0), $Li_{0.40}Ca_{0.20}RuO_{3-\delta}$ (0≤δ≤1.0), $Li_{0.40}Ca_{0.20}FeO_{3-\delta}$ (0≤δ≤1.0), $Li_{0.40}Ca_{0.20}PdO_{3-\delta}$ (0≤δ≤1.0), $Li_{0.40}Ca_{0.20}PbO_{3-\delta}$ (0≤δ≤1.0), $Li_{0.40}Ca_{0.20}RhO_{3-\delta}$ (0≤δ≤1.0), $Li_{0.40}Ca_{0.20}SnO_{3-\delta}$ (0≤δ≤1.0), $Li_{0.40}Ca_{0.20}VO_{3-\delta}$ (0≤δ≤1.0), $Li_{0.40}Ca_{0.20}ReO_{3-\delta}$ (0≤δ≤1.0), $Li_{0.40}Ca_{0.20}GeO_{3-\delta}$ (0≤δ≤1.0), $Li_{0.40}Ca_{0.20}WO_{3-\delta}$ (0≤δ≤1.0), $Li_{0.40}Ca_{0.20}ZrO_{3-\delta}$ (0≤δ≤1.0), $Li_{0.40}Ca_{0.20}MoO_{3-\delta}$ (0≤δ≤1.0), $Li_{0.40}Ca_{0.20}NbO_{3-\delta}$ (0≤δ≤1.0), $Li_{0.40}Ca_{0.20}TaO_{3-\delta}$ ($0 \leq \delta \leq 1.0$), $Li_{0.40}Ca_{0.20}HfO_{3-\delta}$ ($0 \leq \delta \leq 1.0$), $Li_{0.40}Ca_{0.20}BiO_{3-\delta}$ ($0 \leq \delta \leq 1.0$),
$Li_{0.10}Sr_{0.80}TiO_{3-\delta}$ ($0 \leq \delta \leq 1.0$), $Li_{0.10}Sr_{0.80}MnO_{3-\delta}$ ($0 \leq \delta \leq 1.0$), $Li_{0.10}Sr_{0.80}NiO_{3-\delta}$ ($0 \leq \delta \leq 1.0$), $Li_{0.10}Sr_{0.80}CrO_{3-\delta}$ ($0 \leq \delta \leq 1.0$), $Li_{0.10}Sr_{0.80}CoO_{3-\delta}$ ($0 \leq \delta \leq 1.0$), $Li_{0.10}Sr_{0.80}IrO_{3-\delta}$ ($0 \leq \delta \leq 1.0$), $Li_{0.10}Sr_{0.80}RuO_{3-\delta}$ ($0 \leq \delta \leq 1.0$), $Li_{0.10}Sr_{0.80}FeO_{3-\delta}$ ($0 \leq \delta \leq 1.0$), $Li_{0.10}Sr_{0.80}PdO_{3-\delta}$ ($0 \leq \delta \leq 1.0$), $Li_{0.10}Sr_{0.80}PbO_{3-\delta}$ ($0 \leq \delta \leq 1.0$), $Li_{0.10}Sr_{0.80}RhO_{3-\delta}$ ($0 \leq \delta \leq 1.0$), $Li_{0.10}Sr_{0.80}SnO_{3-\delta}$ ($0 \leq \delta \leq 1.0$), $Li_{0.10}Sr_{0.80}VO_{3-\delta}$ ($0 \leq \delta \leq 1.0$), $Li_{0.10}Sr_{0.80}ReO_{3-\delta}$ ($0 \leq \delta \leq 1.0$), $Li_{0.10}Sr_{0.80}GeO_{3-\delta}$ ($0 \leq \delta \leq 1.0$), $Li_{0.10}Sr_{0.80}WO_{3-\delta}$ ($0 \leq \delta \leq 1.0$), $Li_{0.10}Sr_{0.80}ZrO_{3-\delta}$ ($0 \leq \delta \leq 1.0$), $Li_{0.10}Sr_{0.80}MoO_{3-\delta}$ ($0 \leq \delta \leq 1.0$), $Li_{0.10}Sr_{0.80}NbO_{3-\delta}$ ($0 \leq \delta \leq 1.0$), $Li_{0.10}Sr_{0.80}TaO_{3-\delta}$ ($0 \leq \delta \leq 1.0$), $Li_{0.10}Sr_{0.80}HfO_{3-\delta}$ ($0 \leq \delta \leq 1.0$), $Li_{0.10}Sr_{0.80}BiO_{3-\delta}$ ($0 \leq \delta \leq 1.0$),
$Li_{0.20}Sr_{0.60}TiO_{3-\delta}$ ($0 \leq \delta \leq 1.0$), $Li_{0.20}Sr_{0.60}MnO_{3-\delta}$ ($0 \leq \delta \leq 1.0$), $Li_{0.20}Sr_{0.60}NiO_{3-\delta}$ ($0 \leq \delta \leq 1.0$), $Li_{0.20}Sr_{0.60}CrO_{3-\delta}$ ($0 \leq \delta \leq 1.0$), $Li_{0.20}Sr_{0.60}CoO_{3-\delta}$ ($0 \leq \delta \leq 1.0$), $Li_{0.20}Sr_{0.60}IrO_{3-\delta}$ ($0 \leq \delta \leq 1.0$), $Li_{0.20}Sr_{0.60}RuO_{3-\delta}$ ($0 \leq \delta \leq 1.0$), $Li_{0.20}Sr_{0.60}FeO_{3-\delta}$ ($0 \leq \delta \leq 1.0$), $Li_{0.20}Sr_{0.60}PdO_{3-\delta}$ ($0 \leq \delta \leq 1.0$), $Li_{0.20}Sr_{0.60}PbO_{3-\delta}$ ($0 \leq \delta \leq 1.0$), $Li_{0.20}Sr_{0.60}RhO_{3-\delta}$ ($0 \leq \delta \leq 1.0$), $Li_{0.20}Sr_{0.60}SnO_{3-\delta}$ ($0 \leq \delta \leq 1.0$), $Li_{0.20}Sr_{0.60}VO_{3-\delta}$ ($0 \leq \delta \leq 1.0$), $Li_{0.20}Sr_{0.60}ReO_{3-\delta}$ ($0 \leq \delta \leq 1.0$), $Li_{0.20}Sr_{0.60}GeO_{3-\delta}$ ($0 \leq \delta \leq 1.0$), $Li_{0.20}Sr_{0.60}WO_{3-\delta}$ ($0 \leq \delta \leq 1.0$), $Li_{0.20}Sr_{0.60}ZrO_{3-\delta}$ ($0 \leq \delta \leq 1.0$), $Li_{0.20}Sr_{0.60}MoO_{3-\delta}$ ($0 \leq \delta \leq 1.0$), $Li_{0.20}Sr_{0.60}NbO_{3-\delta}$ ($0 \leq \delta \leq 1.0$), $Li_{0.20}Sr_{0.60}TaO_{3-\delta}$ ($0 \leq \delta \leq 1.0$), $Li_{0.20}Sr_{0.60}HfO_{3-\delta}$ ($0 \leq \delta \leq 1.0$), $Li_{0.20}Sr_{0.60}BiO_{3-\delta}$ ($0 \leq \delta \leq 1.0$),
$Li_{0.25}Sr_{0.50}TiO_{3-\delta}$ ($0 \leq \delta \leq 1.0$), $Li_{0.25}Sr_{0.50}MnO_{3-\delta}$ ($0 \leq \delta \leq 1.0$), $Li_{0.25}Sr_{0.50}NiO_{3-\delta}$ ($0 \leq \delta \leq 1.0$), $Li_{0.25}Sr_{0.50}CrO_{3-\delta}$ ($0 \leq \delta \leq 1.0$), $Li_{0.25}Sr_{0.50}CoO_{3-\delta}$ ($0 \leq \delta \leq 1.0$), $Li_{0.25}Sr_{0.50}IrO_{3-\delta}$ ($0 \leq \delta \leq 1.0$), $Li_{0.25}Sr_{0.50}RuO_{3-\delta}$ ($0 \leq \delta \leq 1.0$), $Li_{0.25}Sr_{0.50}FeO_{3-\delta}$ ($0 \leq \delta \leq 1.0$), $Li_{0.25}Sr_{0.50}PdO_{3-\delta}$ ($0 \leq \delta \leq 1.0$), $Li_{0.25}Sr_{0.50}PbO_{3-\delta}$ ($0 \leq \delta \leq 1.0$), $Li_{0.25}Sr_{0.50}RhO_{3-\delta}$ ($0 \leq \delta \leq 1.0$), $Li_{0.25}Sr_{0.50}SnO_{3-\delta}$ ($0 \leq \delta \leq 1.0$), $Li_{0.25}Sr_{0.50}VO_{3-\delta}$ ($0 \leq \delta \leq 1.0$), $Li_{0.25}Sr_{0.50}ReO_{3-\delta}$ ($0 \leq \delta \leq 1.0$), $Li_{0.25}Sr_{0.50}GeO_{3-\delta}$ ($0 \leq \delta \leq 1.0$), $Li_{0.25}Sr_{0.50}WO_{3-\delta}$ ($0 \leq \delta \leq 1.0$), $Li_{0.25}Sr_{0.50}ZrO_{3-\delta}$ ($0 \leq \delta \leq 1.0$), $Li_{0.25}Sr_{0.50}MoO_{3-\delta}$ ($0 \leq \delta \leq 1.0$), $Li_{0.25}Sr_{0.50}NbO_{3-\delta}$ ($0 \leq \delta \leq 1.0$), $Li_{0.25}Sr_{0.50}TaO_{3-\delta}$ ($0 \leq \delta \leq 1.0$), $Li_{0.25}Sr_{0.50}HfO_{3-\delta}$ ($0 \leq \delta \leq 1.0$), $Li_{0.25}Sr_{0.50}BiO_{3-\delta}$ ($0 \leq \delta \leq 1.0$),
$Li_{0.30}Sr_{0.40}TiO_{3-\delta}$ ($0 \leq \delta \leq 1.0$), $Li_{0.30}Sr_{0.40}MnO_{3-\delta}$ ($0 \leq \delta \leq 1.0$), $Li_{0.30}Sr_{0.40}NiO_{3-\delta}$ ($0 \leq \delta \leq 1.0$), $Li_{0.30}Sr_{0.40}CrO_{3-\delta}$ ($0 \leq \delta \leq 1.0$), $Li_{0.30}Sr_{0.40}CoO_{3-\delta}$ ($0 \leq \delta \leq 1.0$), $Li_{0.30}Sr_{0.40}IrO_{3-\delta}$ ($0 \leq \delta \leq 1.0$), $Li_{0.30}Sr_{0.40}RuO_{3-\delta}$ ($0 \leq \delta \leq 1.0$), $Li_{0.30}Sr_{0.40}FeO_{3-\delta}$ ($0 \leq \delta \leq 1.0$), $Li_{0.30}Sr_{0.40}PdO_{3-\delta}$ ($0 \leq \delta \leq 1.0$), $Li_{0.30}Sr_{0.40}PbO_{3-\delta}$ ($0 \leq \delta \leq 1.0$), $Li_{0.30}Sr_{0.40}RhO_{3-\delta}$ ($0 \leq \delta \leq 1.0$), $Li_{0.30}Sr_{0.40}SnO_{3-\delta}$ ($0 \leq \delta \leq 1.0$), $Li_{0.30}Sr_{0.40}VO_{3-\delta}$ ($0 \leq \delta \leq 1.0$), $Li_{0.30}Sr_{0.40}ReO_{3-\delta}$ ($0 \leq \delta \leq 1.0$), $Li_{0.30}Sr_{0.40}GeO_{3-\delta}$ ($0 \leq \delta \leq 1.0$), $Li_{0.30}Sr_{0.40}WO_{3-\delta}$ ($0 \leq \delta \leq 1.0$), $Li_{0.30}Sr_{0.40}ZrO_{3-\delta}$ ($0 \leq \delta \leq 1.0$), $Li_{0.30}Sr_{0.40}MoO_{3-\delta}$ ($0 \leq \delta \leq 1.0$), $Li_{0.30}Sr_{0.40}NbO_{3-\delta}$ ($0 \leq \delta \leq 1.0$), $Li_{0.30}Sr_{0.40}TaO_{3-\delta}$ ($0 \leq \delta \leq 1.0$), $Li_{0.30}Sr_{0.40}HfO_{3-\delta}$ ($0 \leq \delta \leq 1.0$), $Li_{0.30}Sr_{0.40}BiO_{3-\delta}$ ($0 \leq \delta \leq 1.0$),
$Li_{0.40}Sr_{0.20}TiO_{3-\delta}$ ($0 \leq \delta \leq 1.0$), $Li_{0.40}Sr_{0.20}MnO_{3-\delta}$ ($0 \leq \delta \leq 1.0$), $Li_{0.40}Sr_{0.20}NiO_{3-\delta}$ ($0 \leq \delta \leq 1.0$), $Li_{0.40}Sr_{0.20}CrO_{3-\delta}$ ($0 \leq \delta \leq 1.0$), $Li_{0.40}Sr_{0.20}CoO_{3-\delta}$ ($0 \leq \delta \leq 1.0$), $Li_{0.40}Sr_{0.20}IrO_{3-\delta}$ ($0 \leq \delta \leq 1.0$), $Li_{0.40}Sr_{0.20}RuO_{3-\delta}$ ($0 \leq \delta \leq 1.0$), $Li_{0.40}Sr_{0.20}FeO_{3-\delta}$ ($0 \leq \delta \leq 1.0$), $Li_{0.40}Sr_{0.20}PdO_{3-\delta}$ ($0 \leq \delta \leq 1.0$), $Li_{0.40}Sr_{0.20}PbO_{3-\delta}$ ($0 \leq \delta \leq 1.0$), $Li_{0.40}Sr_{0.20}RhO_{3-\delta}$ ($0 \leq \delta \leq 1.0$), $Li_{0.40}Sr_{0.20}SnO_{3-\delta}$ ($0 \leq \delta \leq 1.0$), $Li_{0.40}Sr_{0.20}VO_{3-\delta}$ ($0 \leq \delta \leq 1.0$), $Li_{0.40}Sr_{0.20}ReO_{3-\delta}$ ($0 \leq \delta \leq 1.0$), $Li_{0.40}Sr_{0.20}GeO_{3-\delta}$ ($0 \leq \delta \leq 1.0$), $Li_{0.40}Sr_{0.20}WO_{3-\delta}$ ($0 \leq \delta \leq 1.0$), $Li_{0.40}Sr_{0.20}ZrO_{3-\delta}$ ($0 \leq \delta \leq 1.0$), $Li_{0.40}Sr_{0.20}MoO_{3-\delta}$ ($0 \leq \delta \leq 1.0$), $Li_{0.40}Sr_{0.20}NbO_{3-\delta}$ ($0 \leq \delta \leq 1.0$), $Li_{0.40}Sr_{0.20}TaO_{3-\delta}$ ($0 \leq \delta \leq 1.0$), $Li_{0.40}Sr_{0.20}HfO_{3-\delta}$ ($0 \leq \delta \leq 1.0$), $Li_{0.40}Sr_{0.20}BiO_{3-\delta}$ ($0 \leq \delta \leq 1.0$),
$Li_{0.10}Ba_{0.80}TiO_{3-\delta}$ ($0 \leq \delta \leq 1.0$), $Li_{0.10}Ba_{0.80}MnO_{3-\delta}$ ($0 \leq \delta \leq 1.0$), $Li_{0.10}Ba_{0.80}NiO_{3-\delta}$ ($0 \leq \delta \leq 1.0$), $Li_{0.10}Ba_{0.80}CrO_{3-\delta}$ ($0 \leq \delta \leq 1.0$), $Li_{0.10}Ba_{0.80}CoO_{3-\delta}$ ($0 \leq \delta \leq 1.0$), $Li_{0.10}Ba_{0.80}IrO_{3-\delta}$ ($0 \leq \delta \leq 1.0$), $Li_{0.10}Ba_{0.80}RuO_{3-\delta}$ ($0 \leq \delta \leq 1.0$), $Li_{0.10}Ba_{0.80}FeO_{3-\delta}$ ($0 \leq \delta \leq 1.0$), $Li_{0.10}Ba_{0.80}PdO_{3-\delta}$ ($0 \leq \delta \leq 1.0$), $Li_{0.10}Ba_{0.80}PbO_{3-\delta}$ ($0 \leq \delta \leq 1.0$), $Li_{0.10}Ba_{0.80}RhO_{3-\delta}$ ($0 \leq \delta \leq 1.0$), $Li_{0.10}Ba_{0.80}SnO_{3-\delta}$ ($0 \leq \delta \leq 1.0$), $Li_{0.10}Ba_{0.80}VO_{3-\delta}$ ($0 \leq \delta \leq 1.0$), $Li_{0.10}Ba_{0.80}ReO_{3-\delta}$ ($0 \leq \delta \leq 1.0$), $Li_{0.10}Ba_{0.80}GeO_{3-\delta}$ ($0 \leq \delta \leq 1.0$), $Li_{0.10}Ba_{0.80}WO_{3-\delta}$ ($0 \leq \delta \leq 1.0$), $Li_{0.10}Ba_{0.80}ZrO_{3-\delta}$ ($0 \leq \delta \leq 1.0$), $Li_{0.10}Ba_{0.80}MoO_{3-\delta}$ ($0 \leq \delta \leq 1.0$), $Li_{0.10}Ba_{0.80}NbO_{3-\delta}$ ($0 \leq \delta \leq 1.0$), $Li_{0.10}Ba_{0.80}TaO_{3-\delta}$ ($0 \leq \delta \leq 1.0$), $Li_{0.10}Ba_{0.80}HfO_{3-\delta}$ ($0 \leq \delta \leq 1.0$), $Li_{0.10}Ba_{0.80}BiO_{3-\delta}$ ($0 \leq \delta \leq 1.0$),
$Li_{0.20}Ba_{0.60}TiO_{3-\delta}$ ($0 \leq \delta \leq 1.0$), $Li_{0.20}Ba_{0.60}MnO_{3-\delta}$ ($0 \leq \delta \leq 1.0$), $Li_{0.20}Ba_{0.60}NiO_{3-\delta}$ ($0 \leq \delta \leq 1.0$), $Li_{0.20}Ba_{0.60}CrO_{3-\delta}$ ($0 \leq \delta \leq 1.0$), $Li_{0.20}Ba_{0.60}CoO_{3-\delta}$ ($0 \leq \delta \leq 1.0$), $Li_{0.20}Ba_{0.60}IrO_{3-\delta}$ ($0 \leq \delta \leq 1.0$), $Li_{0.20}Ba_{0.60}RuO_{3-\delta}$ ($0 \leq \delta \leq 1.0$), $Li_{0.20}Ba_{0.60}FeO_{3-\delta}$ ($0 \leq \delta \leq 1.0$), $Li_{0.20}Ba_{0.60}PdO_{3-\delta}$ ($0 \leq \delta \leq 1.0$), $Li_{0.20}Ba_{0.60}PbO_{3-\delta}$ ($0 \leq \delta \leq 1.0$), $Li_{0.20}Ba_{0.60}RhO_{3-\delta}$ ($0 \leq \delta \leq 1.0$), $Li_{0.20}Ba_{0.60}SnO_{3-\delta}$ ($0 \leq \delta \leq 1.0$), $Li_{0.20}Ba_{0.60}VO_{3-\delta}$ ($0 \leq \delta \leq 1.0$), $Li_{0.20}Ba_{0.60}ReO_{3-\delta}$ ($0 \leq \delta \leq 1.0$), $Li_{0.20}Ba_{0.60}GeO_{3-\delta}$ ($0 \leq \delta \leq 1.0$), $Li_{0.20}Ba_{0.60}WO_{3-\delta}$ ($0 \leq \delta \leq 1.0$), $Li_{0.20}Ba_{0.60}ZrO_{3-\delta}$ ($0 \leq \delta \leq 1.0$), $Li_{0.20}Ba_{0.60}MoO_{3-\delta}$ ($0 \leq \delta \leq 1.0$), $Li_{0.20}Ba_{0.60}NbO_{3-\delta}$ ($0 \leq \delta \leq 1.0$), $Li_{0.20}Ba_{0.60}TaO_{3-\delta}$ ($0 \leq \delta \leq 1.0$), $Li_{0.20}Ba_{0.60}HfO_{3-\delta}$ ($0 \leq \delta \leq 1.0$), $Li_{0.20}Ba_{0.60}BiO_{3-\delta}$ ($0 \leq \delta \leq 1.0$),
$Li_{0.25}Ba_{0.50}TiO_{3-\delta}$ ($0 \leq \delta \leq 1.0$), $Li_{0.25}Ba_{0.50}MnO_{3-\delta}$ ($0 \leq \delta \leq 1.0$), $Li_{0.25}Ba_{0.50}NiO_{3-\delta}$ ($0 \leq \delta \leq 10$), $Li_{0.25}Ba_{0.50}CrO_{3-\delta}$ ($0 \leq \delta \leq 1.0$), $Li_{0.25}Ba_{0.50}CoO_{3-\delta}$ ($0 \leq \delta \leq 1.0$), $Li_{0.25}Ba_{0.50}IrO_{3-\delta}$ ($0 \leq \delta \leq 1.0$), $Li_{0.25}Ba_{0.50}RuO_{3-\delta}$ ($0 \leq \delta \leq 1.0$), $Li_{0.25}Ba_{0.50}FeO_{3-\delta}$ ($0 \leq \delta \leq 1.0$), $Li_{0.25}Ba_{0.50}PdO_{3-\delta}$ ($0 \leq \delta \leq 1.0$), $Li_{0.25}Ba_{0.50}PbO_{3-\delta}$ ($0 \leq \delta \leq 1.0$), $Li_{0.25}Ba_{0.50}RhO_{3-\delta}$ ($0 \leq \delta \leq 1.0$), $Li_{0.25}Ba_{0.50}SnO_{3-\delta}$ ($0 \leq \delta \leq 1.0$), $Li_{0.25}Ba_{0.50}VO_{3-\delta}$ ($0 \leq \delta \leq 1.0$), $Li_{0.25}Ba_{0.50}ReO_{3-\delta}$ ($0 \leq \delta \leq 1.0$), $Li_{0.25}Ba_{0.50}GeO_{3-\delta}$ ($0 \leq \delta \leq 1.0$), $Li_{0.25}Ba_{0.50}WO_{3-\delta}$ ($0 \leq \delta \leq 1.0$), $Li_{0.25}Ba_{0.50}ZrO_{3-\delta}$ ($0 \leq \delta \leq 1.0$), $Li_{0.25}Ba_{0.50}MoO_{3-\delta}$ ($0 \leq \delta \leq 1.0$), $Li_{0.25}Ba_{0.50}NbO_{3-\delta}$ ($0 \leq \delta \leq 1.0$), $Li_{0.25}Ba_{0.50}TaO_{3-\delta}$ ($0 \leq \delta \leq 1.0$), $Li_{0.25}Ba_{0.50}HfO_3$, $Li_{0.25}Ba_{0.50}BiO_{3-\delta}$ ($0 \leq \delta \leq 1.0$),
$Li_{0.30}Ba_{0.40}TiO_{3-\delta}$ ($0 \leq \delta \leq 1.0$), $Li_{0.30}Ba_{0.40}MnO_{3-\delta}$ ($0 \leq \delta \leq 1.0$), $Li_{0.30}Ba_{0.40}NiO_{3-\delta}$ ($0 \leq \delta \leq 1.0$), $Li_{0.30}Ba_{0.40}CrO_{3-\delta}$ ($0 \leq \delta \leq 1.0$), $Li_{0.30}Ba_{0.40}CoO_{3-\delta}$ ($0 \leq \delta \leq 1.0$), $Li_{0.30}Ba_{0.40}IrO_{3-\delta}$ ($0 \leq \delta \leq 1.0$), $Li_{0.30}Ba_{0.40}RuO_{3-\delta}$ ($0 \leq \delta \leq 1.0$), $Li_{0.30}Ba_{0.40}FeO_{3-\delta}$ ($0 \leq \delta \leq 1.0$), $Li_{0.30}Ba_{0.40}PdO_{3-\delta}$ ($0 \leq \delta \leq 1.0$), $Li_{0.30}Ba_{0.40}PbO_{3-\delta}$ ($0 \leq \delta \leq 1.0$), $Li_{0.30}Ba_{0.40}RhO_{3-\delta}$ ($0 \leq \delta \leq 1.0$), $Li_{0.30}Ba_{0.40}SnO_{3-\delta}$ ($0 \leq \delta \leq 1.0$), $Li_{0.30}Ba_{0.40}VO_{3-\delta}$ ($0 \leq \delta \leq 1.0$), $Li_{0.30}Ba_{0.40}ReO_{3-\delta}$ ($0 \leq \delta \leq 1.0$), $Li_{0.30}Ba_{0.40}GeO_{3-\delta}$ ($0 \leq \delta \leq 1.0$), $Li_{0.30}Ba_{0.40}WO_{3-\delta}$ ($0 \leq \delta \leq 1.0$), $Li_{0.30}Ba_{0.40}ZrO_{3-\delta}$ ($0 \leq \delta \leq 1.0$), $Li_{0.30}Ba_{0.40}MoO_{3-\delta}$ ($0 \leq \delta \leq 1.0$), $Li_{0.30}Ba_{0.40}NbO_{3-\delta}$ ($0 \leq \delta \leq 1.0$), $Li_{0.30}Ba_{0.40}TaO_{3-\delta}$ ($0 \leq \delta \leq 1.0$), $Li_{0.30}Ba_{0.40}HfO_{3-\delta}$ ($0 \leq \delta \leq 1.0$), $Li_{0.30}Ba_{0.40}BiO_{3-\delta}$ ($0 \leq \delta \leq 1.0$),
$Li_{0.40}Ba_{0.20}TiO_{3-\delta}$ ($0 \leq \delta \leq 1.0$), $Li_{0.40}Ba_{0.20}MnO_{3-\delta}$ ($0 \leq \delta \leq 1.0$), $Li_{0.40}Ba_{0.20}NiO_{3-\delta}$ ($0 \leq \delta \leq 1.0$), $Li_{0.40}Ba_{0.20}CrO_{3-\delta}$ ($0 \leq \delta \leq 1.0$), $Li_{0.40}Ba_{0.20}CoO_{3-\delta}$ ($0 \leq \delta \leq 1.0$), $Li_{0.40}Ba_{0.20}IrO_{3-\delta}$ ($0 \leq \delta \leq 1.0$), $Li_{0.40}Ba_{0.20}RuO_{3-\delta}$ ($0 \leq \delta \leq 1.0$), $Li_{0.40}Ba_{0.20}FeO_{3-\delta}$ ($0 \leq \delta \leq 1.0$), $Li_{0.40}Ba_{0.20}PdO_{3-\delta}$ ($0 \leq \delta \leq 1.0$), $Li_{0.40}Ba_{0.20}PbO_{3-\delta}$ ($0 \leq \delta \leq 1.0$), $Li_{0.40}Ba_{0.20}SnO_{3-\delta}$ ($0 \leq \delta \leq 1.0$), $Li_{0.40}Ba_{0.20}RhO_{3-\delta}$ ($0 \leq \delta \leq 1.0$), $Li_{0.40}Ba_{0.20}VO_{3-\delta}$ (0≤δ≤1.0), $Li_{0.40}Ba_{0.20}ReO_{3-\delta}$ (0≤δ≤1.0), $Li_{0.40}Ba_{0.20}GeO_{3-\delta}$ (0≤δ≤1.0), $Li_{0.40}Ba_{0.20}WO_{3-\delta}$ (0≤δ≤1.0), $Li_{0.40}Ba_{0.20}ZrO_{3-\delta}$ (0≤δ≤1.0), $Li_{0.40}Ba_{0.20}MoO_{3-\delta}$ (0≤δ≤1.0), $Li_{0.40}Ba_{0.20}NbO_{3-\delta}$ (0≤δ≤1.0), $Li_{0.40}Ba_{0.20}TaO_{3-\delta}$ (0≤δ≤1.0), $Li_{0.40}Ba_{0.20}HfO_{3-\delta}$ (0≤δ≤1.0), $Li_{0.40}Ba_{0.20}BiO_{3-\delta}$ (0≤δ≤1.0),
$Li_{0.25}La_{0.50}TiO_{3-\delta}$ (0≤δ≤1.0), $Li_{0.25}La_{0.50}MnO_{3-\delta}$ (0≤δ≤1.0), $Li_{0.25}La_{0.50}NiO_{3-\delta}$ (0≤δ≤1.0), $Li_{0.25}La_{0.50}CrO_{3-\delta}$ (0≤δ≤1.0), $Li_{0.25}La_{0.50}CoO_{3-\delta}$ (0≤δ≤1.0), $Li_{0.25}La_{0.50}IrO_{3-\delta}$ (0≤δ≤1.0), $Li_{0.25}La_{0.50}RuO_{3-\delta}$ (0≤δ≤1.0), $Li_{0.25}La_{0.50}FeO_{3-\delta}$ (0≤δ≤10), $Li_{0.25}La_{0.50}PdO_{3-\delta}$ (0≤δ≤1.0), $Li_{0.25}La_{0.50}PbO_{3-\delta}$ (0≤δ≤1.0), $Li_{0.25}La_{0.50}RhO_{3-\delta}$ (0≤δ≤1.0), $Li_{0.25}La_{0.50}SnO_{3-\delta}$ (0≤δ≤1.0), $Li_{0.25}La_{0.50}VO_{3-\delta}$ (0≤δ≤1.0), $Li_{0.25}La_{0.50}ReO_{3-\delta}$ (0≤δ≤1.0), $Li_{0.25}La_{0.50}GeO_{3-\delta}$ (0≤δ≤1.0), $Li_{0.25}La_{0.50}WO_{3-\delta}$ (0≤δ≤1.0), $Li_{0.25}La_{0.50}ZrO_{3-\delta}$ (0≤δ≤1.0), $Li_{0.25}La_{0.50}MoO_{3-\delta}$ (0≤δ≤1.0), $Li_{0.25}La_{0.50}NbO_{3-\delta}$ (0≤δ≤1.0), $Li_{0.25}La_{0.50}TaO_{3-\delta}$ (0≤δ≤1.0), $Li_{0.25}La_{0.50}HfO_{3-\delta}$ (0≤δ≤1.0), $Li_{0.25}La_{0.50}BiO_{3-\delta}$ (0≤δ≤1.0),
$Li_{0.05}La_{0.82}Ti_{0.70}O_{3-\delta}$ (0≤δ≤1.0), $Li_{0.05}La_{0.82}Mn_{0.70}O_{3-\delta}$ (0≤δ≤1.0), $Li_{0.10}La_{0.80}Mn_{0.70}O_{3-\delta}$ (0≤δ≤1.0), $Li_{0.20}La_{0.77}Mn_{0.70}O_{3-\delta}$ (0≤δ≤1.0), $Li_{0.05}La_{0.82}Nb_{0.70}O_{3-\delta}$ (0≤δ≤1.0), $Li_{0.10}La_{0.80}Nb_{0.70}O_{3-\delta}$ (0≤δ≤1.0), $Li_{0.20}La_{0.77}Nb_{0.70}O_{3-\delta}$ (0≤δ≤1.0), $Li_{0.05}La_{0.82}Ta_{0.70}O_{3-\delta}$ (0≤δ≤1.0), $Li_{0.10}La_{0.80}Ta_{0.70}O_{3-\delta}$ (0≤δ≤1.0), $Li_{0.20}La_{0.77}Ta_{0.70}O_{3-\delta}$ (0≤δ≤1.0), $Li_{0.05}La_{0.82}V_{0.70}O_{3-\delta}$ (0≤δ≤1.0), $Li_{0.10}La_{0.80}V_{0.70}O_{3-\delta}$ (0≤δ≤1.0), $Li_{0.20}La_{0.77}V_{0.70}O_{3-\delta}$ (0≤δ≤1.0), $Li_{0.05}La_{0.82}W_{0.70}O_{3-\delta}$ (0≤δ≤1.0), $Li_{0.10}La_{0.80}W_{0.70}O_{3-\delta}$ (0≤δ≤1.0), $Li_{0.20}La_{0.77}W_{0.70}O_{3-\delta}$ (0≤δ≤1.0), $Li_{0.05}La_{0.82}Mo_{0.70}O_{3-\delta}$ (0≤δ≤1.0), $Li_{0.10}La_{0.80}Mo_{0.70}O_{3-\delta}$ (0≤δ≤1.0), $Li_{0.20}La_{0.77}Mo_{0.70}O_{3-\delta}$ (0≤δ≤1.0), $Li_{0.05}La_{0.82}Bi_{0.70}O_{3-\delta}$ (0≤δ≤1.0), $Li_{0.10}La_{0.80}Bi_{0.70}O_{3-\delta}$ (0≤δ≤1.0), $Li_{0.20}La_{0.77}Bi_{0.70}O_{3-\delta}$ (0≤δ≤1.0), $Li_{0.05}La_{0.82}Cr_{0.70}O_{3-\delta}$ (0≤δ≤1.0), $Li_{0.10}La_{0.80}Cr_{0.70}O_{3-\delta}$ (0≤δ≤1.0), or $Li_{0.20}La_{0.77}Cr_{0.70}O_{3-\delta}$ (0≤δ≤1.0).

The perovskite compound may be, for example, $Li_{0.31}La_{0.56}TiO_3$, $Li_{0.34}La_{0.55}RuO_3$, $Li_{0.2}Ca_{0.6}Mn_{0.5}Ni_{0.5}O_3$, $Li_{0.34}La_{0.55}RuO_{3-\delta}$, or $Li_{0.2}Ca_{0.6}Mn_{0.5}Ni_{0.5}O_{3-\delta}$, but is not limited thereto, and any suitable compounds which provide electronic conductivity and ionic conductivity at the same time may be used as a lithium-containing perovskite compound.

The perovskite compound has, for example, electronic conductivity of about $1 \times 10^{-6}$ S/cm or more and ionic conductivity of about $1 \times 10^{-7}$ S/cm or more at 25° C.

The electronic conductivity of the perovskite compound at 25° C. is, for example, about $5 \times 10^{-6}$ Siemens per centimeter (S/cm) or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, about $1 \times 10^{-2}$ S/cm or more, about $5 \times 10^{-2}$ S/cm or more, or about $1 \times 10^{-1}$ S/cm or more. At a temperature of 25° C., the perovskite compound may have, for example, an electronic conductivity of about $1 \times 10^{-6}$ S/cm to about $1 \times 10^1$ S/cm, about $2 \times 10^{-6}$ S/cm to about $1 \times 10^1$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm.

When the perovskite compound has electronic conductivity in these ranges, the internal resistance of a cathode and a battery including the perovskite compound is reduced. As a result, the cycle characteristics of a battery are improved.

The ionic conductivity of the perovskite compound at 25° C. is, for example, about $5 \times 10^{-7}$ S/cm or more, about $1 \times 10^{-6}$ S/cm or more, about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, or about $1 \times 10^{-2}$ S/cm or more. At a temperature of 25° C., the perovskite compound may have, for example, an ionic conductivity of about $1 \times 10^{-7}$ S/cm to about $1 \times 10^1$ S/cm, about $2 \times 10^{-7}$ S/cm to about $1 \times 10^1$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. When the perovskite compound has ionic conductivity in these ranges, the internal resistance of a cathode and a battery including the perovskite compound is reduced. As a result, the cycle characteristics of a battery are improved.

The lithium-containing metal oxide includes, for example, a spinel compound represented by Formula 2 or 3:

$$Li_{1+x}M_{2+y}O_{4-\delta1} \qquad \text{Formula 2}$$

$$Li_{4+a}M_{5+b}O_{12-\delta2} \qquad \text{Formula 3}$$

In Formulae 2 and 3, each M is independently at least one of a Group 2 to a Group 16 element, and 0<x<1, 0<y<1, 0≤δ1≤1, 0<a<2, 0.3<b<5, and 0≤δ2≤3.

The spinel compound is a compound having a spinel crystalline structure or a spinel-like crystalline structure.

For example, in Formulae 2 and 3, each M may independently be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and 0<x<1, 0<y<1, 0≤δ1≤1, 0<a<2, 0.3<b<5, and 0≤δ2≤3.

The spinel compound may be represented, for example, by Formula 4:

$$Li_{4\pm a}Ti_{5-b}M'_cO_{12-\delta} \qquad \text{Formula 4}$$

In the above formula, M' includes at least one of Cr, Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, To, Re, Fe, Ru, Os, Co, Rh, Ir, Ni, Pd, Pt, Cu, Ag, Au, Zn, Cd, Hg, Al, Ga, In, TI, Ge, Sn, Pb, Sb, Bi, Po, As, Se, or Te, and 0.3<a<2, 0.3<b<2, 0.3<c<2, and 0≤δ≤3. For example, 0≤δ≤2.5, 0≤δ≤2, 0≤δ≤1.5, 0≤δ≤1, and 0≤δ≤0.5.

The spinel compound of Formula 4 has, for example, the peak intensity ratio (Ia/Ib) of a peak intensity (Ia) on a (111) crystal face at the angle of diffraction of 2θ=18°±2.5° with respect to a peak intensity (Ib) at a diffraction angle of 2θ=23.5°±2.5° in an XRD spectrum of about 1 or less, about 0.9 or less, about 0.8 or less, about 0.7 or less, about 0.6 or less, about 0.5 or less, or about 0.4 or less. When the spinel compound has such a peak intensity ratio, the electronic conductivity and ionic conductivity are improved.

The spinel compound of Formula 4 further includes, for example, other phases in addition to a phase having a spinel-like crystalline structure. For example, a composite conductor (the spinel compound of Formula 4) includes a phase having a spinel-like crystalline structure, which belongs to a Fd-3m space group, and in addition, further includes at least one other phase distinguished from the phase having the spinel-like crystalline structure, that is at least one of $Li_2TiO_3$, $Gd_2Ti_2O_7$, $GdTiO_3$, $LiNbO_3$, or $Nb_2O_3$. When the composite conductor has a polycrystallinity including such a plurality of different phases, electronic conductivity and ionic conductivity are improved.

The band gap between the valence band and the conduction band of the spinel compound of Formula 4 is, for example, about 2 electron-volts (eV) or less, about 1.8 eV or less, about 1.6 eV or less, about 1.4 eV or less, or about 1.2 eV or less. When the band bap between the valence band and the conduction band of the composite conductor has a value below these limits, electrons easily migrate from the valence band to the conduction band, and thus, the electronic conductivity of the spinel compound is improved.

In the spinel compound of Formula 4, Ti has, for example, at least one of an oxidation number of +3 or +4. For example, when Ti has a mixed valence state by which a plurality of different oxidation numbers from each other are present in the composite conductor, a novel state density function is added near Fermi energy (Ef), and the band gap between the valence band and the conduction band is reduced. As a result, the electronic conductivity of the spinel compound is improved.

In the spinel compound of Formula 4, M' has, for example, a different oxidation number from the one or more oxidation numbers of Ti. Further, when M' having a different oxidation number from Ti is additionally included in the composite conductor, a novel state density function is added near Fermi energy (Ef), and the band gap between the valence band and the conduction band is reduced. As a result, the electronic conductivity of the spinel compound is improved.

When the oxygen vacancy is included in the spinel compound of Formula 4, improved ionic conductivity may result. For example, when the composite conductor includes the oxygen vacancy, the position of the state density function is shifted to near Fermi energy (Ef), and the band gap between the valence band and the conduction band is reduced. As a result, the electronic conductivity of the spinel compound is improved.

The spinel compound includes, for example, at least one of $Li_{4\pm x}Ti_{5-y}Mg_zO_{12-\delta}$ (0.4<x≤1, 0.4<y≤1, 0.4<z≤1, 0<δ≤3), $Li_{4\pm x}Ti_{5-y}Ca_zO_{12-\delta}$ (0.4<x≤1, 0.4<y≤1, 0.4<z≤1, 0<δ≤3), $Li_{4\pm x}Ti_{5-y}Sr_zO_{12-\delta}$ (0.4<x≤1, 0.4<y≤1, 0.4<z≤1, 0<δ≤3), $Li_{4\pm x}Ti_{5-y}Sc_zO_{12-\delta}$ (0.4<x≤1, 0.4<y≤1, 0.4<z≤1, 0<δ≤3), $Li_{4\pm x}Ti_{5-y}Y_zO_{12-\delta}$ (0.4<x≤1, 0.4<y≤1, 0.4<z≤1, 0<δ≤3), $Li_{4\pm x}Ti_{5-y}La_zO_{12-\delta}$ (0.4<x≤1, 0.4<y≤1, 0.4<z≤1, 0<δ≤3), $Li_{4\pm x}Ti_{5-y}Ce_zO_{12-\delta}$ (0.4<x≤1, 0.4<y≤1, 0.4<z≤1, 0<δ≤3), $Li_{4\pm x}Ti_{5-y}Pr_zO_{12-\delta}$ (0.4<x≤1, 0.4<y≤1, 0.4<z≤1, 0<δ≤3), $Li_{4\pm x}Ti_{5-y}Nd_zO_{12-\delta}$ (0.4<x≤1, 0.4<y≤1, 0.4<z≤1, 0<δ≤3), $Li_{4\pm x}Ti_{5-y}Sm_zO_{12-\delta}$ (0.4<x≤1, 0.4<y≤1, 0.4<z≤1, 0<δ≤3), $Li_{4\pm x}Ti_{5-y}Eu_zO_{12-\delta}$ (0.4<x≤1, 0.4<y≤1, 0.4<z≤1, 0<δ≤3), $Li_{4\pm x}Ti_{5-y}Gd_zO_{12-\delta}$ (0.4<x≤1, 0.4<y≤1, 0.4<z≤1, 0<δ≤3), $Li_{4\pm x}Ti_{5-y}Tb_zO_{12-\delta}$ (0.4<x≤1, 0.4<y≤1, 0.4<z≤1, 0<δ≤3), $Li_{4\pm x}Ti_{5-y}Dy_zO_{12-\delta}$ (0.4<x≤1, 0.4<y≤1, 0.4<z≤1, 0<δ≤3), $Li_{4\pm x}Ti_{5-y}HO_zO_{12-\delta}$ (0.4<x≤1, 0.4<y≤1, 0.4<z≤1, 0<δ≤3), $Li_{4\pm x}Ti_{5-y}Er_zO_{12-\delta}$ (0.4<x≤1, 0.4<y≤1, 0.4<z≤1, 0<δ≤3), $Li_{4\pm x}Ti_{5-y}Tm_zO_{12-\delta}$ (0.4<x≤1, 0.4<y≤1, 0.4<z≤1, 0<δ≤3), $Li_{4\pm x}Ti_{5-y}Yb_zO_{12-\delta}$ (0.4<x≤1, 0.4<y≤1, 0.4<z≤1, 0<δ≤3), $Li_{4\pm x}Ti_{5-y}Lu_zO_{12-\delta}$ (0.4<x≤1, 0.4<y≤1, 0.4<z≤1, 0<δ≤3), $Li_{4\pm x}Ti_{5-y}Zr_zO_{12-\delta}$ (0.4<x≤1, 0.4<y≤1, 0.4<z≤1, 0<δ≤3), $Li_{4\pm x}Ti_{5-y}Hf_zO_{12-\delta}$ (0.4<x≤1, 0.4<y≤1, 0.4<z≤1, 0<δ≤3), $Li_{4\pm x}Ti_{5-y}V_zO_{12-\delta}$ (0.4<x≤1, 0.4<y≤1, 0.4<z≤1, 0<δ≤3), $Li_{4\pm x}Ti_{5-y}Nb_zO_{12-\delta}$ (0.4<x≤1, 0.4<y≤1, 0.4<z≤1, 0<δ≤3), $Li_{4\pm x}Ti_{5-y}Ta_zO_{12-\delta}$ (0.4<x≤1, 0.4<y≤1, 0.4<z≤1, 0<δ≤3), $Li_{4\pm x}Ti_{5-y}MO_zO_{12-\delta}$ (0.4<x≤1, 0.4<y≤1, 0.4<z≤1, 0<δ≤3), $Li_{4\pm x}Ti_{5-y}W_zO_{12-\delta}$ (0.4<x≤1, 0.4<y≤1, 0.4<z≤1, 0<δ≤3), $Li_{4\pm x}Ti_{5-y}Mn_zO_{12-\delta}$ (0.4<x≤1, 0.4<y≤1, 0.4<z≤1, 0<δ≤3), $Li_{4\pm x}Ti_{5-y}Tc_zO_{12-\delta}$ (0.4<x≤1, 0.4<y≤1, 0.4<z≤1, 0<δ≤3), $Li_{4\pm x}Ti_{5-y}Re_zO_{12-\delta}$ (0.4<x≤1, 0.4<y≤1, 0.4<z≤1, 0<δ≤3), $Li_{4\pm x}Ti_{5-y}Fe_zO_{12-\delta}$ (0.4<x≤1, 0.4<y≤1, 0.4<z≤1, 0<δ≤3), $Li_{4\pm x}Ti_{5-y}Ru_zO_{12-\delta}$ (0.4<x≤1, 0.4<y≤1, 0.4<z≤1, 0<δ≤3), $Li_{4\pm x}Ti_{5-y}Os_zO_{12-\delta}$ (0.4<x≤1, 0.4<y≤1, 0.4<z≤1, 0<δ≤3), $Li_{4\pm x}Ti_{5-y}Co_zO_{12-\delta}$ (0.4<x≤1, 0.4<y≤1, 0.4<z≤1, 0<δ≤3), $Li_{4\pm x}Ti_{5-y}Rh_zO_{12-\delta}$ (0.4<x≤1, 0.4<y≤1, 0.4<z≤1, 0<δ≤3), $Li_{4\pm x}Ti_{5-y}Ir_zO_{12-\delta}$ (0.4<x≤1, 0.4<y≤1, 0.4<z≤1, 0<δ≤3), $Li_{4\pm x}Ti_{5-y}Ni_zO_{12-\delta}$ (0.4<x≤1, 0.4<y≤1, 0.4<z≤1, 0<δ≤3), $Li_{4\pm x}Ti_{5-y}Pd_zO_{12-\delta}$ (0.4<x≤1, 0.4<y≤1, 0.4<z≤1, 0<δ≤3), $Li_{4\pm x}Ti_{5-y}Pt_zO_{12-\delta}$ (0.4<x≤1, 0.4<y≤1, 0.4<z≤1, 0<δ≤3), $Li_{4\pm x}Ti_{5-y}Cu_zO_{12-\delta}$ (0.4<x≤1, 0.4<y≤1, 0.4<z≤1, 0<δ≤3), $Li_{4\pm x}Ti_{5-y}Ag_zO_{12-\delta}$ (0.4<x≤1, 0.4<y≤1, 0.4<z≤1, 0<δ≤3), $Li_{4\pm x}Ti_{5-y}Au_zO_{12-\delta}$ (0.4<x≤1, 0.4<y≤1, 0.4<z≤1, 0<δ≤3), $Li_{4\pm x}Ti_{5-y}Zn_zO_{12-\delta}$ (0.4<x≤1, 0.4<y≤1, 0.4<z≤1, 0<δ≤3), $Li_{4\pm x}Ti_{5-y}Cd_zO_{12-\delta}$ (0.4<x≤1, 0.4<y≤1, 0.4<z≤1, 0<δ≤3), $Li_{4\pm x}Ti_{5-y}Hg_zO_{12-\delta}$ (0.4<x≤1, 0.4<y≤1, 0.4<z≤1, 0<δ≤3), $Li_{4\pm x}Ti_{5-y}Al_zO_{12-\delta}$ (0.4<x≤1, 0.4<y≤1, 0.4<z≤1, 0<δ≤3), $Li_{4\pm x}Ti_{5-y}Ga_zO_{12-\delta}$ (0.4<x≤1, 0.4<y≤1, 0.4<z≤1, 0<δ≤3), $Li_{4\pm x}Ti_{5-y}In_zO_{12-\delta}$ (0.4<x≤1, 0.4<y≤1, 0.4<z≤1, 0<δ≤3), $Li_{4\pm x}Ti_{5-y}Ti_zO_{12-\delta}$ (0.4<x≤1, 0.4<y≤1, 0.4<z≤1, 0<δ≤3), $Li_{4\pm x}Ti_{5-y}Ge_zO_{12-\delta}$ (0.4<x≤1, 0.4<y≤1, 0.4<z≤1, 0<δ≤3), $Li_{4\pm x}Ti_{5-y}Sn_zO_{12-\delta}$ (0.4<x≤1, 0.4<y≤1, 0.4<z≤1, 0<δ≤3), $Li_{4\pm x}Ti_{5-y}Pb_zO_{12-\delta}$ (0.4<x≤1, 0.4<y≤1, 0.4<z≤1, 0<δ≤3), $Li_{4\pm x}Ti_{5-y}Sb_zO_{12-\delta}$ (0.4<x≤1, 0.4<y≤1, 0.4<z≤1, 0<δ≤3), $Li_{4\pm x}Ti_{5-y}Bi_zO_{12-\delta}$ (0.4<x≤1, 0.4<y≤1, 0.4<z≤1, 0<δ≤3), $Li_{4\pm x}Ti_{5-y}PO_zO_{12-\delta}$ (0.4<x≤1, 0.4<y≤1, 0.4<z≤1, 0<δ≤3), $Li_{4\pm x}Ti_{5-y}As_zO_{12-\delta}$ (0.4<x≤1, 0.4<y≤1, 0.4<z≤1, 0<δ≤3), $Li_{4\pm x}Ti_{5-y}Se_zO_{12-\delta}$ (0.4<x≤1, 0.4<y≤1, 0.4<z≤1, 0<δ≤3), or $Li_{4\pm x}Ti_{5-y}Te_zO_{12-\delta}$ (0.4<x≤1, 0.4<y≤1, 0.4<z≤1, 0<δ≤3).

The spinel compound is, for example, $LiMn_2O_4$, $LiTiNbO_4$, $Li_4Ti_5O_{12}$, $Li_4Mn_5O_{12}$, or $Li_{4.5}Ti_{4.5}Gd_{0.5}O_{12}$, but is not limited thereto, and any suitable compounds including lithium that provide electronic conductivity and ionic conductivity at the same time may be used.

The spinel compound has, for example, electronic conductivity at 25° C. of about $1 \times 10^{-6}$ S/cm or more and ionic conductivity of about $1 \times 10^{-7}$ S/cm or more.

The electronic conductivity of the spinel compound at 25° C. is, for example, about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, about $1 \times 10^{-2}$ S/cm or more, about $5 \times 10^{-2}$ S/cm or more, or about $1 \times 10^{-1}$ S/cm or more. At a temperature of 25° C., the spinel compound may have, for example, an electronic conductivity of about $1 \times 10^{-6}$ S/cm to about $1 \times 10^1$ S/cm, about $2 \times 10^{-6}$ S/cm to about $1 \times 10^1$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. When the spinel compound has such high electronic conductivity, the internal resistance of a cathode and a battery including the spinel compound is reduced. In conclusion, the cycle characteristics of the battery are improved.

The ionic conductivity of the spinel compound at 25° C. may be, for example, about $5 \times 10^{-7}$ S/cm or more, about $1 \times 10^{-6}$ S/cm or more, about $5 \times 10^{-6}$ S/cm or more, about $1\times10^{-5}$ S/cm or more, about $5\times10^{-5}$ S/cm or more, about $1\times10^{-4}$ S/cm or more, about $5\times10^{-4}$ S/cm or more, about $1\times10^{-3}$ S/cm or more, about $5\times10^{-3}$ S/cm or more, or about $1\times10^{-2}$ S/cm or more. At a temperature of 25° C., the spinel compound may have, for example, an ionic conductivity of about $1\times10^{-7}$ S/cm to about $1\times10^{1}$ S/cm, about $2\times10^{-7}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm. When the spinel compound has ionic conductivity in these ranges, the internal resistance of a cathode and a battery including the spinel compound is reduced. Thus, the cycle characteristics of the battery are improved.

In addition, the lithium-containing metal oxide may include at least one of a layered compound, a garnet compound, a NASICON compound, a LISICON compound, a phosphate compound, a tavorite compound, a triplite compound, an anti-perovskite compound, a silicate compound or a borate compound. When the lithium-containing metal oxide includes a compound having such a crystalline structure, the decomposition of a cathode due to radicals involving in electrochemical reaction is suppressed.

The lithium-containing metal oxide may include, for example, a layered compound represented by Formula 5:

     Formula 5

In Formula 5, M is at least one of a Group 2 to a Group 16 element, and $0<x<0.5$, $0<y<1$, and $0\leq\delta\leq1$.

The layered compound is a compound having a layered crystalline structure.

The layered compound is, for example, a compound represented by at least one of $Li_aA_{1-b}B'_bD_2$ (where, $0.90\leq a\leq1.8$, and $0\leq b\leq0.5$); $Li_aE_{1-b}B'_bO_{2-c}D_c$ (where, $0.90\leq a\leq1.8$, $0\leq b\leq0.5$, and $0\leq c\leq0.05$); $LiE_{2-b}B'_bO_{4-c}D_c$ (where, $0\leq b\leq0.5$, and $0\leq c\leq0.05$); $Li_aNi_{1-b-c}Co_bB'_cD_\alpha$ (where, $0.90\leq a\leq1.8$, $0\leq b\leq0.5$, $0\leq c\leq0.05$, and $0<\alpha\leq2$); $Li_aNi_{1-b-c}Co_bB'_cO_{2-\alpha}F'_\alpha$ (where, $0.90\leq a\leq1.8$, $0\leq b\leq0.5$, $0\leq c\leq0.05$, and $0\leq\alpha\leq2$); $Li_aNi_{1-b-c}Co_bB'_cO_{2-\alpha}F'_2$ (where, $0.90\leq a\leq1.8$, $0\leq b\leq0.5$, $0\leq c\leq0.05$, and $0<\alpha\leq2$); $Li_aNi_{1-b-c}Mn_bB'_cD_\alpha$ (where, $0.90\leq a\leq1.8$, $0\leq b\leq0.5$, $0\leq c\leq0.05$, and $0<\alpha\leq2$); $Li_aNi_{1-b-c}Mn_bB'_cO_{2-\alpha}F'_\alpha$ (where, $0.90\leq a\leq1.8$, $0\leq b\leq0.5$, $0\leq c\leq0.05$, and $0<\alpha<2$); $Li_aNi_{1-b-c}Mn_bB'_cO_{2-\alpha}F'_2$ (where, $0.90\leq a\leq1.8$, $0\leq b\leq0.5$, $0\leq c\leq0.05$, and $0<\alpha<2$); $Li_aNi_bE_cG_dO_2$ (where, $0.90\leq a\leq1.8$, $0\leq b\leq0.9$, $0\leq c\leq0.5$, and $0.001\leq d\leq0.1$); $Li_aNi_bCo_cMn_dGeO_2$ (where, $0.90\leq a\leq1.8$, $0\leq b\leq0.9$, $0\leq c\leq0.5$, $0\leq d\leq0.5$, and $0.001\leq e\leq0.1$); $Li_aNiG_bO_2$ (where, $0.90\leq a\leq1.8$, $0.001\leq b\leq0.1$); $Li_aCoG_bO_2$ (where, $0.90\leq a\leq1.8$, $0.001\leq b\leq0.1$); or $Li_aMnG_bO_2$ (where, $0.90\leq a\leq1.8$, $0.001\leq b\leq0.1$).

A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof.

The layered compound is, for example, $LiNiO_2$, $LiCoO_2$, $LiMnO_2$, $LiNi_{1-x}Mn_xO_2$ ($0<x<1$), $LiNi_{1-x-y}Co_xMn_yO_2$ ($0<x\leq0.5$, $0<y\leq0.5$), or $LiNi_{0.8}Co_{0.1}Mn_{0.1}O_2$, $LiNi_{1-x-y}Co_xAl_yO_2$ ($0<x\leq0.5$, $0<y\leq0.5$), but is not limited thereto, and any suitable compounds may be used as a lithium-containing layered compound.

The lithium-containing metal compound may include, for example, a NASICON compound represented by Formula 6:

     Formula 6

In Formula 6, A and M are each independently at least one of a Group 2 to a Group 16 element, X is As, P, Mo or S, and $0<x<1.0$.

The NASICON compound is a compound isostructural with NASICON.

The NASICON compound is, for example, $Li_{1.3}Al_{0.3}Ti_{1.7}(PO_4)_3$, $Li_{1.3}Al_{0.3}Ge_{1.7}(PO_4)_3$, or $Li_{1.3}Al_{0.3}Zr_{1.7}(PO_4)_3$, but is not limited thereto, and any suitable compound used as a lithium-containing NASICON compound may be used.

The lithium-containing metal oxide may include, for example, a LISICON compound represented by Formula 7:

     Formula 7

In Formula 7, A and B' are each independently at least one of a Group 2 to a Group 16 elements, $c=ma+nb$, m is an oxidation number of A, n is an oxidation number of B', and $0<a\leq1$, and $0\leq b\leq1$.

The LISICON compound is a compound having a LISICON crystal structure or a LISICON-like crystalline structure.

The LISICON compound is, for example, $Li_4SiO_4$, $Li_{3.75}Si_{0.75}P_{0.25}O_4$, $Li_{14}Zn(GeO_4)_4$ $Li_{3.4}V_{0.6}Ge_{0.4}O_4$, or $Li_{3.5}V_{0.5}Ti_{0.5}O_4$, but is not limited thereto, and any suitable compound used as a lithium-containing LISICON compound may be used.

The lithium-containing metal oxide may include, for example, a garnet compound represented by Formula 8:

     Formula 8

In Formula, A and B' are each independently at least one of a Group 2 to a Group 16 element, and $3.0\leq x\leq7.0$.

The garnet compound is a compound having a garnet crystalline structure or a garnet-like crystalline structure.

The garnet compound is, for example, $Li_3Tb_3Te_2O_{12}$, $Li_{4.22}Al_{0.26}La_3Zr_2WO_{12}$, $Li_5La_3Nb_2O_{12}$, $Li_6BaLa_2Ta_2O_{12}$, or $Li_7La_3Zr_2O_{12}$, but is not limited thereto, and any suitable compound used as a lithium-containing garnet compound may be used.

The lithium-containing metal oxide may include, for example, a phosphate compound represented by Formula 9 or Formula 10:

     Formula 9

     Formula 10

In Formulae 9 and 10, each M is independently at least one of a Group 2 to a Group 16 element, and $0\leq x\leq1.0$.

The compound represented by Formula 9 is an olivine compound. The olivine compound is a compound having an olivine crystalline structure or an olivine-like crystalline structure.

The phosphate compound is, for example, $LiFePO_4$, $LiMnPO_4$, $LiCoPO_4$, $LiNiPO_4$, $Li_2MnP_2O_7$, or $Li_2FeP_2O_7$, but is not limited thereto, and any suitable compound used as a lithium-containing phosphate compound may be used.

The lithium-containing metal oxide may include, for example, a tavorite compound or a triplite compound represented by Formula 11:

     Formula 11

In Formula 11, M is at least one of a Group 2 to a Group 16 element, T is P or S, X is F, O or OH, and $0\leq x\leq1.0$.

The tavorite compound is a compound having a tavorite crystalline structure or a tavorite-like crystalline structure.

The triplite compound is a compound having a triplite crystalline structure or a triplite-like crystalline structure.

The tavorite compound or triplite compound is, for example, LiVO(PO$_4$), LiV(PO$_4$)F, LiFe(SO$_4$)F, or Li$_2$Fe(PO$_4$)F, but is not limited thereto, and any suitable compound used as a lithium-containing tavorite compound or triplite compound may be used. The tavorite compound and the triplite compound have the same composition but different crystalline structures.

The lithium-containing metal oxide may include, for example, an anti-perovskite compound represented by Formula 12:

$$Li_xM_yOA \qquad \text{Formula 12}$$

In Formula 12, M is at least one of a Group 2 to a Group 16 element, A is F, Cl, Br, I, S, Se, or Te, and $2.0 \leq x \leq 3.0$, and $0 \leq y \leq 1.0$.

The anti-perovskite compound has a perovskite crystalline structure or a perovskite-like crystalline structure but is a compound in which the positions of a cation and an anion are switched in opposition to the perovskite compound.

The anti-perovskite compound is, for example, Li$_3$OCl, Li$_2$OHBr, Li$_2$(OH)$_{0.9}$F$_{0.1}$Cl, or Li$_3$OCl$_{0.5}$Br$_{0.5}$, but is not limited thereto, and any suitable compound used as a lithium-containing anti-perovskite compound may be used.

The lithium-containing metal oxide may include, for example, at least one of a silicate compound represented by Formula 13:

$$Li_{2\pm x}MSiO_4 \qquad \text{Formula 13}$$

In Formula 13, M is at least one of a Group 2 to a Group 16 element, and $0 \leq x \leq 1.0$.

The silicate compound is a crystalline compound including a SiO$_4^{4-}$ anion.

The silicate compound is, for example, Li$_2$MnSiO$_4$ or Li$_2$FeSiO$_4$, but is not limited thereto, and any suitable compound used as a lithium-containing silicate compound may be used.

The lithium-containing metal oxide may include, for example, at least one of a borate compound represented by Formula 14:

$$Li_{1\pm x}MBO_3 \qquad \text{Formula 14}$$

In Formula 14, M is at least one of Group 2 to a Group 16 element, and $0 \leq x \leq 1.0$.

The borate compound is a crystalline compound including a BO$_3^{3-}$ anion.

The borate compound is, for example, LiFeBO$_3$ or LiCoBO$_3$, but is not limited thereto, and any suitable compound used as a lithium-containing borate compound may be used.

The ionic conductivity at 25° C. of the layered compound represented by Formula 5, the NASICON compound represented by Formula 6, the LISICON compound represented by Formula 7, the garnet compound represented by Formula 8, the phosphate compound represented by Formula 9 or 10, the tavorite compound or triplite compound represented by Formula 11, the anti-perovskite compound represented by Formula 12, the silicate compound represented by Formula 13, and/or the borate compound represented by Formula 14 is, for example, about $1 \times 10^{-6}$ S/cm or more, about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, about $1 \times 10^{-2}$ S/cm or more, about $5 \times 10^{-2}$ S/cm or more, or about $1 \times 10^{-1}$ S/cm or more. The ionic conductivity may be in a range of about $1 \times 10^{-6}$ S/cm to about $1 \times 10^{1}$ S/cm, about $2 \times 10^{-6}$ S/cm to about $1 \times 10^{1}$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. When the compounds of Formulae 5 to 14 have ionic conductivity in these ranges, the internal resistance of a cathode and a lithium-air battery, including the compounds of Formulae 5 to 14 is reduced.

The lithium-containing metal oxide included in the porous film is, for example, electrochemically stable with respect to a lithium metal in a voltage range of about 2.0 V to about 4.0 V. Accordingly, the porous film may be used for a long time in a battery of which operation voltage with respect to a lithium metal is about 2.0 V to about 4.0 V.

A lithium-air battery according to an embodiment includes the aforementioned cathode; an anode including lithium; and an electrolyte positioned between the cathode and the anode.

When the lithium-air battery employs the cathode including a porous film having a porosity of 50% or more, the structural stability of the lithium-air battery is improved, and the deterioration thereof is suppressed.

The lithium-air battery includes a cathode. The cathode is an air electrode. The cathode is positioned, for example, on a cathode current collector.

The cathode employs a porous film including the lithium-containing metal oxide. The amount of the lithium-containing metal oxide based on 100 parts by weight of the cathode is, for example, about 1 part by weight to about 100 parts by weight, about 10 parts by weight to about 100 parts by weight, about 50 parts by weight to about 100 parts by weight, about 60 parts by weight to about 100 parts by weight, about 70 parts by weight to about 100 parts by weight, about 80 parts by weight to about 100 parts by weight, or about 90 parts by weight to about 100 parts by weight. The cathode is, for example, substantially composed of a porous film. Also, the porous film may be, for example, substantially composed of a lithium-containing metal oxide. When the cathode is substantially composed of the porous film including a lithium-containing metal oxide, the structure of the cathode is simplified, and the preparation thereof is simplified. The cathode is permeable to a gas, for example, oxygen or air. When the cathode is porous and/or gas-permeable, oxygen or air easily diffuse into the cathode, and lithium ions and/or electrons move efficiently through the lithium-containing metal oxide which is included in the cathode, and thus, an electrochemical reaction with oxygen, lithium ions and/or electrons occurs in the cathode.

Alternatively, the cathode may further include, for example, other cathode materials in addition to the porous film including the lithium-containing metal oxide.

The cathode may include, for example, a conductive material. Such a conductive material is, for example, porous. When the conductive material is porous, the air easily penetrates the cathode. The conductive material may use any suitable material having porosity and/or conductivity, for example, a carbon-based material having porosity. The carbon-based material is, for example, carbon black, graphite, graphene, activated carbon, or carbon fiber, but is not limited thereto, and any suitable material used as a carbon-based material may be used. The conductive material is, for example, a metallic material. The metallic material is, for example, a metal fiber, a metal mesh, or a metal powder. The metal powder is, for example, copper, silver, nickel, or aluminum. The conductive material is, for example, an organic conductive material. The organic conductive material is, for example, a polyphenylene derivative or a polythiophene derivative. The conductive material is used, for example, alone or as a mixture. The cathode includes a composite conductor as the conductive material, and the cathode may include the aforementioned conductive materials in addition to the composite conductor.

The cathode further includes, for example, a catalyst for the oxidation/reduction of oxygen. The catalyst is, for example, a noble metal-based catalyst such as platinum, gold, silver, palladium, ruthenium, rhodium, or osmium, an oxide-based catalyst such as a manganese oxide, an iron oxide, a cobalt oxide, or nickel oxide, or an organometallic catalyst such as cobalt phthalocyanine, but is not limited thereto, and any suitable catalyst used for the oxidation/reduction of oxygen may be used.

The catalyst is, for example, supported by a carrier. The carrier is, for example, an oxide carrier, a zeolite carrier, a clay-based mineral carrier, or a carbon carrier. The oxide carrier is, for example, a metal oxide carrier including at least one of Al, Si, Zr, Ti, Ce, Pr, Sm, Eu, Tb, Tm, Yb, Sb, Bi, V, Cr, Mn, Fe, Co, Ni, Cu, Nb, Mo or W. The oxide carrier includes, for example, alumina, silica, zirconium oxide, or titanium dioxide. The carbon carrier includes carbon black such as ketjen black, acetylene black, channel black, or lamp black, graphite such as natural graphite, synthetic graphite or expanded graphite, activated carbon, or carbon fiber, etc., but is not limited thereto, and any suitable material used as a carrier may be used.

The cathode may include, for example, a binder. The binder includes, for example, a thermoplastic resin or a thermosetting resin. The binder is a single material or a mixture of polyethylene, polypropylene, polytetrafluoroethylene (PTFE), polyvinylidene fluoride (PVDF), styrene-butadiene rubber, a copolymer of tetrafluoroethylene-perfluoroalkyl vinyl ether, a copolymer of vinylidene fluoride-hexafluoropropylene, a copolymer of vinylidene fluoride-chlorotrifluoroethylene, a copolymer of ethylene-tetrafluoroethylene, polychlorotrifluoroethylene, a copolymer of vinylidene fluoride-pentafluoropropylene, a copolymer of propylene-tetrafluoroethylene, a copolymer of ethylene-chlorotrifluoroethylene, a copolymer of vinylidene fluoride-hexafluoropropylene-tetrafluoroethylene, a copolymer of vinylidene fluoride-perfluoromethyl vinyl ether-tetrafluoroethylene, or a copolymer of ethylene-acrylic acid, but is not limited thereto, and any suitable binder may be used.

The cathode is prepared by, for example, mixing a conductive material, an oxygen oxidizing/reducing catalyst, and a binder, adding a suitable solvent to prepare a cathode slurry, and applying the cathode slurry on the surface of a base, and drying or compression molding on the base for improving electrode density. The base is, for example, a porous film including the lithium-containing metal oxide.

The lithium-air battery includes an anode. The anode includes lithium.

The anode is, for example, a lithium metal thin film or a lithium-based alloy thin film. The lithium-based alloy is, for example, an alloy of aluminum, tin, magnesium, indium, calcium, titanium, or vanadium, with lithium.

The lithium-air battery includes an electrolyte layer positioned between a cathode and an anode.

The electrolyte layer includes at least one of a solid electrolyte, a gel electrolyte or a liquid electrolyte. The solid electrolyte, the gel electrolyte and the liquid electrolyte are not limited, and any suitable electrolyte may be used.

The solid electrolyte includes at least one of a solid electrolyte including an ionically conductive inorganic material, a solid electrolyte including a polymeric ionic liquid (PIL) and a lithium salt, a solid electrolyte including an ionically conductive polymer and a lithium salt, or a solid electrolyte including an electronically conductive polymer, but is not limited thereto, and any suitable solid electrolyte may be used.

The ionically conductive inorganic material includes at least one of a glass or amorphous metal ion conductor, a ceramic activated metal ion conductor, or a glass ceramic activated metal ion conductor, but is not limited thereto, and any suitable ionically conductive inorganic material may be used. The ionically conductive inorganic material is, for example, an ionically conductive inorganic particle or the molded article thereof into a sheet type.

The ionically conductive inorganic material is, for example, at least one of $BaTiO_3$, $Pb(Zr,Ti)O_3$ (PZT), $Pb_{1-x}La_xZr_{1-y}Ti_yO_3$ (PLZT) ($0 \leq x < 1$, $0 \leq y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $Li_{1+x+y}(Al_aGa_{1-a})_x(Ti_bGe_{1-b})_{2-x}Si_yP_{3-y}O_{12}$ ($0 \leq x \leq 1$, $0 \leq y \leq 1$, $0 \leq a \leq 1$, $0 \leq b \leq 1$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$) series glass, $P_2S_5$ ($Li_xP_yS_z$, $0<x<3$, $0<y<3$, $0<z<7$) series glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, or a garnet-based ceramics ($Li_{3+x}La_3M_2O_{12}$ ($0 \leq x \leq 4$, M=Te, Nb, Zr)).

The PIL includes, for example, a repeating unit including i) at least one of an ammonium-based cation, a pyrrolidinium-based cation, a pyridinium-based cation, a pyridinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based, and ii) at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$ or $(CF_3SO_2)_2N^-$. The PIL is, for example, poly(diallyldimethylammonium)trifluoromethylsulfonylimide (TFSI), poly(1-allyl-3-methylimidazolium trifluoromethanesulfonylimide), or poly(N-methyl-N-propylpiperidinium bis(trifluoromethanesulfonyl)imide).

The ionically conductive polymer includes, for example, at least one ionically conductive repeating units of ether-based, acrylic, methacrylic, or siloxane-based monomers.

The ionically conductive polymer includes, for example, polyethylene oxide (PEO), polyvinyl alcohol (PVA), polyvinyl pyrrolidone (PVP), polyvinyl sulfone, polypropylene oxide (PPO), polymethyl methacrylate, polyethyl methacrylate, polydimethylsiloxane, polyacrylic acid, polymethacrylic acid, polymethyl acrylate, polyethyl acrylate, poly-2-ethylhexyl acrylate, polybutyl methacrylate, poly-2- ethylhexyl methacrylate, polydecyl acrylate, polyethylenevinylacetate, a phosphoric acid ester polymer, polyester sulfide, polyvinylidene fluoride (PVdF), or Li-substituted Nation, but is not limited thereto, and any suitable ionically conductive polymer may be used.

The electronically conductive polymer is, for example, a polyphenylene derivative or a polythiophene derivative, but is not limited thereto, and any suitable electronically conductive polymer may be used.

The gel electrolyte is obtained by, for example, additionally adding a solvent having a low molecular weight to a solid electrolyte positioned between a cathode and an anode. The gel electrolyte is, for example, a gel electrolyte obtained by additionally adding a solvent which is an organic compound having a low molecular weight or an oligomer, to a polymer.

The liquid electrolyte includes a solvent and a lithium salt.

The solvent includes at least one of an organic solvent, an ionic liquid, or an oligomer, but is not limited thereto, and any suitable solvent may be used as long as the solvent is a liquid at room temperature (25° C.).

The organic solvent includes, for example, at least one of an ether-based solvent, a carbonate-based solvent, an ester-based solvent, or a ketone-based solvent. The organic solvent includes, for example, at least one of propylene carbonate, ethylene carbonate, fluoroethylene carbonate, vinylethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyro lactone, dioxolane, 4-methyl dioxolane, dimethylacetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=–500), dimethyl ether, diethyl ether, dibutyl ether, dimethoxyethane, 2-methyltetrahydrofuran, or tetrahydrofuran, but is not limited thereto, and any suitable liquid organic solvent at room temperature may be used.

The ionic liquid (IL) includes, for example, i) at least one of an ammonium-based cation, a pyrrolidinium-based cation, a pyridinium-based cation, a pyridinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation, and ii) at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$ or $(CF_3SO_2)_2N^-$.

The lithium salt includes at least one of LiTFSI, $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$ or lithium trifluoromethanesulfonate (LiTfO), but is not limited thereto, and any suitable compound may be used as a lithium salt. The concentration of the lithium salt is, for example, about 0.01 M to about 5.0 M.

The lithium-air battery further includes, for example, a separator between the cathode and the anode. The separator is not limited as long as it has a composition enduring the range of use of a lithium-air battery. The separator includes, for example, a polymer non-woven fabric such as a non-woven fabric of a polypropylene material, and a non-woven fabric of a polyphenylene sulfide material, or a porous film of an olefin-based resin such as polyethylene and polypropylene, a glass fiber, and may include two or more thereof in combination.

The electrolyte layer has, for example, a structure in which a separator is impregnated with a solid polymer electrolyte, or a structure in which a separator is impregnated with a liquid electrolyte. The electrolyte layer in which a separator is impregnated with a solid polymer electrolyte is prepared by, for example, positioning solid polymer electrolyte films on one side and both sides of the separator, and then rolling them at the same time. The electrolyte layer in which a separator is impregnated with a liquid electrolyte is prepared by injecting a liquid electrolyte including a lithium salt into the separator.

The lithium-air battery is completed by positioning an anode at one side in a case, positioning an electrolyte layer on the anode, positioning a cathode on the electrolyte layer, positioning a porous cathode current collector on the cathode, positioning a pressing member on the porous cathode current collector so as to transfer air to an air electrode, and pressing the pressing member for fixing a cell. The case may be divided into an upper part making contact with a cathode and a lower part making contact with an anode, and an insulating resin is disposed between the upper part and the lower part to electrically insulate the cathode and the anode.

The lithium-air battery may be used in all kinds of primary batteries and secondary batteries. The shape of the lithium-air battery is not limited, and is, for example, a coin type, a button type, a sheet type, a stack type, a cylinder type, a flat type, or a cone type. The lithium-air battery may be a large-size battery that is used in electric vehicles.

Figure 8:
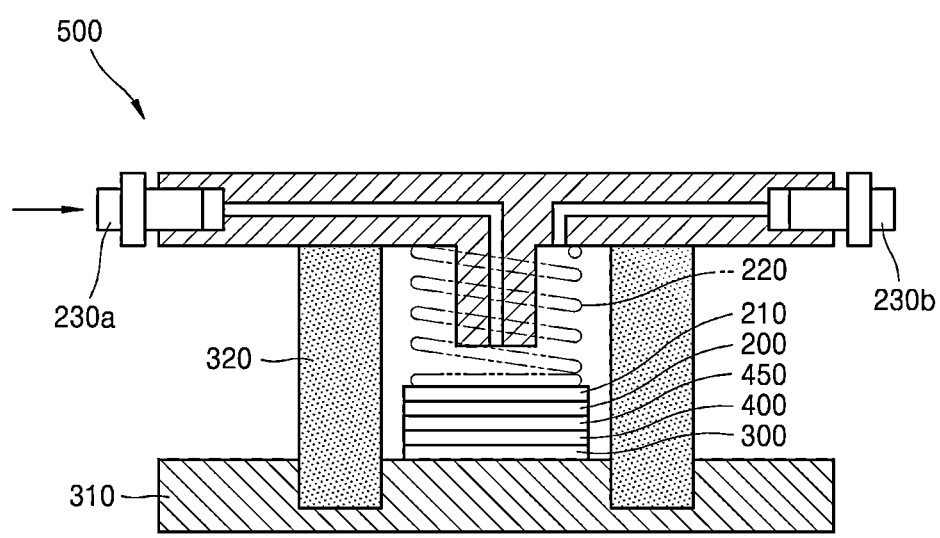
FIG. 8 is a schematic diagram showing the structure of a lithium-air battery.

An embodiment of the lithium-air battery is schematically shown in FIG. 8. A lithium-air battery 500 includes a first electrolyte layer 400 positioned between a cathode 200 using oxygen as an active material adjacent to a first current collector 210 and an anode 300 containing lithium, adjacent to a second current collector 310. The first electrolyte layer 400 is a separator impregnated with a liquid electrolyte. A second electrolyte layer 450 is positioned between the cathode 200 and the first electrolyte layer 400. The second electrolyte layer 450 is a lithium ion conductive solid electrolyte film. The first current collector 210 is porous and may play the role of a gas diffusion layer which is capable of diffusing air. Alternatively, a gas diffusing layer may be additionally positioned between the first current collector 210 and the cathode 200. On the first current collector 210, a pressing member 220 for transferring air to the cathode is positioned. A case 320 of an insulating resin material is disposed between the cathode 200 and the anode 300 to electrically separate the cathode 200 and the anode 300. Air is supplied through an air inlet 230*a* and discharged through an air outlet 230*b*. The lithium-air battery 500 may be contained in a stainless steel container.

The "air" of the lithium-air battery is not limited to air, but may include combinations of gases including oxygen, or a pure oxygen gas. The broad definition of the term "air" is applied to all uses, for example, air batteries or air electrodes.

The method of preparing a cathode according to an embodiment includes preparing a composition including a metal oxide and a binder; molding the composition to prepare a sheet; and heat-treating the sheet in an oxidizing atmosphere at about 900° C. to about 1,300° C.

The composition may include, for example, the lithium-containing metal oxide, a binder, a dispersant, and a plasticizer. The kinds and amounts of the binder, the dispersant, and the plasticizer are not specifically limited, and all used for forming a green sheet including ceramics in this technical field may be used. The binder may use, for example, polyvinyl butyral, polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, ethylene-propylene-diene terpolymer (EPDM), sulfonated EPDM, styrene butadiene rubber, or fluorine rubber.

The metal oxide may be, for example, a lithium-containing metal oxide.

Based on 100 parts by weight of the lithium-containing metal oxide, for example, about 5 parts by weight to about 20 parts by weight of the binder, about 1 part by weight to about 10 parts by weight of the dispersant, and about 1 part by weight to about 10 parts by weight of the plasticizer may be included. The composition may further include a solvent. The amount of the solvent may be, for example, about 1 part by weight to about 500 parts by weight based on 100 parts by weight of the solid content of the lithium-containing metal oxide, the binder, the dispersant, and the plasticizer. The solvent may be an alcohol such as ethanol or NMP. The amount of the solvent is controlled in order to dissolve or disperse each component constituting the composition.

The step of preparing the sheet by molding the composition may include, for example, applying the composition onto a base and drying the composition to prepare a coating layer; and stacking a plurality of the coating layers and laminating to prepare a sheet.

The composition may be disposed onto a base such as a releasing film, using a doctor-blade to a thickness of about 1 μm to about 1,000 μm, and then, dried to prepare the coating layer.

A plurality of coating layers positioned on the releasing film may be prepared, stacked so that the coating layers are oppositely positioned, and laminated to prepare a green sheet. The laminating may be performed by hot rolling with a constant pressure.

The heat-treatment of the green sheet thus prepared may be performed in an oxidizing atmosphere at about 500° C. to about 700° C. for about 1 hour to about 4 hours, and then in an oxidizing atmosphere at about 900° C. to about 1,300° C. for about 3 hours to about 10 hours.

By the heat-treatment performed in the oxidizing atmosphere at about 500° C. to about 700° C. for about 1 hour to about 4 hours, organic materials in the green sheet are stably decomposed and removed, and by the heat-treatment in the oxidizing atmosphere at about 900° C. to about 1,300° C. for about 3 hours to about 10 hours, a lithium-containing metal oxide powder is sintered to form a stable and firm porous film. A temperature elevation rate of the heat-treatment temperature during the heat-treating may be, for example, 5 degrees per minute, and cooling may be natural cooling.

The disclosure will be explained in more detail referring to examples and comparative examples hereinafter. However, the examples are for illustrating the disclosure, and the scope of the disclosure is not limited thereto.

EXAMPLES

Preparation of Lithium-Containing Metal Oxide

Preparation Example 1: Preparation of a Spinel Material of $Li_{4.5}Ti_{4.5}Nb_{0.5}O_{12-\delta}$ A lithium precursor, $Li_2CO_3$, a titanium precursor, $TiO_2$, and a Nb precursor, $Nb_2O_5$ were mixed in a stoichiometric ratio, and then ground and mixed using a ball mill including ethanol and zirconia balls in 280 rpm for 4 hours to prepare a mixture. The mixture thus obtained was dried at 90° C. for 6 hours, and first heat-treatment was performed in an air atmosphere at 700° C. for 5 hours. The resultant product of the first heat-treatment was ground using a ball mill and then, pressed under an isostatic pressure to prepare a pellet. A second heat-treatment was performed with respect to the pellet thus prepared in a reducing atmosphere at 950° C. for 24 hours to prepare a composite conductor. The reducing atmosphere was an atmosphere with 5% of hydrogen and 95% of argon. The composition of the lithium-containing metal oxide thus prepared was $Li_{4.5}Ti_{4.5}Nb_{0.5}O_{12-\delta}$ ($0 \leq \delta \leq 3$).

Preparation Example 2: Preparation of a Spinel Material of $Li_{3.5}Ti_{4.0}Nb_{1.0}O_{12-\delta}$ A composite conductor was prepared by the same method as in Preparation Example 1 except for the stoichiometric ratio of the lithium precursor, the titanium precursor and the Nb precursor was changed.

The composition of the lithium-containing metal oxide thus prepared was $Li_{3.5}Ti_{4.0}Nb_{1.0}O_{12-\delta}$ ($0 \leq \delta \leq 3$).

Preparation Example 3: Preparation of a Spinel Material of $Li_{3.5}Ti_{4.0}Ta_{1.0}O_{12-\delta}$ A composite conductor was prepared by the same method as in Preparation Example 1 except for using a Ta precursor, $Ta_2O_5$, instead of the Nb precursor and changing the stoichiometric ratio of the lithium precursor, the titanium precursor and the Ta precursor.

The composition of the lithium-containing metal oxide thus prepared was $Li_{3.5}Ti_{4.0}Ta_{1.0}O_{12-\delta}$ ($0 \leq \delta \leq 3$).

Preparation Example 4: Preparation of a Spinel Material of $Li_{4.5}Ti_{4.5}Gd_{0.5}O_{12-\delta}$ A composite conductor was prepared by the same method as in Preparation Example 1 except for using a Gd precursor, $Gd_2O_3$, instead of the Nb precursor.

The composition of the lithium-containing metal oxide thus prepared was $Li_{4.5}Ti_{4.5}Gd_{0.5}O_{12-\delta}$ ($0 \leq \delta \leq 3$).

Preparation Example 5: Preparation of a Spinel Material of $Li_{5.0}Ti_{4.0}Gd_{1.0}O_{12-\delta}$ A composite conductor was prepared by the same method as in Preparation Example 1 except for using a Gd precursor, $Gd_2O_3$, instead of the Nb precursor and the stoichiometric ratio of the lithium precursor, the titanium precursor and the Gd precursor was changed.

The composition of the lithium-containing metal oxide thus prepared was $Li_{5.0}Ti_{4.0}Gd_{1.0}O_{12-\delta}$ ($0\leq\delta\leq3$).

Preparation Example 6: Preparation of a Spinel Material of $Li_{4.5}Ti_{4.5}In_{0.5}O_{12-\delta}$ A composite conductor was prepared by the same method as in Preparation Example 1 except for using an In precursor, $In_2O_3$, instead of the Nb precursor.

The composition of the lithium-containing metal oxide thus prepared was $Li_{4.5}Ti_{4.5}Nb_{0.5}O_{12-\delta}$ ($0\leq\delta\leq3$).

Preparation Example 7: Preparation of a Spinel Material of $Li_{5.0}Ti_{4.0}In_{1.0}O_{12-\delta}$ A composite conductor was prepared by the same method as in Preparation Example 1 except for using an In precursor, $In_2O_3$, instead of the Nb precursor and the stoichiometric ratio of the lithium precursor, the titanium precursor and the In precursor was changed.

The composition of the lithium-containing metal oxide thus prepared was $Li_{5.0}Ti_{4.0}In_{1.0}O_{12-\delta}$ ($0\leq\delta\leq3$).

Preparation Example 8: Preparation of a Spinel Material of $Li_4Ti_5O_{12}$

A commercially purchased $Li_4Ti_5O_{12}$ was used as supplied.

Preparation Example 9: Preparation of a Perovskite Material of $Li_{0.34}La_{0.55}TiO_3$ $Li_2CO_3$, $La_2O_3$, and $TiO_2$ powders were added to ethanol according to the composition ratio of $Li_{0.34}La_{0.55}TiO_3$ and mixed. The amount of the ethanol was about 4 parts by weight based on 100 parts by weight of the total weight of the $Li_2CO_3$, $La_2O_3$, and $TiO_2$ powders.

The mixture was put in a ball-milling apparatus and ground and mixed for 4 hours. The resultant mixture was dried and heated in a temperature elevation ratio of about 5° C./min to 800° C., and then, first heat-treatment was performed at the same temperature under an air atmosphere for 4 hours.

The powder thus obtained by the first heat-treatment was ground to prepare a powder having a primary particle size of about 0.3 μm. The powder thus prepared was pressurized to form a cylindrical pellet having a diameter of about 1.3 cm, a height of about 0.5 cm, and a weight of about 0.3 g. A second heat-treatment was performed with respect to the pellet thus formed under an air atmosphere at a temperature of 1,100° C. for about 24 hours to obtain a target material. The temperature elevation rate for elevating the temperature to 1,100° C. for the second heat-treatment was about 5° C./min. The composition of the lithium-containing metal oxide thus prepared was $Li_{0.34}La_{0.55}TiO_3$.

Preparation Example 10: Preparation of a Perovskite Material of $Li_{0.34}La_{0.55}RuO_3$ A target material was obtained by performing the same procedure in Preparation Example 9 except for using $RuO_2$ instead of $TiO_2$ and performing the second heat-treatment at 1,200° C.

The composition of the lithium-containing metal oxide thus prepared was $Li_{0.34}La_{0.55}RuO_3$.

Preparation Example 11: Preparation of a Perovskite Material of $Li_{0.34}La_{0.55}MnO_3$ A target material was obtained by performing the same procedure in Preparation Example 9 except for using $MnO_2$ instead of $TiO_2$ and performing the second heat-treatment at 1,200° C.

The composition of the lithium-containing metal oxide thus prepared was $Li_{0.34}La_{0.55}MnO_3$.

Preparation Example 12: Preparation of a Perovskite Material of $Li_{0.34}La_{0.55}NiO_3$ A target material was obtained by performing the same procedure in Preparation Example 9 except for using $Ni(OH)_2$ instead of $TiO_2$ and performing the second heat-treatment at 1,200° C.

The composition of the lithium-containing metal oxide thus prepared was $Li_{0.34}La_{0.55}NiO_3$.

Preparation Example 13: Preparation of a Perovskite Material of $Li_{0.34}La_{0.55}CrO_3$ A target material was obtained by performing the same procedure in Preparation Example 9 except for using $Cr_2O_3$ instead of $TiO_2$ and performing the second heat-treatment at 1,200° C.

The composition of the lithium-containing metal oxide thus prepared was $Li_{0.34}La_{0.55}CrO_3$.

Preparation Example 14: Preparation of a Perovskite Material of $Li_{0.34}La_{0.55}IrO_3$ A target material was obtained by performing the same procedure in Preparation Example 9 except for using $IrO_2$ instead of $TiO_2$ and performing the second heat-treatment at 1,200° C.

The composition of the lithium-containing metal oxide thus prepared was $Li_{0.34}La_{0.55}IrO_3$.

Preparation Example 15: Preparation of a Perovskite Material of $Li_{0.34}La_{0.55}CoO_3$ A target material was obtained by performing the same procedure in Preparation Example 9 except for using $Co_2O_3$ instead of $TiO_2$ and performing the second heat-treatment at 1,200° C.

The composition of the lithium-containing metal oxide thus prepared was $Li_{0.34}La_{0.55}CoO_3$.

Preparation of Cathode

Example 1

$Li_{0.34}La_{0.55}RuO_3$ (hereinafter, LLRuO) prepared according to Preparation Example 10 was ground in a ball mill and a powder having a primary particle size of about 300 nm was obtained.

The lithium-containing metal oxide powder thus obtained, a polyvinyl butyral resin (Butvar B79: Eastman Co.) as a binder, a dispersant (DISPERBYK111, BYK-Chemie GmbH), and a plasticizer (di-n-butyl phthalate, DBP) were mixed in a weight ratio of 100:10:5:5, and ethanol was added thereto as a solvent and mixed to prepare a slurry. The slurry thus obtained was disposed on a releasing film to a thickness of 200 μm using a doctor-blade, dried in the air for 12 hours, and dried in a vacuum oven at 60° C. for 12 hours to prepare a coating layer.

The coating layer thus prepared was cut on the releasing film to a size of 7×7 mm², and two coating layers cut into such size were stacked so as to face each other and then laminated by hot-press at 100° C. for 15 minutes with 250 psi.

Then, the releasing film was removed to obtain a green sheet. The green sheet thus obtained was heat-treated in an air atmosphere at 600° C. for 2 hours and subsequently, heat-treated at 1,100° C. for 6 hours to prepare a cathode having a porous self-standing film type.

Figure 2:
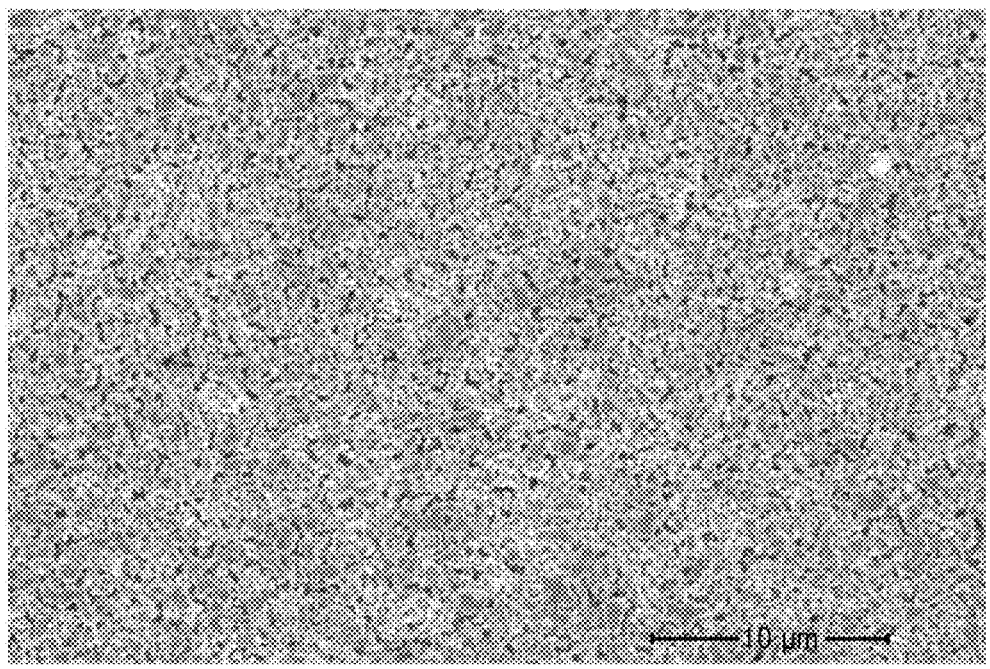
FIG. 2 is a scanning electron microscope image of a surface of a porous film formed in Example 1.
Figure 3:
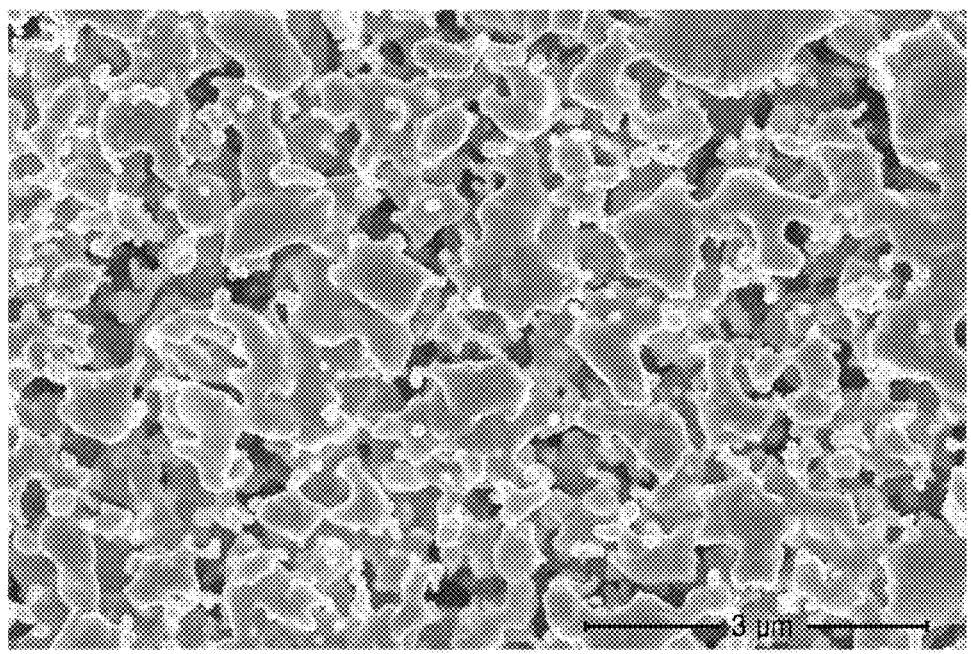
FIG. 3 is a scanning electron microscope image with increased resolution of a surface of a porous film formed in Example 1.

Scanning electron microscope images of the cross-section and surface of the porous self-standing film thus prepared are shown in FIG. 1 to FIG. 3.

The porosity and loading level of the porous self-standing film was calculated from the weight and thickness of the porous self-standing film thus prepared and the theoretical density of the lithium-containing metal oxide.

The weight (loading level) per unit area of the cathode, which was the porous self-standing film, was 5.22 mg/cm² and the thickness thereof was 27 μm.

The cathode thus prepared was a porous cathode including about 70 vol % of pores. The volume of the pores was 70% of the total volume of the cathode. The porosity of the cathode was 70%.

The pore size included in the cathode, measured from the SEM image of FIG. 3 was less than 1 μm.

Comparative Example 1

LLRuO prepared according to Preparation Example 10 was ground in a ball mill to obtain a powder having a primary particle size of about 300 nm.

The lithium-containing metal oxide powder thus obtained, a binder (Butvar B79: Eastman Co.), a dispersant (DISPERBYK111, BYK-Chemie GmbH), and a plasticizer (di-n-butyl phthalate, DBP) were mixed in a weight ratio of 100:10:5:5, and ethanol was added as a solvent and mixed to prepare a slurry. The slurry thus obtained was disposed on a releasing film to a thickness of 200 μm using a doctor-blade, dried in the air for 12 hours, and dried in a vacuum oven at 60° C. for 12 hours to prepare a coating layer.

The coating layer thus prepared was cut on the releasing film to a size of 7×7 mm², and transferred onto a lithium aluminum titanium phosphate (LATP) film (thickness of 250 μm, Ohara Corp., Japan), and then, dried in the air for 12 hours and dried in a vacuum oven at 60° C. for 12 hours to prepare a LATP/coating layer stacked body. The stacked body thus prepared was heated in an air atmosphere at 450° C. for 1 hour to prepare a LATP/cathode stacked body. The porosity of the cathode was less than 40%.

Manufacture of Lithium-Air Battery

Example 2: Manufacture of Lithium-Air Battery (Cathode/LATP/Electrolyte/Li Anode)

On a lithium metal foil anode, a separator (Celgard 3501) was positioned.

0.2 ml of an electrolyte in which 1 M of lithium bis(trifluoromethanesulfonyl)imide (LiTFSI) was dissolved in propylene carbonate (PC), was injected into the separator to prepare an anode intermediate layer.

An LATP solid electrolyte film (thickness of 250 μm, Ohara Corp., Japan) was disposed on the separator to prepare a lower structure composed of anode/anode intermediate layer/solid electrolyte layer.

The lower structure was covered with a pouch coated with aluminum on polyolefin. A window having a constant size was disposed on the pouch to expose the LATP solid electrolyte out of the pouch.

The cathode prepared in Example 1 was positioned on the LATP solid electrolyte exposed out of the pouch. Then, a gas diffusion layer (GDL, SGL Co., 25BC) was positioned on the cathode, a nickel mesh was positioned on the gas diffusion layer, and a pressing member for delivering air to the cathode was pressed to fix a cell, thereby preparing a lithium-air battery.

Comparative Example 2

A lithium-air battery was prepared by the same method as in Example 2 except for using the cathode/LATP stacked body prepared in Comparative Example 1 instead of the LATP solid electrolyte and cathode prepared in Example 1.

Evaluation Example 1: Evaluation of Electronic Conductivity

On both sides of the spinel compound pellets and the perovskite compound pellets prepared in Preparation Examples 1 to 15, Au was sputtered to complete an ion blocking cell. The electronic conductivity at 25° C. was measured using a DC polarization method.

A time dependent current obtained when applying a constant voltage of 100 mV for 30 minutes to a completed symmetric cell was measured. From the current measured, the electronic resistance of a composite conductor was calculated, and from this, the electronic conductivity was calculated. The electronic conductivity thus obtained is shown in Tables 1 and 2 below.

Evaluation Example 2: Evaluation of Ionic Conductivity

A separator layer impregnated with a liquid electrolyte (1M LiTFSI in PC) was positioned on both sides of the spinel compound pellets and the perovskite compound pellets prepared in Preparation Examples 1 to 15, and a stainless steel was positioned as a current collector on the electrolyte layer to complete an electron blocking cell. The ionic conductivity at 25° C. was measured using a DC polarization method.

A time dependent current obtained when applying a constant voltage of 100 mV for 30 minutes to a completed symmetric cell was measured. From the current measured, the ionic resistance of the cell was calculated, the ionic resistance of a composite conductor was calculated by subtracting the ionic resistance of the solid electrolyte layer from the ionic resistance of the cell, and from this, the ionic conductivity was calculated. The ionic conductivity thus obtained is shown in Tables 1 and 2 below.

TABLE 1

| | Composition | Electronic conductivity [S/cm] | Ionic conductivity [S/cm] |
| --- | --- | --- | --- |
| Preparation Example 1 | $Li_{4.5}Ti_{4.5}Nb_{0.5}O_{12-\delta}$ | $1.4 \times 10^{-3}$ | $4.7 \times 10^{-5}$ |
| Preparation Example 2 | $Li_{3.5}Ti_{4.0}Nb_{1.0}O_{12-\delta}$ | $3.5 \times 10^{-4}$ | $2.0 \times 10^{-7}$ |

TABLE 1-continued

|  | Composition | Electronic conductivity [S/cm] | Ionic conductivity [S/cm] |
|---|---|---|---|
| Preparation Example 3 | $Li_{3.5}Ti_{4.0}Ta_{1.0}O_{12-\delta}$ | $1.2 \times 10^{-4}$ | $1.8 \times 10^{-7}$ |
| Preparation Example 4 | $Li_{4.5}Ti_{4.5}Gd_{0.5}O_{12-\delta}$ | $2.1 \times 10^{-4}$ | $3.2 \times 10^{-7}$ |
| Preparation Example 5 | $Li_{5.0}Ti_{4.0}Gd_{1.0}O_{12-\delta}$ | $9.6 \times 10^{-6}$ | $5.1 \times 10^{-6}$ |
| Preparation Example 6 | $Li_{4.5}Ti_{4.5}In_{0.5}O_{12-\delta}$ | $7.4 \times 10^{-5}$ | $8.1 \times 10^{-7}$ |
| Preparation Example 7 | $Li_{5.0}Ti_{4.0}In_{1.0}O_{12-\delta}$ | $1.1 \times 10^{-5}$ | $2.9 \times 10^{-6}$ |
| Preparation Example 8 | $Li_4Ti_5O_{12}$ | $4.3 \times 10^{-9}$ | $6.8 \times 10^{-8}$ |

As shown in Table 1, the spinel compounds prepared in Preparation Examples 1 to 8 are crystalline ionic conductors providing an ionic conductivity of $1 \times 10^{-8}$ S/cm or more.

In addition, the spinel compounds of Preparation Examples 1 to 7 showed increased electronic conductivity and ionic conductivity at the same time when compared with the spinel compound of Preparation Example 8.

TABLE 2

|  | Composition | Electronic conductivity [S/cm] | Ionic conductivity [S/cm] |
|---|---|---|---|
| Preparation Example 9 | $Li_{0.34}La_{0.55}TiO_3$ | $3.8 \times 10^{-9}$ | $1.2 \times 10^{-5}$ |
| Preparation Example 10 | $Li_{0.34}La_{0.55}RuO_3$ | $5.6 \times 10^{-2}$ | $2.1 \times 10^{-5}$ |
| Preparation Example 11 | $Li_{0.34}La_{0.55}MnO_3$ | $2.0 \times 10^{-3}$ | $8.8 \times 10^{-5}$ |
| Preparation Example 12 | $Li_{0.34}La_{0.55}NiO_3$ | $2.8 \times 10^{-2}$ | $3.0 \times 10^{-6}$ |
| Preparation Example 13 | $Li_{0.34}La_{0.55}CrO_3$ | $2.6 \times 10^{-4}$ | $2.0 \times 10^{-6}$ |
| Preparation Example 14 | $Li_{0.34}La_{0.55}IrO_3$ | $4.3 \times 10^{-3}$ | $1.7 \times 10^{-5}$ |
| Preparation Example 15 | $Li_{0.34}La_{0.55}CoO_3$ | $4.5 \times 10^{-4}$ | $4.6 \times 10^{-6}$ |

As shown in Table 2, the perovskite compounds prepared in Preparation Examples 9 to 15 are crystalline ionic conductors providing an ionic conductivity of $1 \times 10^{-7}$ S/cm or more.

In addition, the perovskite compounds of Preparation Examples 10 to 15 showed markedly increased electronic conductivity when compared with the perovskite compound of Preparation Example 9.

Evaluation Example 3: Evaluation of XRD Spectrum

Figure 4:
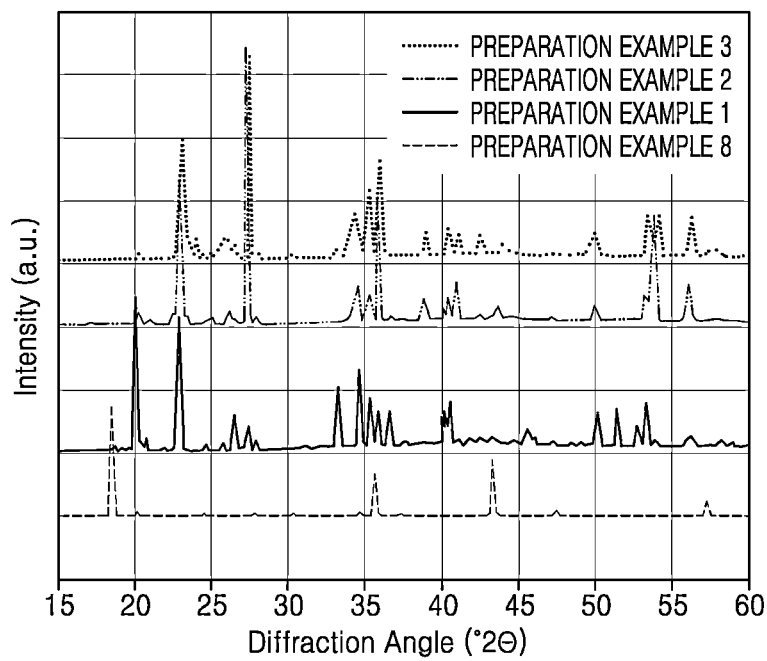
FIG. 4 is a graph of intensity in arbitrary units (a.u.) versus diffraction angle (°2θ) and shows the results of X-ray diffraction (XRD) analysis of spinel compounds prepared in Preparation Examples 1 to 4.

XRD spectrums on the spinel compounds of Preparation Examples 1, 2, 3 and 8 were measured, and the results are shown in FIG. 4. For the measurement of the XRD spectrum, Cu Kα radiation was used.

As shown in FIG. 4, $Li_4Ti_5O_{12}$ of Preparation Example 8 showed peaks corresponding to a spinel crystalline structure, and the spinel compounds of Preparation Examples 1 to 3 also showed similar spectrums as that of $Li_4Ti_5O_{12}$ of Preparation Example 8.

As shown in FIG. 4, the spinel compounds of Preparation Examples 1 to 3 showed novel peaks at the angle of diffraction of $2\theta=23.5°\pm2.5°$, and the intensity of such novel peaks (1b) was greater than the peak intensity to a (111) crystal face (1a).

That is, the spinel compounds of Preparation Examples 1 to 3 showed the peak intensity ratio (1a/1b) of the peak intensity to a (111) crystal face at a diffraction angle of $2\theta=18°\pm2.5°$ (1a) with respect to the peak intensity at a diffraction angle of $2\theta=23.5°\pm2.5°$ (1b) of 1 or less.

Figure 5:
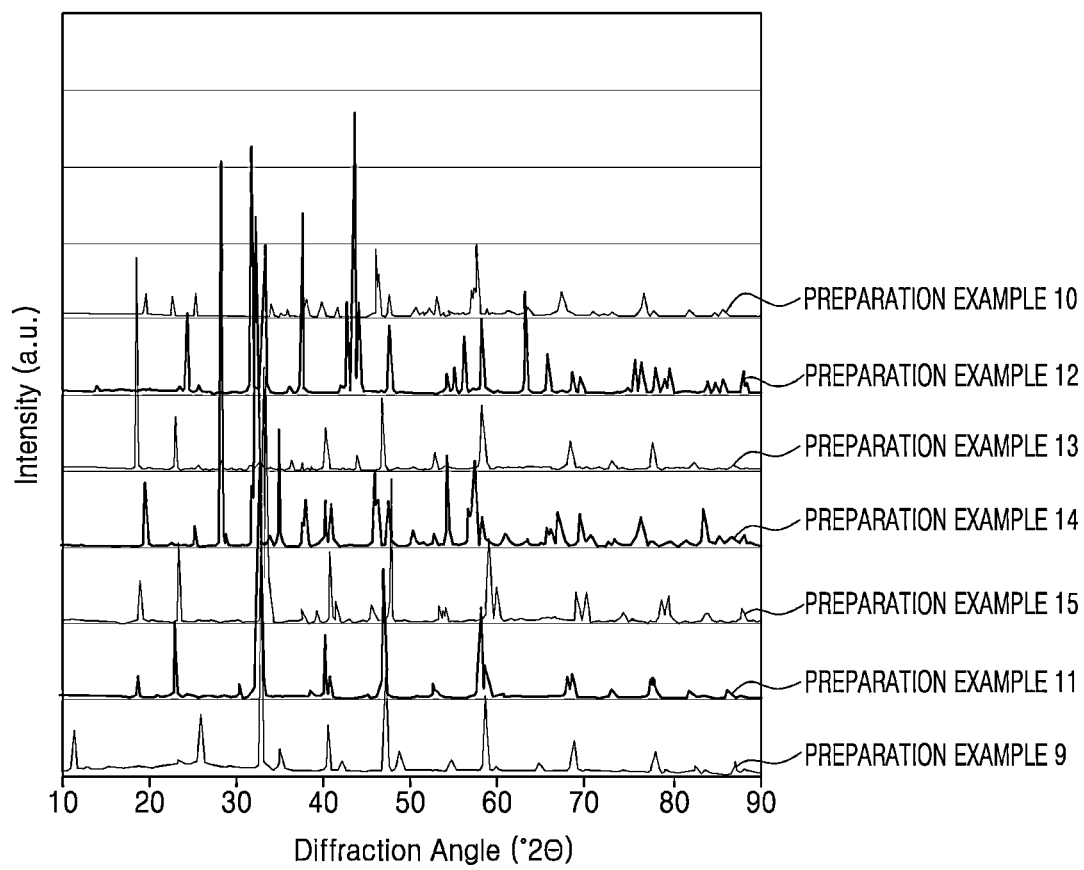
FIG. 5 is a graph of intensity in arbitrary units (a.u.) versus diffraction angle (°2θ) and shows the results of X-ray diffraction (XRD) analysis of perovskite compounds prepared in Preparation Examples 9 to 15.

X-ray spectrums on the perovskite compounds of Preparation Examples 9 to 15 were measured, and the results are shown in FIG. 5. For the measurement of the XRD spectrum, Cu Kα radiation was used.

As shown in FIG. 5, the perovskite compounds of Preparation Examples 9 to 15 showed peaks corresponding to a perovskite crystalline structure.

The intensity ratio ($I(46.5°\pm2.5°)/I(32.5°\pm2.5°)$) ($I_b/I_a$) of the peak intensity of the diffraction angle of $2\theta=32.5°\pm2.5°$ ($I(32.5°\pm2.5°)$: $I_a$) and the peak intensity of $2\theta=46.5°\pm2.5°$ ($I(46.5°\pm2.5°)$: $I_b$), and the ratio ($I(57.5°\pm2.5°(/I(32.5°\pm2.5°))$ ($I_c/I_a$) of the peak intensity of the diffraction angle of $2\theta=32.5°\pm2.5°$ ($I(32.5°\pm2.5°)$: $I_a$) and the peak intensity of $2\theta=57.5°\pm2.5°$ ($I(57.5°\pm2.5°)$: $I_c$) on the X-ray spectrums were measured and are shown in Table 3 below.

TABLE 3

|  | Composition | Intensity ratio $I_b/I_a$ | Intensity ratio $I_c/I_a$ |
|---|---|---|---|
| Preparation Example 9 | $Li_{0.34}La_{0.55}TiO_3$ | 0.3 | 0.3 |
| Preparation Example 10 | $Li_{0.34}La_{0.55}RuO_3$ | 0.2 | 0.2 |
| Preparation Example 11 | $Li_{0.34}La_{0.55}MnO_3$ | 0.5 | 0.4 |
| Preparation Example 12 | $Li_{0.34}La_{0.55}NiO_3$ | 0.3 | 0.3 |
| Preparation Example 13 | $Li_{0.34}La_{0.55}CrO_3$ | 0.3 | 0.3 |
| Preparation Example 14 | $Li_{0.34}La_{0.55}IrO_3$ | 0.2 | 0.3 |
| Preparation Example 15 | $Li_{0.34}La_{0.55}CoO_3$ | 0.6 | 0.3 |

As shown in FIG. 5, the perovskite compound of Preparation Example 9 showed a peak at a diffraction angle of $11.3\pm0.5°$, and the peak at a diffraction angle of $11.3\pm0.5°$ was not observed for the perovskite compounds of Preparation Examples of 10 to 15.

Evaluation Example 4: Thermal Gravimetric Analysis

Figure 6:
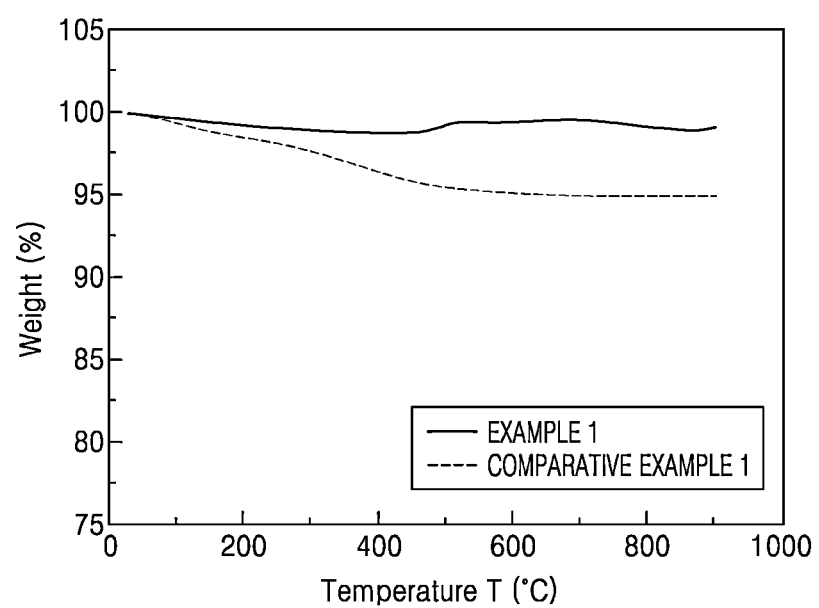
FIG. 6 is a graph of weight percent (%) versus temperature (° C.) and shows results of thermal gravimetric analysis (TGA) of cathodes prepared in Example 1 and Comparative Example 1.

For the porous self-standing film cathode prepared in Example 1 and the LATP/porous cathode stacked body prepared in Comparative Example 1, TGA was performed at about 25° C. to about 900° C., and the results are shown in FIG. 6 and Table 4 below.

The weight reduction percent is calculated from Equation 1. The weight reduction ratio corresponds to the amount of an organic component included in the cathode.

Weight reduction (%)=[(weight of cathode at 25° C.−weight of cathode at 900° C.)/weight of cathode at 25° C.]×100%      Equation 1

TABLE 4

|  | Weight reduction [%] |
|---|---|
| Example 1 | −0 |
| Comparative Example 1 | 4 |

As shown in Table 4 and FIG. 6, the cathode of Example 1 showed no significant weight change. Accordingly, it was confirmed that the cathode of Example 1 was a thermally stable porous inorganic film.

The cathode of Comparative Example 1 showed 4% of the weight reduction ratio. Accordingly, it was confirmed that the cathode of Comparative Example 1 included about 4 wt % of an organic component.

Accordingly, the cathode of Comparative Example 1 may show battery performance degradation by the side reactions due to the decomposition of the organic component during the charge and discharge processes of a battery when compared with the cathode of Example 1.

Evaluation Example 5: Evaluation of Charge and Discharge Characteristics of Lithium-Air Battery Charge and discharge were performed in an oxygen atmosphere at 40° C., 1 atm, and a relative humidity of 100%.

The charge and discharge cycle including discharge with a constant current of 0.06 mA/cm$^2$ to 2.0 V (vs. Li), charge with the same current to 4.5 V, and then, charge with a constant voltage until the current decreased to 0.006 mA/cm$^2$ at 4.5 V was performed once for the lithium-air battery prepared in Example 2 (chemical conversion step). Then, the lithium-air battery was discharged with a constant current of 0.3 mA/cm$^2$ to 2.0 V (vs. Li), charged with the same current to 4.5 V, and then charged with a constant voltage until the current decreased to 0.03 mA/cm$^2$ at 4.5 V, and this charge and discharge cycle was performed six times.

The cycle was cut off at the discharge capacity of 3.0 mAh/cm$^2$.

Figure 7:
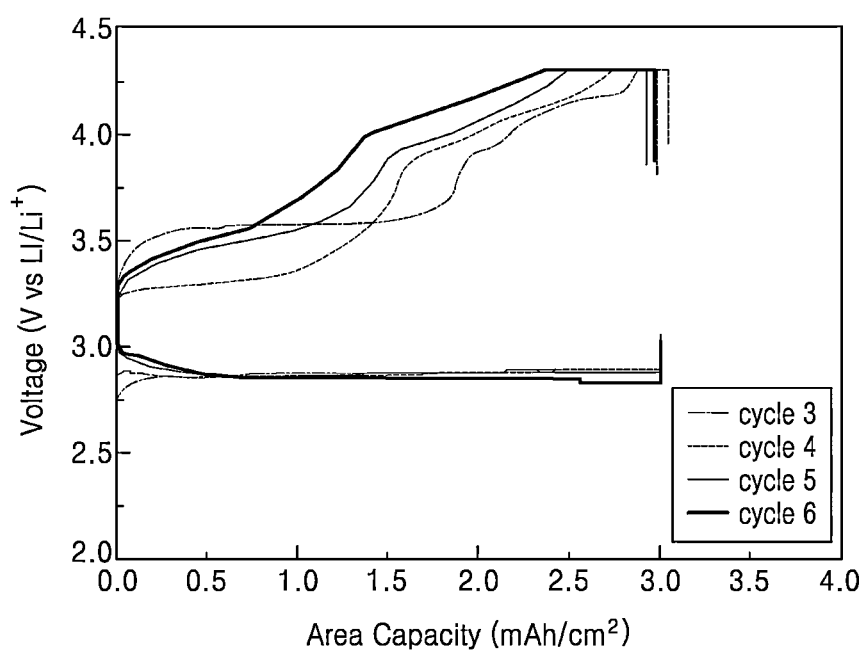
FIG. 7 is a graph of voltage (V vs Li/Li$^+$) versus areal capacity (milliampere hours per square centimeter (mAh/cm$^2$) and shows a charge and discharge profile of a lithium-air battery formed in Example 2.

The charge and discharge test results from the third cycle to the sixth cycle are shown in FIG. 7. As shown in FIG. 7, the lithium-air battery employing the cathode of the porous film structure with a porosity of 50% or more and prepared in Example 1 showed excellent cycle characteristics.

According to an aspect, the chemical stability of a cathode and a lithium-air battery is improved by including a porous film including a lithium-containing metal oxide and having the low organic component content.

It should be understood that embodiments described herein should be considered in a descriptive sense only and not for purposes of limitation. Descriptions of features, aspects, or advantages, within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A cathode configured to use oxygen as a cathode active material, the cathode comprising:
   a porous film comprising a metal oxide,
   wherein a porosity of the porous film is about 50 volume percent to about 95 volume percent, based on a total volume of the porous film, and
   an amount of an organic component in the porous film is 0 weight percent to about 2 weight percent, based on a total weight of the porous film,
   wherein a loading level of the porous film is about 4 milligrams per square centimeter to about 10 milligrams per square centimeter, and
   wherein the porous film is a self-standing film.

2. The cathode of claim 1, wherein the metal oxide comprises a lithium-containing metal oxide.

3. The cathode of claim 1, wherein the porous film is an inorganic film.

4. The cathode of claim 1, wherein a size of pores included in the porous film is from about 1 nanometer to about 1 micrometer.

5. The cathode of claim 2, wherein the lithium-containing metal oxide is a crystalline lithium ion conductor.

6. The cathode of claim 2, wherein the lithium-containing metal oxide is a crystalline electronic conductor.

7. The cathode of claim 2, wherein the lithium-containing metal oxide is a mixed conductor.

8. The cathode of claim 2, wherein the lithium-containing metal oxide comprises at least one of a perovskite compound or a spinel compound.

9. The cathode of claim 2, wherein the lithium-containing metal oxide comprises a perovskite compound represented by Formula 1:

$$Li_xA_yG_zO_{3-\delta} \quad \text{Formula 1}$$

wherein, in Formula 1,
A and G are each independently at least one of a Group 2 to a Group 16 element, and
$0<x<1$, $0<y<1$, $0<x+y\leq1$, $0<z\leq1.5$, $\delta$ is an oxygen vacancy content, and $0\leq\delta\leq1.5$.

10. The cathode of claim 9, wherein A is at least one of H, Na, K, Rb, Cs, Ca, Sr, Ba, Y, La, Ce, Pr, Nd, Pm, Sm, Gd, Tb, Dy, Ho, or Er,
G is at least one of Ti, Pd, Pb, Fe, Ir, Co, Rh, Mn, Cr, Ru, Re, Sn, V, Ge, W, Zr, Ti, Mo, Hf, U, Nb, Th, Ta, Bi, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and
$0.2<x\leq0.7$, $0<y\leq0.7$, $0<x+y<1$, $0<z\leq1.2$, and $0\leq\delta\leq1.2$.

11. The cathode of claim 9, wherein
A is at least one of La, Ce, Pr, Gd, Ca, Sr, or Ba,
M is at least one of Ti, Mn, Ni, Ru, Cr, Co, Ir, Fe, Pd, Pb, Rh, Sn, V, Re, Ge, W, Zr, Mo, Nb, Ta, Hf, or Bi, and
$0.2<x\leq0.5$, $0.4<y\leq0.7$, $0<x+y<1$, $0.8<z\leq1.2$, and $0\leq\delta\leq1.0$.

12. The cathode of claim 9, wherein the perovskite compound comprises at least one of $Li_{0.34}La_{0.55}TiO_{3-\delta}$ ($0\leq\delta\leq1.0$), $Li_{0.34}La_{0.55}MnO_{3-\delta}$ ($0\leq\delta\leq1.0$), $Li_{0.34}La_{0.55}NiO_{3-\delta}$ ($0\leq\delta\leq1.0$), $Li_{0.34}La_{0.55}CrO_{3-\delta}$ ($0\leq\delta\leq1.0$), $Li_{0.34}La_{0.55}CoO_{3-\delta}$ ($0\leq\delta\leq1.0$), $Li_{0.34}La_{0.55}IrO_{3-\delta}$ ($0\leq\delta\leq1.0$), $Li_{0.34}La_{0.55}RuO_{3-\delta}$ ($0\leq\delta\leq1.0$), $Li_{0.34}La_{0.55}FeO_{3-\delta}$ ($0\leq\delta\leq1.0$), $Li_{0.34}La_{0.55}PdO_{3-\delta}$ ($0\leq\delta\leq1.0$), $Li_{0.34}La_{0.55}PbO_{3-\delta}$ ($0\leq\delta\leq1.0$), $Li_{0.34}La_{0.55}RhO_{3-\delta}$ ($0\leq\delta\leq1.0$), $Li_{0.34}La_{0.55}SnO_{3-\delta}$ ($0\leq\delta\leq1.0$), $Li_{0.34}La_{0.55}VO_{3-\delta}$ ($0\leq\delta\leq1.0$), $Li_{0.34}La_{0.55}ReO_{3-\delta}$ ($0\leq\delta\leq1.0$), $Li_{0.34}La_{0.55}GeO_{3-\delta}$ ($0\leq\delta\leq1.0$), $Li_{0.34}La_{0.55}WO_{3-\delta}$ ($0\leq\delta\leq1.0$), $Li_{0.34}La_{0.55}ZrO_{3-\delta}$ ($0\leq\delta\leq1.0$), $Li_{0.34}La_{0.55}MoO_{3-\delta}$ ($0\leq\delta\leq1.0$), $Li_{0.34}La_{0.55}NbO_{3-\delta}$ ($0\leq\delta\leq1.0$), $Li_{0.34}La_{0.55}TaO_{3-\delta}$ ($0\leq\delta\leq1.0$), $Li_{0.34}La_{0.55}HfO_{3-\delta}$ ($0\leq\delta\leq1.0$), $Li_{0.34}La_{0.55}BiO_{3-\delta}$ ($0\leq\delta\leq1.0$),
$Li_{0.10}La_{0.63}TiO_{3-\delta}$ ($0\leq\delta\leq1.0$), $Li_{0.10}La_{0.63}MnO_{3-\delta}$ ($0\leq\delta\leq1.0$), $Li_{0.10}La_{0.63}NiO_{3-\delta}$ ($0\leq\delta\leq1.0$), $Li_{0.10}La_{0.63}CrO_{3-\delta}$ ($0\leq\delta\leq1.0$), $Li_{0.10}La_{0.63}CoO_{3-\delta}$ ($0\leq\delta\leq1.0$), $Li_{0.10}La_{0.63}IrO_{3-\delta}$ ($0\leq\delta\leq1.0$), $Li_{0.10}La_{0.63}RuO_{3-\delta}$ ($0\leq\delta\leq1.0$), $Li_{0.10}La_{0.63}FeO_{3-\delta}$ ($0\leq\delta\leq1.0$), $Li_{0.10}La_{0.63}PdO_{3-\delta}$ ($0\leq\delta\leq1.0$), $Li_{0.10}La_{0.63}PbO_{3-\delta}$ ($0\leq\delta\leq1.0$), $Li_{0.10}La_{0.63}RhO_{3-\delta}$ ($0\leq\delta\leq1.0$), $Li_{0.10}La_{0.63}SnO_{3-\delta}$ ($0\leq\delta\leq1.0$), $Li_{0.10}La_{0.63}VO_{3-\delta}$ ($0\leq\delta\leq1.0$), $Li_{0.10}La_{0.63}ReO_{3-\delta}$ ($0\leq\delta\leq1.0$), $Li_{0.10}La_{0.63}GeO_{3-\delta}$ ($0\leq\delta\leq1.0$), $Li_{0.10}La_{0.63}WO_{3-\delta}$ ($0\leq\delta\leq1.0$), $Li_{0.10}La_{0.63}ZrO_{3-\delta}$ ($0\leq $\delta \leq 1.0$), $Li_{0.10}La_{0.63}MoO_{3-\delta}$ ($0 \leq \delta \leq 1.0$), $Li_{0.10}La_{0.63}NbO_{3-\delta}$ ($0 \leq \delta \leq 1.0$), $Li_{0.10}La_{0.63}TaO_{3-\delta}$ ($0 \leq \delta \leq 1.0$), $Li_{0.10}La_{0.63}HfO_{3-\delta}$ ($0 \leq \delta \leq 1.0$), $Li_{0.10}La_{0.63}BiO_{3-\delta}$ ($0 \leq \delta \leq 1.0$), $Li_{0.20}La_{0.60}TiO_{3-\delta}$ ($0 \leq \delta \leq 1.0$), $Li_{0.20}La_{0.60}MnO_{3-\delta}$ ($0 \leq \delta \leq 1.0$), $Li_{0.20}La_{0.60}NiO_{3-\delta}$ ($0 \leq \delta \leq 1.0$), $Li_{0.20}La_{0.60}CrO_{3-\delta}$ ($0 \leq \delta \leq 1.0$), $Li_{0.20}La_{0.60}CoO_{3-\delta}$ ($0 \leq \delta \leq 1.0$), $Li_{0.20}La_{0.60}IrO_{3-\delta}$ ($0 \leq \delta \leq 1.0$), $Li_{0.20}La_{0.60}RuO_{3-\delta}$ ($0 \leq \delta \leq 1.0$), $Li_{0.20}La_{0.60}FeO_{3-\delta}$ ($0 \leq \delta \leq 1.0$), $Li_{0.20}La_{0.60}PdO_{3-\delta}$ ($0 \leq \delta \leq 1.0$), $Li_{0.20}La_{0.60}PbO_{3-\delta}$ ($0 \leq \delta \leq 1.0$), $Li_{0.20}La_{0.60}RhO_{3-\delta}$ ($0 \leq \delta \leq 1.0$), $Li_{0.20}La_{0.60}SnO_{3-\delta}$ ($0 \leq \delta \leq 1.0$), $Li_{0.20}La_{0.60}VO_{3-\delta}$ ($0 \leq \delta \leq 1.0$), $Li_{0.20}La_{0.60}ReO_{3-\delta}$ ($0 \leq \delta \leq 1.0$), $Li_{0.20}La_{0.60}GeO_{3-\delta}$ ($0 \leq \delta \leq 1.0$), $Li_{0.20}La_{0.60}WO_{3-\delta}$ ($0 \leq \delta \leq 1.0$), $Li_{0.20}La_{0.60}ZrO_{3-\delta}$ ($0 \leq \delta \leq 1.0$), $Li_{0.20}La_{0.60}MoO_{3-\delta}$ ($0 \leq \delta \leq 1.0$), $Li_{0.20}La_{0.60}NbO_{3-\delta}$ ($0 \leq \delta \leq 1.0$), $Li_{0.20}La_{0.60}TaO_{3-\delta}$ ($0 \leq \delta \leq 1.0$), $Li_{0.20}La_{0.60}HfO_{3-\delta}$ ($0 \leq \delta \leq 1.0$), $Li_{0.20}La_{0.60}BiO_{3-\delta}$ ($0 \leq \delta \leq 1.0$), $Li_{0.30}La_{0.57}TiO_{3-\delta}$ ($0 \leq \delta \leq 1.0$), $Li_{0.30}La_{0.57}MnO_{3-\delta}$ ($0 \leq \delta \leq 1.0$), $Li_{0.30}La_{0.57}NiO_{3-\delta}$ ($0 \leq \delta \leq 1.0$), $Li_{0.30}La_{0.57}CrO_{3-\delta}$ ($0 \leq \delta \leq 1.0$), $Li_{0.30}La_{0.57}CoO_{3-\delta}$ ($0 \leq \delta \leq 1.0$), $Li_{0.30}La_{0.57}IrO_{3-\delta}$ ($0 \leq \delta \leq 1.0$), $Li_{0.30}La_{0.57}RuO_{3-\delta}$ ($0 \leq \delta \leq 1.0$), $Li_{0.30}La_{0.57}FeO_{3-\delta}$ ($0 \leq \delta \leq 1.0$), $Li_{0.30}La_{0.57}PdO_{3-\delta}$ ($0 \leq \delta \leq 1.0$), $Li_{0.30}La_{0.57}PbO_{3-\delta}$ ($0 \leq \delta \leq 1.0$), $Li_{0.30}La_{0.57}RhO_{3-\delta}$ ($0 \leq \delta \leq 1.0$), $Li_{0.30}La_{0.57}SnO_{3-\delta}$ ($0 \leq \delta \leq 1.0$), $Li_{0.30}La_{0.57}VO_{3-\delta}$ ($0 \leq \delta \leq 1.0$), $Li_{0.30}La_{0.57}ReO_{3-\delta}$ ($0 \leq \delta \leq 1.0$), $Li_{0.30}La_{0.57}GeO_{3-\delta}$ ($0 \leq \delta \leq 1.0$), $Li_{0.30}La_{0.57}WO_{3-\delta}$ ($0 \leq \delta \leq 1.0$), $Li_{0.30}La_{0.57}ZrO_{3-\delta}$ ($0 \leq \delta \leq 1.0$), $Li_{0.30}La_{0.57}MoO_{3-\delta}$ ($0 \leq \delta \leq 1.0$), $Li_{0.30}La_{0.57}NbO_{3-\delta}$ ($0 \leq \delta \leq 1.0$), $Li_{0.30}La_{0.57}TaO_{3-\delta}$ ($0 \leq \delta \leq 1.0$), $Li_{0.30}La_{0.57}HfO_{3-\delta}$ ($0 \leq \delta \leq 1.0$), $Li_{0.30}La_{0.57}BiO_{3-\delta}$ ($0 \leq \delta \leq 1.0$), $Li_{0.40}La_{0.53}TiO_{3-\delta}$ ($0 \leq \delta \leq 1.0$), $Li_{0.40}La_{0.53}MnO_{3-\delta}$ ($0 \leq \delta \leq 1.0$), $Li_{0.40}La_{0.53}NiO_{3-\delta}$ ($0 \leq \delta \leq 1.0$), $Li_{0.40}La_{0.53}CrO_{3-\delta}$ ($0 \leq \delta \leq 1.0$), $Li_{0.40}La_{0.53}CoO_{3-\delta}$ ($0 \leq \delta \leq 1.0$), $Li_{0.40}La_{0.53}IrO_{3-\delta}$ ($0 \leq \delta \leq 1.0$), $Li_{0.40}La_{0.53}RuO_{3-\delta}$ ($0 \leq \delta \leq 1.0$), $Li_{0.40}La_{0.53}FeO_{3-\delta}$ ($0 \leq \delta \leq 1.0$), $Li_{0.40}La_{0.53}PdO_{3-\delta}$ ($0 \leq \delta \leq 1.0$), $Li_{0.40}La_{0.53}PbO_{3-\delta}$ ($0 \leq \delta \leq 1.0$), $Li_{0.40}La_{0.53}RhO_{3-\delta}$ ($0 \leq \delta \leq 1.0$), $Li_{0.40}La_{0.53}SnO_{3-\delta}$ ($0 \leq \delta \leq 1.0$), $Li_{0.40}La_{0.53}VO_{3-\delta}$ ($0 \leq \delta \leq 1.0$), $Li_{0.40}La_{0.53}ReO_{3-\delta}$ ($0 \leq \delta \leq 1.0$), $Li_{0.40}La_{0.53}GeO_{3-\delta}$ ($0 \leq \delta \leq 1.0$), $Li_{0.40}La_{0.53}WO_{3-\delta}$ ($0 \leq \delta \leq 1.0$), $Li_{0.40}La_{0.53}ZrO_{3-\delta}$ ($0 \leq \delta \leq 1.0$), $Li_{0.40}La_{0.53}MoO_{3-\delta}$ ($0 \leq \delta \leq 1.0$), $Li_{0.40}La_{0.53}NbO_{3-\delta}$ ($0 \leq \delta \leq 1.0$), $Li_{0.40}La_{0.53}TaO_{3-\delta}$ ($0 \leq \delta \leq 1.0$), $Li_{0.40}La_{0.53}HfO_{3-\delta}$ ($0 \leq \delta \leq 1.0$), $Li_{0.40}La_{0.53}BiO_{3-\delta}$ ($0 \leq \delta \leq 1.0$), $Li_{0.45}La_{0.52}TiO_{3-\delta}$ ($0 \leq \delta \leq 1.0$), $Li_{0.45}La_{0.52}MnO_{3-\delta}$ ($0 \leq \delta \leq 1.0$), $Li_{0.45}La_{0.52}NiO_{3-\delta}$ ($0 \leq \delta \leq 1.0$), $Li_{0.45}La_{0.52}CrO_{3-\delta}$ ($0 \leq \delta \leq 1.0$), $Li_{0.45}La_{0.52}CoO_{3-\delta}$ ($0 \leq \delta \leq 1.0$), $Li_{0.45}La_{0.52}IrO_{3-\delta}$ ($0 \leq \delta \leq 1.0$), $Li_{0.45}La_{0.52}RuO_{3-\delta}$ ($0 \leq \delta \leq 1.0$), $Li_{0.45}La_{0.52}FeO_{3-\delta}$ ($0 \leq \delta \leq 1.0$), $Li_{0.45}La_{0.52}PdO_{3-\delta}$ ($0 \leq \delta \leq 1.0$), $Li_{0.45}La_{0.52}PbO_{3-\delta}$ ($0 \leq \delta \leq 1.0$), $Li_{0.45}La_{0.52}RhO_{3-\delta}$ ($0 \leq \delta \leq 1.0$), $Li_{0.45}La_{0.52}SnO_{3-\delta}$ ($0 \leq \delta \leq 1.0$), $Li_{0.45}La_{0.52}VO_{3-\delta}$ ($0 \leq \delta \leq 1.0$), $Li_{0.45}La_{0.52}ReO_{3-\delta}$ ($0 \leq \delta \leq 1.0$), $Li_{0.45}La_{0.52}GeO_{3-\delta}$ ($0 \leq \delta \leq 1.0$), $Li_{0.45}La_{0.52}WO_{3-\delta}$ ($0 \leq \delta \leq 1.0$), $Li_{0.45}La_{0.52}ZrO_{3-\delta}$ ($0 \leq \delta \leq 1.0$), $Li_{0.45}La_{0.52}MoO_{3-\delta}$ ($0 \leq \delta \leq 1.0$), $Li_{0.45}La_{0.52}NbO_{3-\delta}$ ($0 \leq \delta \leq 1.0$), $Li_{0.45}La_{0.52}TaO_{3-\delta}$ ($0 \leq \delta \leq 1.0$), $Li_{0.45}La_{0.52}HfO_{3-\delta}$ ($0 \leq \delta \leq 1.0$), $Li_{0.45}La_{0.52}BiO_{3-\delta}$ ($0 \leq \delta \leq 1.0$), $Li_{0.34}Ce_{0.55}TiO_{3-\delta}$ ($0 \leq \delta \leq 1.0$), $Li_{0.34}Ce_{0.55}MnO_{3-\delta}$ ($0 \leq \delta \leq 1.0$), $Li_{0.34}Ce_{0.55}NiO_{3-\delta}$ ($0 \leq \delta \leq 1.0$), $Li_{0.34}Ce_{0.55}CrO_{3-\delta}$ ($0 \leq \delta \leq 1.0$), $Li_{0.34}Ce_{0.55}CoO_{3-\delta}$ ($0 \leq \delta \leq 1.0$), $Li_{0.34}Ce_{0.55}IrO_{3-\delta}$ ($0 \leq \delta \leq 1.0$), $Li_{0.34}Ce_{0.55}RuO_{3-\delta}$ ($0 \leq \delta \leq 1.0$), $Li_{0.34}Ce_{0.55}FeO_{3-\delta}$ ($0 \leq \delta \leq 1.0$), $Li_{0.34}Ce_{0.55}PdO_{3-\delta}$ ($0 \leq \delta \leq 1.0$), $Li_{0.34}Ce_{0.55}PbO_{3-\delta}$ ($0 \leq \delta \leq 1.0$), $Li_{0.34}Ce_{0.55}RhO_{3-\delta}$ ($0 \leq \delta \leq 1.0$), $Li_{0.34}Ce_{0.55}SnO_{3-\delta}$ ($0 \leq \delta \leq 1.0$), $Li_{0.34}Ce_{0.55}VO_{3-\delta}$ ($0 \leq \delta \leq 1.0$), $Li_{0.34}Ce_{0.55}ReO_{3-\delta}$ ($0 \leq \delta \leq 1.0$), $Li_{0.34}Ce_{0.55}GeO_{3-\delta}$ ($0 \leq \delta \leq 1.0$), $Li_{0.34}Ce_{0.55}WO_{3-\delta}$ ($0 \leq \delta \leq 1.0$), $Li_{0.34}Ce_{0.55}ZrO_{3-\delta}$ ($0 \leq \delta \leq 1.0$), $Li_{0.34}Ce_{0.55}MoO_{3-\delta}$ ($0 \leq \delta \leq 1.0$), $Li_{0.34}Ce_{0.55}NbO_{3-\delta}$ ($0 \leq \delta \leq 1.0$), $Li_{0.34}Ce_{0.55}TaO_{3-\delta}$ ($0 \leq \delta \leq 1.0$), $Li_{0.34}Ce_{0.55}HfO_{3-\delta}$ ($0 \leq \delta \leq 1.0$), $Li_{0.34}Ce_{0.55}BiO_{3-\delta}$ ($0 \leq \delta \leq 1.0$), $Li_{0.10}Ce_{0.63}TiO_{3-\delta}$ ($0 \leq \delta \leq 1.0$), $Li_{0.10}Ce_{0.63}MnO_{3-\delta}$ ($0 \leq \delta \leq 1.0$), $Li_{0.10}Ce_{0.63}NiO_{3-\delta}$ ($0 \leq \delta \leq 1.0$), $Li_{0.10}Ce_{0.63}CrO_{3-\delta}$ ($0 \leq \delta \leq 1.0$), $Li_{0.10}Ce_{0.63}CoO_{3-\delta}$ ($0 \leq \delta \leq 1.0$), $Li_{0.10}Ce_{0.63}IrO_{3-\delta}$ ($0 \leq \delta \leq 1.0$), $Li_{0.10}Ce_{0.63}RuO_{3-\delta}$ ($0 \leq \delta \leq 1.0$), $Li_{0.10}Ce_{0.63}FeO_{3-\delta}$ ($0 \leq \delta \leq 1.0$), $Li_{0.10}Ce_{0.63}PdO_{3-\delta}$ ($0 \leq \delta \leq 1.0$), $Li_{0.10}Ce_{0.63}PbO_{3-\delta}$ ($0 \leq \delta \leq 1.0$), $Li_{0.10}Ce_{0.63}RhO_{3-\delta}$ ($0 \leq \delta \leq 1.0$), $Li_{0.10}Ce_{0.63}SnO_{3-\delta}$ ($0 \leq \delta \leq 1.0$), $Li_{0.10}Ce_{0.63}VO_{3-\delta}$ ($0 \leq \delta \leq 1.0$), $Li_{0.10}Ce_{0.63}ReO_{3-\delta}$ ($0 \leq \delta \leq 1.0$), $Li_{0.10}Ce_{0.63}GeO_{3-\delta}$ ($0 \leq \delta \leq 1.0$), $Li_{0.10}Ce_{0.63}WO_{3-\delta}$ ($0 \leq \delta \leq 1.0$), $Li_{0.10}Ce_{0.63}ZrO_{3-\delta}$ ($0 \leq \delta \leq 1.0$), $Li_{0.10}Ce_{0.63}MoO_{3-\delta}$ ($0 \leq \delta \leq 1.0$), $Li_{0.10}Ce_{0.63}NbO_{3-\delta}$ ($0 \leq \delta \leq 1.0$), $Li_{0.10}Ce_{0.63}TaO_{3-\delta}$ ($0 \leq \delta \leq 1.0$), $Li_{0.10}Ce_{0.63}HfO_{3-\delta}$ ($0 \leq \delta \leq 1.0$), $Li_{0.10}Ce_{0.63}BiO_{3-\delta}$ ($0 \leq \delta \leq 1.0$), $Li_{0.20}Ce_{0.60}TiO_{3-\delta}$ ($0 \leq \delta \leq 1.0$), $Li_{0.20}Ce_{0.60}MnO_{3-\delta}$ ($0 \leq \delta \leq 1.0$), $Li_{0.20}Ce_{0.60}NiO_{3-\delta}$ ($0 \leq \delta \leq 1.0$), $Li_{0.20}Ce_{0.60}CrO_{3-\delta}$ ($0 \leq \delta \leq 1.0$), $Li_{0.20}Ce_{0.60}CoO_{3-\delta}$ ($0 \leq \delta \leq 1.0$), $Li_{0.20}Ce_{0.60}IrO_{3-\delta}$ ($0 \leq \delta \leq 1.0$), $Li_{0.20}Ce_{0.60}RuO_{3-\delta}$ ($0 \leq \delta \leq 1.0$), $Li_{0.20}Ce_{0.60}FeO_{3-\delta}$ ($0 \leq \delta \leq 1.0$), $Li_{0.20}Ce_{0.60}PdO_{3-\delta}$ ($0 \leq \delta \leq 1.0$), $Li_{0.20}Ce_{0.60}PbO_{3-\delta}$ ($0 \leq \delta \leq 1.0$), $Li_{0.20}Ce_{0.60}RhO_{3-\delta}$ ($0 \leq \delta \leq 1.0$), $Li_{0.20}Ce_{0.60}SnO_{3-\delta}$ ($0 \leq \delta \leq 1.0$), $Li_{0.20}Ce_{0.60}VO_{3-\delta}$ ($0 \leq \delta \leq 1.0$), $Li_{0.20}Ce_{0.60}ReO_{3-\delta}$ ($0 \leq \delta \leq 1.0$), $Li_{0.20}Ce_{0.60}GeO_{3-\delta}$ ($0 \leq \delta \leq 1.0$), $Li_{0.20}Ce_{0.60}WO_{3-\delta}$ ($0 \leq \delta \leq 1.0$), $Li_{0.20}Ce_{0.60}ZrO_{3-\delta}$ ($0 \leq \delta \leq 1.0$), $Li_{0.20}Ce_{0.60}MoO_{3-\delta}$ ($0 \leq \delta \leq 1.0$), $Li_{0.20}Ce_{0.60}NbO_{3-\delta}$ ($0 \leq \delta \leq 1.0$), $Li_{0.20}Ce_{0.60}TaO_{3-\delta}$ ($0 \leq \delta \leq 1.0$), $Li_{0.20}Ce_{0.60}HfO_{3-\delta}$ ($0 \leq \delta \leq 1.0$), $Li_{0.20}Ce_{0.60}BiO_{3-\delta}$ ($0 \leq \delta \leq 1.0$), $Li_{0.30}Ce_{0.57}TiO_{3-\delta}$ ($0 \leq \delta \leq 1.0$), $Li_{0.30}Ce_{0.57}MnO_{3-\delta}$ ($0 \leq \delta \leq 1.0$), $Li_{0.30}Ce_{0.57}NiO_{3-\delta}$ ($0 \leq \delta \leq 1.0$), $Li_{0.30}Ce_{0.57}CrO_{3-\delta}$ ($0 \leq \delta \leq 1.0$), $Li_{0.30}Ce_{0.57}CoO_{3-\delta}$ ($0 \leq \delta \leq 1.0$), $Li_{0.30}Ce_{0.57}IrO_{3-\delta}$ ($0 \leq \delta \leq 1.0$), $Li_{0.30}Ce_{0.57}RuO_{3-\delta}$ ($0 \leq \delta \leq 1.0$), $Li_{0.30}Ce_{0.57}FeO_{3-\delta}$ ($0 \leq \delta \leq 1.0$), $Li_{0.30}Ce_{0.57}PdO_{3-\delta}$ ($0 \leq \delta \leq 1.0$), $Li_{0.30}Ce_{0.57}PbO_{3-\delta}$ ($0 \leq \delta \leq 1.0$), $Li_{0.30}Ce_{0.57}RhO_{3-\delta}$ ($0 \leq \delta \leq 1.0$), $Li_{0.30}Ce_{0.57}SnO_{3-\delta}$ ($0 \leq \delta \leq 1.0$), $Li_{0.30}Ce_{0.57}VO_{3-\delta}$ ($0 \leq \delta \leq 1.0$), $Li_{0.30}Ce_{0.57}ReO_{3-\delta}$ ($0 \leq \delta \leq 1.0$), $Li_{0.30}Ce_{0.57}GeO_{3-\delta}$ ($0 \leq \delta \leq 1.0$), $Li_{0.30}Ce_{0.57}WO_{3-\delta}$ ($0 \leq \delta \leq 1.0$), $Li_{0.30}Ce_{0.57}ZrO_{3-\delta}$ ($0 \leq \delta \leq 1.0$), $Li_{0.30}Ce_{0.57}MoO_{3-\delta}$ ($0 \leq \delta \leq 1.0$), $Li_{0.30}Ce_{0.57}NbO_{3-\delta}$ ($0 \leq \delta \leq 1.0$), $Li_{0.30}Ce_{0.57}TaO_{3-\delta}$ ($0 \leq \delta \leq 1.0$), $Li_{0.30}Ce_{0.57}HfO_{3-\delta}$ ($0 \leq \delta \leq 1.0$), $Li_{0.30}Ce_{0.57}BiO_{3-\delta}$ ($0 \leq \delta \leq 1.0$), $Li_{0.40}Ce_{0.53}TiO_{3-\delta}$ ($0 \leq \delta \leq 1.0$), $Li_{0.40}Ce_{0.53}MnO_{3-\delta}$ ($0 \leq \delta \leq 1.0$), $Li_{0.40}Ce_{0.53}NiO_{3-\delta}$ ($0 \leq \delta \leq 1.0$), $Li_{0.40}Ce_{0.53}CrO_{3-\delta}$ ($0 \leq \delta \leq 1.0$), $Li_{0.40}Ce_{0.53}CoO_{3-\delta}$ ($0 \leq \delta \leq 1.0$), $Li_{0.40}Ce_{0.53}IrO_{3-\delta}$ ($0 \leq \delta \leq 1.0$), $Li_{0.40}Ce_{0.53}RuO_{3-\delta}$ ($0 \leq \delta \leq 1.0$), $Li_{0.40}Ce_{0.53}FeO_{3-\delta}$ ($0 \leq \delta \leq 1.0$), $Li_{0.40}Ce_{0.53}PdO_{3-\delta}$ ($0 \leq \delta \leq 1.0$), $Li_{0.40}Ce_{0.53}PbO_{3-\delta}$ ($0 \leq \delta \leq 1.0$), $Li_{0.40}Ce_{0.53}RhO_{3-\delta}$ ($0 \leq \delta \leq 1.0$), $Li_{0.40}Ce_{0.53}SnO_{3-\delta}$ ($0 \leq \delta \leq 1.0$), $Li_{0.40}Ce_{0.53}VO_{3-\delta}$ ($0 \leq \delta \leq 1.0$), $Li_{0.40}Ce_{0.53}ReO_{3-\delta}$ ($0 \leq \delta \leq 1.0$), $Li_{0.40}Ce_{0.53}GeO_{3-\delta}$ ($0 \leq \delta \leq 1.0$), Li$_{0.40}$Ce$_{0.53}$WO$_{3-\delta}$ (0≤δ ≤1.0), Li$_{0.40}$Ce$_{0.53}$ZrO$_{3-\delta}$ (0≤ δ ≤1.0), Li$_{0.40}$Ce$_{0.53}$MoO$_{3-\delta}$ (0≤δ ≤1.0), Li$_{0.40}$Ce$_{0.53}$NbO$_{3-\delta}$ (0≤δ ≤1.0), Li$_{0.40}$Ce$_{0.53}$TaO$_{3-\delta}$ (0≤δ ≤1.0), Li$_{0.40}$Ce$_{0.53}$HfO$_{3-\delta}$ (0≤δ ≤1.0), Li$_{0.40}$Ce$_{0.53}$BiO$_{3-\delta}$ (0≤δ ≤1.0),
Li$_{0.45}$Ce$_{0.52}$TiO$_{3-\delta}$ (0≤δ ≤1.0), Li$_{0.45}$Ce$_{0.52}$MnO$_{3-\delta}$ (0≤δ ≤1.0), Li$_{0.45}$Ce$_{0.52}$NiO$_{3-\delta}$ (0≤δ≤1.0), Li$_{0.45}$Ce$_{0.52}$CrO$_{3-\delta}$ (0≤δ ≤1.0), Li$_{0.45}$Ce$_{0.52}$CoO$_{3-\delta}$ (0≤δ ≤1.0), Li$_{0.45}$Ce$_{0.52}$IrO$_{3-\delta}$ (0≤δ ≤1.0), Li$_{0.45}$Ce$_{0.52}$RuO$_{3-\delta}$ (0≤δ ≤1.0), Li$_{0.45}$Ce$_{0.52}$FeO$_{3-\delta}$ (0≤δ ≤1.0), Li$_{0.45}$Ce$_{0.52}$PdO$_{3-\delta}$ (0≤δ ≤1.0), Li$_{0.45}$Ce$_{0.52}$PbO$_{3-\delta}$ (0≤δ ≤1.0), Li$_{0.45}$Ce$_{0.52}$RhO$_{3-\delta}$ (0≤δ ≤1.0), Li$_{0.45}$Ce$_{0.52}$SnO$_{3-\delta}$ (0≤δ ≤1.0), Li$_{0.45}$Ce$_{0.52}$VO$_{3-\delta}$ (0≤δ ≤1.0), Li$_{0.45}$Ce$_{0.52}$ReO$_{3-\delta}$ (0≤ δ ≤1.0), Li$_{0.45}$Ce$_{0.52}$GeO$_{3-\delta}$ (0≤δ ≤1.0), Li$_{0.45}$Ce$_{0.52}$WO$_{3-\delta}$ (0≤δ ≤1.0), Li$_{0.45}$Ce$_{0.52}$ZrO$_{3-\delta}$ (0≤ δ ≤1.0), Li$_{0.45}$Ce$_{0.52}$MoO$_{3-\delta}$ (0≤δ ≤1.0), Li$_{0.45}$Ce$_{0.52}$NbO$_{3-\delta}$ (0≤δ ≤1.0), Li$_{0.45}$Ce$_{0.52}$TaO$_{3-\delta}$ (0≤δ ≤1.0), Li$_{0.45}$Ce$_{0.52}$HfO$_{3-\delta}$ (0≤δ ≤1.0), Li$_{0.45}$Ce$_{0.52}$BiO$_{3-\delta}$ (0≤δ ≤1.0),
Li$_{0.34}$Pr$_{0.55}$TiO$_{3-\delta}$ (0≤δ ≤1.0), Li$_{0.34}$Pr$_{0.55}$MnO$_{3-\delta}$ (0≤ δ ≤1.0), Li$_{0.34}$Pr$_{0.55}$NiO$_{3-\delta}$ (0≤δ ≤1.0), Li$_{0.34}$Pr$_{0.55}$CrO$_{3-\delta}$ (0≤δ ≤1.0), Li$_{0.34}$Pr$_{0.55}$CoO$_{3-\delta}$ (0≤δ ≤1.0), Li$_{0.34}$Pr$_{0.55}$IrO$_{3-\delta}$ (0≤δ ≤1.0), Li$_{0.34}$Pr$_{0.55}$RuO$_{3-\delta}$ (0≤δ ≤1.0), Li$_{0.34}$Pr$_{0.55}$FeO$_{3-\delta}$ (0≤ δ ≤1.0), Li$_{0.34}$Pr$_{0.55}$PdO$_{3-\delta}$ (0≤δ ≤1.0), Li$_{0.34}$Pr$_{0.55}$PbO$_{3-\delta}$ (0≤δ ≤1.0), Li$_{0.34}$Pr$_{0.55}$RhO$_{3-\delta}$ (0≤ δ ≤1.0), Li$_{0.34}$Pr$_{0.55}$SnO$_{3-\delta}$ (0≤δ ≤1.0), Li$_{0.34}$Pr$_{0.55}$VO$_{3-\delta}$ (0≤δ ≤1.0), Li$_{0.34}$Pr$_{0.55}$ReO$_{3-\delta}$ (0≤ δ ≤1.0), Li$_{0.34}$Pr$_{0.55}$GeO$_{3-\delta}$ (0≤δ ≤1.0), Li$_{0.34}$Pr$_{0.55}$WO$_{3-\delta}$ (0≤δ ≤1.0), Li$_{0.34}$Pr$_{0.55}$ZrO$_{3-\delta}$ (0≤ δ ≤1.0), Li$_{0.34}$Pr$_{0.55}$MoO$_{3-\delta}$ (0≤δ ≤1.0), Li$_{0.34}$Pr$_{0.55}$NbO$_{3-\delta}$ (0≤δ ≤1.0), Li$_{0.34}$Pr$_{0.55}$TaO$_{3-\delta}$ (0≤ δ ≤1.0), Li$_{0.34}$Pr$_{0.55}$HfO$_{3-\delta}$ (0≤δ ≤1.0), Li$_{0.34}$Pr$_{0.55}$NbO$_{3-\delta}$ (0≤δ ≤1.0),
Li$_{0.10}$Pr$_{0.63}$TiO$_{3-\delta}$ (0≤δ ≤1.0), Li$_{0.10}$Pr$_{0.63}$MnO$_{3-\delta}$ (0≤ δ ≤1.0), Li$_{0.10}$Pr$_{0.63}$NiO$_{3-\delta}$ (0≤δ ≤1.0), Li$_{0.10}$Pr$_{0.63}$CrO$_{3-\delta}$ (0≤δ ≤1.0), Li$_{0.10}$Pr$_{0.63}$CoO$_{3-\delta}$ (0≤δ ≤1.0), Li$_{0.10}$Pr$_{0.63}$IrO$_{3-\delta}$ (0≤δ ≤1.0), Li$_{0.10}$Pr$_{0.63}$RuO$_{3-\delta}$ (0≤δ ≤1.0), Li$_{0.10}$Pr$_{0.63}$FeO$_{3-\delta}$ (0≤ δ ≤1.0), Li$_{0.10}$Pr$_{0.63}$PdO$_{3-\delta}$ (0≤δ ≤1.0), Li$_{0.10}$Pr$_{0.63}$PbO$_{3-\delta}$ (0≤δ ≤1.0), Li$_{0.10}$Pr$_{0.63}$RhO$_{3-\delta}$ (0≤ δ ≤1.0), Li$_{0.10}$Pr$_{0.63}$SnO$_{3-\delta}$ (0≤δ ≤1.0), Li$_{0.10}$Pr$_{0.63}$VO$_{3-\delta}$ (0≤δ ≤1.0), Li$_{0.10}$Pr$_{0.63}$ReO$_{3-\delta}$ (0≤ δ ≤1.0), Li$_{0.10}$Pr$_{0.63}$GeO$_{3-\delta}$ (0≤δ ≤1.0), Li$_{0.10}$Pr$_{0.63}$WO$_{3-\delta}$ (0≤δ ≤1.0), Li$_{0.10}$Pr$_{0.63}$ZrO$_{3-\delta}$ (0≤ δ ≤1.0), Li$_{0.10}$Pr$_{0.63}$MoO$_{3-\delta}$ (0≤δ ≤1.0), Li$_{0.10}$Pr$_{0.63}$NbO$_{3-\delta}$ (0≤δ ≤1.0), Li$_{0.10}$Pr$_{0.63}$TaO$_{3-\delta}$ (0≤ δ ≤1.0), Li$_{0.10}$Pr$_{0.63}$HfO$_{3-\delta}$ (0≤δ ≤1.0), Li$_{0.10}$Pr$_{0.63}$BiO$_{3-\delta}$ (0≤δ ≤1.0),
Li$_{0.20}$Pr$_{0.60}$TiO$_{3-\delta}$ (0≤δ ≤1.0), Li$_{0.20}$Pr$_{0.60}$MnO$_{3-\delta}$ (0≤ δ ≤1.0), Li$_{0.20}$Pr$_{0.60}$NiO$_{3-\delta}$ (0≤δ ≤1.0), Li$_{0.20}$Pr$_{0.60}$CrO$_{3-\delta}$ (0≤δ ≤1.0), Li$_{0.20}$Pr$_{0.60}$CoO$_{3-\delta}$ (0≤δ ≤1.0), Li$_{0.20}$Pr$_{0.60}$IrO$_{3-\delta}$ (0≤δ ≤1.0), Li$_{0.20}$Pr$_{0.60}$RuO$_{3-\delta}$ (0≤δ ≤1.0), Li$_{0.20}$Pr$_{0.60}$FeO$_{3-\delta}$ (0≤ δ ≤1.0), Li$_{0.20}$Pr$_{0.60}$PdO$_{3-\delta}$ (0≤δ ≤1.0), Li$_{0.20}$Pr$_{0.60}$PbO$_{3-\delta}$ (0≤δ ≤1.0), Li$_{0.20}$Pr$_{0.60}$RhO$_{3-\delta}$ (0≤ δ ≤1.0), Li$_{0.20}$Pr$_{0.60}$SnO$_{3-\delta}$ (0≤δ ≤1.0), Li$_{0.20}$Pr$_{0.60}$VO$_{3-\delta}$ (0≤δ ≤1.0), Li$_{0.20}$Pr$_{0.60}$ReO$_{3-\delta}$ (0≤ δ ≤1.0), Li$_{0.20}$Pr$_{0.60}$GeO$_{3-\delta}$ (0≤δ ≤1.0), Li$_{0.20}$Pr$_{0.60}$WO$_{3-\delta}$ (0≤δ ≤1.0), Li$_{0.20}$Pr$_{0.60}$ZrO$_{3-\delta}$ (0≤ δ ≤1.0), Li$_{0.20}$Pr$_{0.60}$MoO$_{3-\delta}$ (0≤δ ≤1.0), Li$_{0.20}$Pr$_{0.60}$NbO$_{3-\delta}$ (0≤δ ≤1.0), Li$_{0.20}$Pr$_{0.60}$TaO$_{3-\delta}$ (0≤ δ ≤1.0), Li$_{0.20}$Pr$_{0.60}$HfO$_{3-\delta}$ (0≤δ ≤1.0), Li$_{0.20}$Pr$_{0.60}$BiO$_{3-\delta}$ (0≤δ ≤1.0),
Li$_{0.30}$Pr$_{0.57}$TiO$_{3-\delta}$ (0≤δ ≤1.0), Li$_{0.30}$Pr$_{0.57}$MnO$_{3-\delta}$ (0≤ δ ≤1.0), Li$_{0.30}$Pr$_{0.57}$NiO$_{3-\delta}$ (0≤δ ≤1.0), Li$_{0.30}$Pr$_{0.57}$CrO$_{3-\delta}$ (0≤δ ≤1.0), Li$_{0.30}$Pr$_{0.57}$CoO$_{3-\delta}$ (0≤δ ≤1.0)$_3$, Li$_{0.30}$Pr$_{0.57}$IrO$_{3-\delta}$ (0≤δ ≤1.0), Li$_{0.30}$Pr$_{0.57}$RuO$_{3-\delta}$ (0≤δ ≤1.0), Li$_{0.30}$Pr$_{0.57}$FeO$_{3-\delta}$ (0≤ δ ≤1.0), Li$_{0.30}$Pr$_{0.57}$PdO$_{3-\delta}$ (0≤δ ≤1.0), Li$_{0.30}$Pr$_{0.57}$PbO$_{3-\delta}$ (0≤δ ≤1.0), Li$_{0.30}$Pr$_{0.57}$RhO$_{3-\delta}$ (0≤ δ ≤1.0), Li$_{0.30}$Pr$_{0.57}$SnO$_{3-\delta}$ (0≤δ ≤1.0), Li$_{0.30}$Pr$_{0.57}$VO$_{3-\delta}$ (0≤δ ≤1.0), Li$_{0.30}$Pr$_{0.57}$ReO$_{3-\delta}$ (0≤ δ ≤1.0), Li$_{0.30}$Pr$_{0.57}$GeO$_{3-\delta}$ (0≤δ ≤1.0), Li$_{0.30}$Pr$_{0.57}$WO$_{3-\delta}$ (0≤δ ≤1.0), Li$_{0.30}$Pr$_{0.57}$ZrO$_{3-\delta}$ (0≤ δ ≤1.0), Li$_{0.30}$Pr$_{0.57}$MoO$_{3-\delta}$ (0≤δ ≤1.0), Li$_{0.30}$Pr$_{0.57}$NbO$_{3-\delta}$ (0≤δ ≤1.0), Li$_{0.30}$Pr$_{0.57}$TaO$_{3-\delta}$ (0≤ δ ≤1.0), Li$_{0.30}$Pr$_{0.57}$HfO$_{3-\delta}$ (0≤δ ≤1.0), Li$_{0.30}$Pr$_{0.57}$BiO$_{3-\delta}$ (0≤δ ≤1.0),
Li$_{0.40}$Pr$_{0.53}$TiO$_{3-\delta}$ (0≤δ ≤1.0), Li$_{0.40}$Pr$_{0.53}$MnO$_{3-\delta}$ (0≤ δ ≤1.0), Li$_{0.40}$Pr$_{0.53}$NiO$_{3-\delta}$ (0≤δ ≤1.0), Li$_{0.40}$Pr$_{0.53}$CrO$_{3-\delta}$ (0≤δ ≤1.0), Li$_{0.40}$Pr$_{0.53}$CoO$_{3-\delta}$ (0≤δ ≤1.0), Li$_{0.40}$Pr$_{0.53}$IrO$_{3-\delta}$ (0≤δ ≤1.0), Li$_{0.40}$Pr$_{0.53}$RuO$_{3-\delta}$ (0≤δ ≤1.0), Li$_{0.40}$Pr$_{0.53}$FeO$_{3-\delta}$ (0≤ δ ≤1.0), Li$_{0.40}$Pr$_{0.53}$PdO$_{3-\delta}$ (0≤δ ≤1.0), Li$_{0.40}$Pr$_{0.53}$PbO$_{3-\delta}$ (0≤δ ≤1.0), Li$_{0.40}$Pr$_{0.53}$RhO$_{3-\delta}$ (0≤ δ ≤1.0), Li$_{0.40}$Pr$_{0.53}$SnO$_{3-\delta}$ (0≤δ ≤1.0), Li$_{0.40}$Pr$_{0.53}$VO$_{3-\delta}$ (0≤δ ≤1.0), Li$_{0.40}$Pr$_{0.53}$ReO$_{3-\delta}$ (0≤ δ ≤1.0), Li$_{0.40}$Pr$_{0.53}$GeO$_{3-\delta}$ (0≤δ ≤1.0), Li$_{0.40}$Pr$_{0.53}$WO$_{3-\delta}$ (0≤δ ≤1.0), Li$_{0.40}$Pr$_{0.53}$ZrO$_{3-\delta}$ (0≤ δ ≤1.0), Li$_{0.40}$Pr$_{0.53}$MoO$_{3-\delta}$ (0≤δ ≤1.0), Li$_{0.40}$Pr$_{0.53}$NbO$_{3-\delta}$ (0≤δ ≤1.0), Li$_{0.40}$Pr$_{0.53}$TaO$_{3-\delta}$ (0≤ δ ≤1.0), Li$_{0.40}$Pr$_{0.53}$HfO$_{3-\delta}$ (0≤δ ≤1.0), Li$_{0.40}$Pr$_{0.53}$BiO$_{3-\delta}$ (0≤δ ≤1.0),
Li$_{0.45}$Pr$_{0.52}$TiO$_{3-\delta}$ (0≤δ ≤1.0), Li$_{0.45}$Pr$_{0.52}$MnO$_{3-\delta}$ (0≤ δ ≤1.0), Li$_{0.45}$Pr$_{0.52}$NiO$_{3-\delta}$ (0≤δ ≤1.0), Li$_{0.45}$Pr$_{0.52}$CrO$_{3-\delta}$ (0≤δ ≤1.0), Li$_{0.45}$Pr$_{0.52}$CoO$_{3-\delta}$ (0≤δ ≤1.0), Li$_{0.45}$Pr$_{0.52}$IrO$_{3-\delta}$ (0≤δ ≤1.0), Li$_{0.45}$Pr$_{0.52}$RuO$_{3-\delta}$ (0≤δ ≤1.0), Li$_{0.45}$Pr$_{0.52}$FeO$_{3-\delta}$ (0≤ δ ≤1.0), Li$_{0.45}$Pr$_{0.52}$PdO$_{3-\delta}$ (0≤δ ≤1.0), Li$_{0.45}$Pr$_{0.52}$PbO$_{3-\delta}$ (0≤δ ≤1.0), Li$_{0.45}$Pr$_{0.52}$RhO$_{3-\delta}$ (0≤ δ ≤1.0), Li$_{0.45}$Pr$_{0.52}$SnO$_{3-\delta}$ (0≤δ ≤1.0), Li$_{0.45}$Pr$_{0.52}$VO$_{3-\delta}$ (0≤δ ≤1.0), Li$_{0.45}$Pr$_{0.52}$ReO$_{3-\delta}$ (0≤ δ ≤1.0), Li$_{0.45}$Pr$_{0.52}$GeO$_{3-\delta}$ (0≤δ ≤1.0), Li$_{0.45}$Pr$_{0.52}$WO$_{3-\delta}$ (0≤δ ≤1.0), Li$_{0.45}$Pr$_{0.52}$ZrO$_{3-\delta}$ (0≤ δ ≤1.0), Li$_{0.45}$Pr$_{0.52}$MoO$_{3-\delta}$ (0≤δ ≤1.0), Li$_{0.45}$Pr$_{0.52}$NbO$_{3-\delta}$ (0≤δ ≤1.0), Li$_{0.45}$Pr$_{0.52}$TaO$_{3-\delta}$ (0≤ δ ≤1.0), Li$_{0.45}$Pr$_{0.52}$HfO$_{3-\delta}$ (0≤δ ≤1.0), Li$_{0.45}$Pr$_{0.52}$BiO$_{3-\delta}$ (0≤δ ≤1.0),
Li$_{0.10}$Ca$_{0.80}$TiO$_{3-\delta}$ (0≤δ ≤1.0), Li$_{0.10}$Ca$_{0.80}$MnO$_{3-\delta}$ (0≤ δ ≤1.0), Li$_{0.10}$Ca$_{0.80}$NiO$_{3-\delta}$ (0≤δ ≤1.0), Li$_{0.10}$Ca$_{0.80}$CrO$_{3-\delta}$ (0≤δ ≤1.0), Li$_{0.10}$Ca$_{0.80}$CoO$_{3-\delta}$ (0≤δ ≤1.0), Li$_{0.10}$Ca$_{0.80}$IrO$_{3-\delta}$ (0≤δ ≤1.0), Li$_{0.10}$Ca$_{0.80}$RuO$_{3-\delta}$ (0≤δ ≤1.0), Li$_{0.10}$Ca$_{0.80}$FeO$_{3-\delta}$ (0≤δ ≤1.0), Li$_{0.10}$Ca$_{0.80}$PdO$_{3-\delta}$ (0≤δ ≤1.0), Li$_{0.10}$Ca$_{0.80}$PbO$_{3-\delta}$ (0≤δ ≤1.0), Li$_{0.10}$Ca$_{0.80}$RhO$_{3-\delta}$ (0≤δ ≤1.0), Li$_{0.10}$Ca$_{0.80}$SnO$_{3-\delta}$ (0≤δ ≤1.0), Li$_{0.10}$Ca$_{0.80}$VO$_{3-\delta}$ (0≤δ ≤1.0), Li$_{0.10}$Ca$_{0.80}$ReO$_{3-\delta}$ (0≤ δ ≤1.0), Li$_{0.10}$Ca$_{0.80}$GeO$_{3-\delta}$ (0≤δ ≤1.0), Li$_{0.10}$Ca$_{0.80}$WO$_{3-\delta}$ (0≤δ ≤1.0), Li$_{0.10}$Ca$_{0.80}$ZrO$_{3-\delta}$ (0≤ δ ≤1.0), Li$_{0.10}$Ca$_{0.80}$MoO$_{3-\delta}$ (0≤δ ≤1.0), Li$_{0.10}$Ca$_{0.80}$NbO$_{3-\delta}$ (0≤δ ≤1.0), Li$_{0.10}$Ca$_{0.80}$TaO$_{3-\delta}$ (0≤δ ≤1.0), Li$_{0.10}$Ca$_{0.80}$HfO$_{3-\delta}$ (0≤δ ≤1.0), Li$_{0.10}$Ca$_{0.80}$BiO$_{3-\delta}$ (0≤δ ≤1.0),
Li$_{0.20}$Ca$_{0.60}$TiO$_{3-\delta}$ (0≤δ ≤1.0), Li$_{0.20}$Ca$_{0.60}$MnO$_{3-\delta}$ (0≤ δ ≤1.0), Li$_{0.20}$Ca$_{0.60}$NiO$_{3-\delta}$ (0≤δ ≤1.0), Li$_{0.20}$Ca$_{0.60}$CrO$_{3-\delta}$ (0≤δ ≤1.0), Li$_{0.20}$Ca$_{0.60}$CoO$_{3-\delta}$ (0≤δ ≤1.0), Li$_{0.20}$Ca$_{0.60}$IrO$_{3-\delta}$ (0≤δ ≤1.0), Li$_{0.20}$Ca$_{0.60}$RuO$_{3-\delta}$ (0≤δ ≤1.0), Li$_{0.20}$Ca$_{0.60}$FeO$_{3-\delta}$ (0≤δ ≤1.0), Li$_{0.20}$Ca$_{0.60}$PdO$_{3-\delta}$ (0≤δ ≤1.0), Li$_{0.20}$Ca$_{0.60}$PbO$_{3-\delta}$ (0≤δ ≤1.0), Li$_{0.20}$Ca$_{0.60}$RhO$_{3-\delta}$ (0≤δ ≤1.0), Li$_{0.20}$Ca$_{0.60}$SnO$_{3-\delta}$ (0≤δ ≤1.0), Li$_{0.20}$Ca$_{0.60}$VO$_{3-\delta}$ (0≤δ ≤1.0), Li$_{0.20}$Ca$_{0.60}$ReO$_{3-\delta}$ (0≤

$\delta \leq 1.0$), $Li_{0.20}Ca_{0.60}GeO_{3-\delta}$ (0≤δ ≤1.0), $Li_{0.20}Ca_{0.60}WO_{3-\delta}$ (0≤δ ≤1.0), $Li_{0.20}Ca_{0.60}ZrO_{3-\delta}$ (0≤ δ ≤1.0), $Li_{0.20}Ca_{0.60}MoO_{3-\delta}$ (0≤δ ≤1.0), $Li_{0.20}Ca_{0.60}NbO_{3-\delta}$ (0≤δ ≤1.0), $Li_{0.20}Ca_{0.60}TaO_{3-\delta}$ (0≤δ ≤1.0), $Li_{0.20}Ca_{0.60}HfO_{3-\delta}$ (0≤δ ≤1.0), $Li_{0.20}Ca_{0.60}BiO_{3-\delta}$ (0≤δ ≤1.0), $Li_{0.25}Ca_{0.50}TiO_{3-\delta}$ (0≤δ ≤1.0), $Li_{0.25}Ca_{0.50}MnO_{3-\delta}$ (0≤δ ≤1.0), $Li_{0.25}Ca_{0.50}NiO_{3-\delta}$ (0≤δ≤1.0), $Li_{0.25}Ca_{0.50}CrO_{3-\delta}$ (0≤δ ≤1.0), $Li_{0.25}Ca_{0.50}CoO_{3-\delta}$ (0≤δ ≤1.0), $Li_{0.25}Ca_{0.50}IrO_{3-\delta}$ (0≤δ ≤1.0), $Li_{0.25}Ca_{0.50}RuO_{3-\delta}$ (0≤δ ≤1.0), $Li_{0.25}Ca_{0.50}FeO_{3-\delta}$ (0≤δ ≤1.0), $Li_{0.25}Ca_{0.50}PdO_{3-\delta}$ (0≤δ ≤1.0), $Li_{0.25}Ca_{0.50}PbO_{3-\delta}$ (0≤δ ≤1.0), $Li_{0.25}Ca_{0.50}RhO_{3-\delta}$ (0≤δ ≤1.0), $Li_{0.25}Ca_{0.50}SnO_{3-\delta}$ (0≤δ ≤1.0), $Li_{0.25}Ca_{0.50}VO_{3-\delta}$ (0≤δ ≤1.0), $Li_{0.25}Ca_{0.50}ReO_{3-\delta}$ (0≤δ ≤1.0), $Li_{0.25}Ca_{0.50}GeO_{3-\delta}$ (0≤δ ≤1.0), $Li_{0.25}Ca_{0.50}WO_{3-\delta}$ (0≤δ ≤1.0), $Li_{0.25}Ca_{0.50}ZrO_{3-\delta}$ (0≤δ ≤1.0), $Li_{0.25}Ca_{0.50}MoO_{3-\delta}$ (0≤δ ≤1.0), $Li_{0.25}Ca_{0.50}NbO_{3-\delta}$ (0≤δ ≤1.0), $Li_{0.25}Ca_{0.50}TaO_{3-\delta}$ (0≤δ ≤1.0), $Li_{0.25}Ca_{0.50}HfO_{3-\delta}$ (0≤δ ≤1.0), $Li_{0.25}Ca_{0.50}BiO_{3-\delta}$ (0≤δ ≤1.0), $Li_{0.30}Ca_{0.40}TiO_{3-\delta}$ (0≤δ ≤1.0), $Li_{0.30}Ca_{0.40}MnO_{3-\delta}$ (0≤δ ≤1.0), $Li_{0.30}Ca_{0.40}NiO_{3-\delta}$ (0≤δ≤1.0), $Li_{0.30}Ca_{0.40}CrO_{3-\delta}$ (0≤δ ≤1.0), $Li_{0.30}Ca_{0.40}CoO_{3-\delta}$ (0≤δ ≤1.0), $Li_{0.30}Ca_{0.40}IrO_{3-\delta}$ (0≤δ ≤1.0), $Li_{0.30}Ca_{0.40}RuO_{3-\delta}$ (0≤δ ≤1.0), $Li_{0.30}Ca_{0.40}FeO_{3-\delta}$ (0≤δ ≤1.0), $Li_{0.30}Ca_{0.40}PdO_{3-\delta}$ (0≤δ ≤1.0), $Li_{0.30}Ca_{0.40}PbO_{3-\delta}$ (0≤δ ≤1.0), $Li_{0.30}Ca_{0.40}RhO_{3-\delta}$ (0≤δ ≤1.0), $Li_{0.30}Ca_{0.40}SnO_{3-\delta}$ (0≤δ ≤1.0), $Li_{0.30}Ca_{0.40}VO_{3-\delta}$ (0≤δ ≤1.0), $Li_{0.30}Ca_{0.40}ReO_{3-\delta}$ (0≤δ ≤1.0), $Li_{0.30}Ca_{0.40}GeO_{3-\delta}$ (0≤δ ≤1.0), $Li_{0.30}Ca_{0.40}WO_{3-\delta}$ (0≤δ ≤1.0), $Li_{0.30}Ca_{0.40}ZrO_{3-\delta}$ (0≤δ ≤1.0), $Li_{0.30}Ca_{0.40}MoO_{3-\delta}$ (0≤δ ≤1.0), $Li_{0.30}Ca_{0.40}NbO_{3-\delta}$ (0≤δ ≤1.0), $Li_{0.30}Ca_{0.40}TaO_{3-\delta}$ (0≤δ ≤1.0), $Li_{0.30}Ca_{0.40}HfO_{3-\delta}$ (0≤δ ≤1.0), $Li_{0.30}Ca_{0.40}BiO_{3-\delta}$ (0≤δ ≤1.0), $Li_{0.40}Ca_{0.20}TiO_{3-\delta}$ (0≤δ ≤1.0), $Li_{0.40}Ca_{0.20}MnO_{3-\delta}$ (0≤δ ≤1.0), $Li_{0.40}Ca_{0.20}NiO_{3-\delta}$ (0≤δ≤1.0), $Li_{0.40}Ca_{0.20}CrO_{3-\delta}$ (0≤δ ≤1.0), $Li_{0.40}Ca_{0.20}CoO_{3-\delta}$ (0≤δ ≤1.0), $Li_{0.40}Ca_{0.20}IrO_{3-\delta}$ (0≤δ ≤1.0), $Li_{0.40}Ca_{0.20}RuO_{3-\delta}$ (0≤δ ≤1.0), $Li_{0.40}Ca_{0.20}FeO_{3-\delta}$ (0≤δ ≤1.0), $Li_{0.40}Ca_{0.20}PdO_{3-\delta}$ (0≤δ ≤1.0), $Li_{0.40}Ca_{0.20}PbO_{3-\delta}$ (0≤δ ≤1.0), $Li_{0.40}Ca_{0.20}RhO_{3-\delta}$ (0≤δ ≤1.0), $Li_{0.40}Ca_{0.20}SnO_{3-\delta}$ (0≤δ ≤1.0), $Li_{0.40}Ca_{0.20}VO_{3-\delta}$ (0≤δ ≤1.0), $Li_{0.40}Ca_{0.20}ReO_{3-\delta}$ (0≤δ ≤1.0), $Li_{0.40}Ca_{0.20}GeO_{3-\delta}$ (0≤δ ≤1.0), $Li_{0.40}Ca_{0.20}WO_{3-\delta}$ (0≤δ ≤1.0), $Li_{0.40}Ca_{0.20}ZrO_{3-\delta}$ (0≤δ ≤1.0), $Li_{0.40}Ca_{0.20}MoO_{3-\delta}$ (0≤δ ≤1.0), $Li_{0.40}Ca_{0.20}NbO_{3-\delta}$ (0≤δ ≤1.0), $Li_{0.40}Ca_{0.20}TaO_{3-\delta}$ (0≤δ ≤1.0), $Li_{0.40}Ca_{0.20}HfO_{3-\delta}$ (0≤δ ≤1.0), $Li_{0.40}Ca_{0.20}BiO_{3-\delta}$ (0≤δ ≤1.0), $Li_{0.10}Sr_{0.80}TiO_{3-\delta}$ (0≤δ ≤1.0), $Li_{0.10}Sr_{0.80}MnO_{3-\delta}$ (0≤δ ≤1.0), $Li_{0.10}Sr_{0.80}NiO_{3-\delta}$ (0≤δ ≤1.0), $Li_{0.10}Sr_{0.80}CrO_{3-\delta}$ (0≤δ ≤1.0), $Li_{0.10}Sr_{0.80}CoO_{3-\delta}$ (0≤δ ≤1.0), $Li_{0.10}Sr_{0.80}IrO_{3-\delta}$ (0≤δ ≤1.0), $Li_{0.10}Sr_{0.80}RuO_{3-\delta}$ (0≤δ ≤1.0), $Li_{0.10}Sr_{0.80}FeO_{3-\delta}$ (0≤δ ≤1.0), $Li_{0.10}Sr_{0.80}PdO_{3-\delta}$ (0≤δ ≤1.0), $Li_{0.10}Sr_{0.80}PbO_{3-\delta}$ (0≤δ ≤1.0), $Li_{0.10}Sr_{0.80}RhO_{3-\delta}$ (0≤δ ≤1.0), $Li_{0.10}Sr_{0.80}SnO_{3-\delta}$ (0≤δ ≤1.0), $Li_{0.10}Sr_{0.80}VO_{3-\delta}$ (0≤δ ≤1.0), $Li_{0.10}Sr_{0.80}ReO_{3-\delta}$ (0≤δ ≤1.0), $Li_{0.10}Sr_{0.80}GeO_{3-\delta}$ (0≤δ ≤1.0), $Li_{0.10}Sr_{0.80}WO_{3-\delta}$ (0≤δ ≤1.0), $Li_{0.10}Sr_{0.80}ZrO_{3-\delta}$ (0≤δ ≤1.0), $Li_{0.10}Sr_{0.80}MoO_{3-\delta}$ (0≤δ ≤1.0), $Li_{0.10}Sr_{0.80}NbO_{3-\delta}$ (0≤δ ≤1.0), $Li_{0.10}Sr_{0.80}TaO_{3-\delta}$ (0≤δ ≤1.0), $Li_{0.10}Sr_{0.80}HfO_{3-\delta}$ (0≤δ ≤1.0), $Li_{0.10}Sr_{0.80}BiO_{3-\delta}$ (0≤δ ≤1.0), $Li_{0.20}Sr_{0.60}TiO_{3-\delta}$ (0≤δ ≤1.0), $Li_{0.20}Sr_{0.60}MnO_{3-\delta}$ (0≤δ ≤1.0), $Li_{0.20}Sr_{0.60}NiO_{3-\delta}$ (0≤δ ≤1.0), $Li_{0.20}Sr_{0.60}CrO_{3-\delta}$ (0≤δ ≤1.0), $Li_{0.20}Sr_{0.60}CoO_{3-\delta}$ (0≤δ ≤1.0), $Li_{0.20}Sr_{0.60}IrO_{3-\delta}$ (0≤δ ≤1.0), $Li_{0.20}Sr_{0.60}RuO_{3-\delta}$ (0≤δ ≤1.0), $Li_{0.20}Sr_{0.60}FeO_{3-\delta}$ (0≤δ ≤1.0), $Li_{0.20}Sr_{0.60}PdO_{3-\delta}$ (0≤δ ≤1.0), $Li_{0.20}Sr_{0.60}PbO_{3-\delta}$ (0≤δ ≤1.0), $Li_{0.20}Sr_{0.60}RhO_{3-\delta}$ (0≤δ ≤1.0), $Li_{0.20}Sr_{0.60}SnO_{3-\delta}$ (0≤δ ≤1.0), $Li_{0.20}Sr_{0.60}VO_{3-\delta}$ (0≤δ ≤1.0), $Li_{0.20}Sr_{0.60}ReO_{3-\delta}$ (0≤δ ≤1.0), $Li_{0.20}Sr_{0.60}GeO_{3-\delta}$ (0≤δ ≤1.0), $Li_{0.20}Sr_{0.60}WO_{3-\delta}$ (0≤δ ≤1.0), $Li_{0.20}Sr_{0.60}ZrO_{3-\delta}$ (0≤δ ≤1.0), $Li_{0.20}Sr_{0.60}MoO_{3-\delta}$ (0≤δ ≤1.0), $Li_{0.20}Sr_{0.60}NbO_{3-\delta}$ (0≤δ ≤1.0), $Li_{0.20}Sr_{0.60}TaO_{3-\delta}$ (0≤δ ≤1.0), $Li_{0.20}Sr_{0.60}HfO_{3-\delta}$ (0≤δ ≤1.0), $Li_{0.20}Sr_{0.60}BiO_{3-\delta}$ (0≤δ ≤1.0), $Li_{0.25}Sr_{0.80}TiO_{3-\delta}$ (0≤δ ≤1.0), $Li_{0.25}Sr_{0.80}MnO_{3-\delta}$ (0≤δ ≤1.0), $Li_{0.25}Sr_{0.80}NiO_{3-\delta}$ (0≤δ ≤1.0), $Li_{0.25}Sr_{0.80}CrO_{3-\delta}$ (0≤δ ≤1.0), $Li_{0.25}Sr_{0.80}CoO_{3-\delta}$ (0≤δ ≤1.0), $Li_{0.25}Sr_{0.80}IrO_{3-\delta}$ (0≤δ ≤1.0), $Li_{0.25}Sr_{0.80}RuO_{3-\delta}$ (0≤δ ≤1.0), $Li_{0.25}Sr_{0.80}FeO_{3-\delta}$ (0≤δ ≤1.0), $Li_{0.25}Sr_{0.80}PdO_{3-\delta}$ (0≤δ ≤1.0), $Li_{0.25}Sr_{0.80}PbO_{3-\delta}$ (0≤δ ≤1.0), $Li_{0.25}Sr_{0.80}RhO_{3-\delta}$ (0≤δ ≤1.0), $Li_{0.25}Sr_{0.80}SnO_{3-\delta}$ (0≤δ ≤1.0), $Li_{0.25}Sr_{0.50}VO_{3-\delta}$ (0≤δ ≤1.0), $Li_{0.25}Sr_{0.80}ReO_{3-\delta}$ (0≤δ ≤1.0), $Li_{0.25}Sr_{0.80}GeO_{3-\delta}$ (0≤δ ≤1.0), $Li_{0.25}Sr_{0.80}WO_{3-\delta}$ (0≤δ ≤1.0), $Li_{0.25}Sr_{0.80}ZrO_{3-\delta}$ (0≤δ ≤1.0), $Li_{0.25}Sr_{0.80}MoO_{3-\delta}$ (0≤δ ≤1.0), $Li_{0.25}Sr_{0.80}NbO_{3-\delta}$ (0≤δ ≤1.0), $Li_{0.25}Sr_{0.80}TaO_{3-\delta}$ (0≤δ ≤1.0), $Li_{0.25}Sr_{0.50}HfO_{3-\delta}$ (0≤δ ≤1.0), $Li_{0.25}Sr_{0.50}BiO_{3-\delta}$ (0≤δ ≤1.0), $Li_{0.30}Sr_{0.40}TiO_{3-\delta}$ (0≤δ ≤1.0), $Li_{0.30}Sr_{0.40}MnO_{3-\delta}$ (0≤δ ≤1.0), $Li_{0.30}Sr_{0.40}NiO_{3-\delta}$ (0≤δ ≤1.0), $Li_{0.30}Sr_{0.40}CrO_{3-\delta}$ (0≤δ ≤1.0), $Li_{0.30}Sr_{0.40}CoO_{3-\delta}$ (0≤δ ≤1.0), $Li_{0.30}Sr_{0.40}IrO_{3-\delta}$ (0≤δ ≤1.0), $Li_{0.30}Sr_{0.40}RuO_{3-\delta}$ (0≤δ ≤1.0), $Li_{0.30}Sr_{0.40}FeO_{3-\delta}$ (0≤δ ≤1.0), $Li_{0.30}Sr_{0.40}PdO_{3-\delta}$ (0≤δ ≤1.0), $Li_{0.30}Sr_{0.40}PbO_{3-\delta}$ (0≤δ ≤1.0), $Li_{0.30}Sr_{0.40}RhO_{3-\delta}$ (0≤δ ≤1.0), $Li_{0.30}Sr_{0.40}SnO_{3-\delta}$ (0≤δ ≤1.0), $Li_{0.30}Sr_{0.40}VO_{3-\delta}$ (0≤δ ≤1.0), $Li_{0.30}Sr_{0.40}ReO_{3-\delta}$ (0≤δ ≤1.0), $Li_{0.30}Sr_{0.40}GeO_{3-\delta}$ (0≤δ ≤1.0), $Li_{0.30}Sr_{0.40}WO_{3-\delta}$ (0≤δ ≤1.0), $Li_{0.30}Sr_{0.40}ZrO_{3-\delta}$ (0≤δ ≤1.0), $Li_{0.30}Sr_{0.40}MoO_{3-\delta}$ (0≤δ ≤1.0), $Li_{0.30}Sr_{0.40}NbO_{3-\delta}$ (0≤δ ≤1.0), $Li_{0.30}Sr_{0.40}TaO_{3-\delta}$ (0≤δ ≤1.0), $Li_{0.30}Sr_{0.40}HfO_{3-\delta}$ (0≤δ ≤1.0), $Li_{0.30}Sr_{0.40}BiO_{3-\delta}$ (0≤δ ≤1.0), $Li_{0.40}Sr_{0.20}TiO_{3-\delta}$ (0≤δ ≤1.0), $Li_{0.40}Sr_{0.20}MnO_{3-\delta}$ (0≤δ ≤1.0), $Li_{0.40}Sr_{0.20}NiO_{3-\delta}$ (0≤δ ≤1.0), $Li_{0.40}Sr_{0.20}CrO_{3-\delta}$ (0≤δ ≤1.0), $Li_{0.40}Sr_{0.20}CoO_{3-\delta}$ (0≤δ ≤1.0), $Li_{0.40}Sr_{0.20}IrO_{3-\delta}$ (0≤δ ≤1.0), $Li_{0.40}Sr_{0.20}RuO_{3-\delta}$ (0≤δ ≤1.0), $Li_{0.40}Sr_{0.20}FeO_{3-\delta}$ (0≤δ ≤1.0), $Li_{0.40}Sr_{0.20}PdO_{3-\delta}$ (0≤δ ≤1.0), $Li_{0.40}Sr_{0.20}PbO_{3-\delta}$ (0≤δ ≤1.0), $Li_{0.40}Sr_{0.20}RhO_{3-\delta}$ (0≤δ ≤1.0), $Li_{0.40}Sr_{0.20}SnO_{3-\delta}$ (0≤δ ≤1.0), $Li_{0.40}Sr_{0.20}VO_{3-\delta}$ (0≤δ ≤1.0), $Li_{0.40}Sr_{0.20}ReO_{3-\delta}$ (0≤δ ≤1.0), $Li_{0.40}Sr_{0.20}GeO_{3-\delta}$ (0≤δ ≤1.0), $Li_{0.40}Sr_{0.20}WO_{3-\delta}$ (0≤δ ≤1.0), $Li_{0.40}Sr_{0.20}ZrO_{3-\delta}$ (0≤δ ≤1.0), $Li_{0.40}Sr_{0.20}MoO_{3-\delta}$ (0≤δ ≤1.0), $Li_{0.40}Sr_{0.20}NbO_{3-\delta}$ (0≤δ ≤1.0), $Li_{0.40}Sr_{0.20}TaO_{3-\delta}$ (0≤δ ≤1.0), $Li_{0.40}Sr_{0.20}HfO_{3-\delta}$ (0≤δ ≤1.0), $Li_{0.40}Sr_{0.20}BiO_{3-\delta}$ (0≤δ ≤1.0), $Li_{0.10}Ba_{0.80}TiO_{3-\delta}$ (0≤δ ≤1.0), $Li_{0.10}Ba_{0.80}MnO_{3-\delta}$ (0≤δ ≤1.0), $Li_{0.10}Ba_{0.80}NiO_{3-\delta}$ (0≤δ≤1.0), $Li_{0.10}Ba_{0.80}CrO_{3-\delta}$ (0≤δ ≤1.0), $Li_{0.10}Ba_{0.80}CoO_{3-\delta}$ (0≤δ ≤1.0), $Li_{0.10}Ba_{0.80}IrO_{3-\delta}$ (0≤δ ≤1.0), $Li_{0.10}Ba_{0.80}RuO_{3-\delta}$ (0≤δ ≤1.0), $Li_{0.10}Ba_{0.80}FeO_{3-\delta}$ (0≤δ ≤1.0), $Li_{0.10}Ba_{0.80}PdO_{3-\delta}$ (0≤δ ≤1.0), $Li_{0.10}Ba_{0.80}PbO_{3-\delta}$ (0≤δ ≤1.0), $Li_{0.10}Ba_{0.80}RhO_{3-\delta}$ $(0\leq\delta\leq1.0)$, $Li_{0.10}Ba_{0.80}SnO_{3-\delta}$ $(0\leq\delta\leq1.0)$, $Li_{0.10}Ba_{0.80}VO_{3-\delta}$ $(0\leq\delta\leq1.0)$, $Li_{0.10}Ba_{0.80}ReO_{3-\delta}$ $(0\leq\delta\leq1.0)$, $Li_{0.10}Ba_{0.80}GeO_{3-\delta}$ $(0\leq\delta\leq1.0)$, $Li_{0.10}Ba_{0.80}WO_{3-\delta}$ $(0\leq\delta\leq1.0)$, $Li_{0.10}Ba_{0.80}ZrO_{3-\delta}$ $(0\leq\delta\leq1.0)$, $Li_{0.10}Ba_{0.80}MoO_{3-\delta}$ $(0\leq\delta\leq1.0)$, $Li_{0.10}Ba_{0.80}NbO_{3-\delta}$ $(0\leq\delta\leq1.0)$, $Li_{0.10}Ba_{0.80}TaO_{3-\delta}$ $(0\leq\delta\leq1.0)$, $Li_{0.10}Ba_{0.80}HfO_{3-\delta}$ $(0\leq\delta\leq1.0)$, $Li_{0.10}Ba_{0.80}BiO_{3-\delta}$ $(0\leq\delta\leq1.0)$, $Li_{0.20}Ba_{0.60}TiO_{3-\delta}$ $(0\leq\delta\leq1.0)$, $Li_{0.20}Ba_{0.60}MnO_{3-\delta}$ $(0\leq\delta\leq1.0)$, $Li_{0.20}Ba_{0.60}NiO_{3-\delta}$ $(0\leq\delta\leq1.0)$, $Li_{0.20}Ba_{0.60}CrO_{3-\delta}$ $(0\leq\delta\leq1.0)$, $Li_{0.20}Ba_{0.60}CoO_{3-\delta}$ $(0\leq\delta\leq1.0)$, $Li_{0.20}Ba_{0.60}IrO_{3-\delta}$ $(0\leq\delta\leq1.0)$, $Li_{0.20}Ba_{0.60}RuO_{3-\delta}$ $(0\leq\delta\leq1.0)$, $Li_{0.20}Ba_{0.60}FeO_{3-\delta}$ $(0\leq\delta\leq1.0)$, $Li_{0.20}Ba_{0.60}PdO_{3-\delta}$ $(0\leq\delta\leq1.0)$, $Li_{0.20}Ba_{0.60}PbO_{3-\delta}$ $(0\leq\delta\leq1.0)$, $Li_{0.20}Ba_{0.60}RhO_{3-\delta}$ $(0\leq\delta\leq1.0)$, $Li_{0.20}Ba_{0.60}SnO_{3-\delta}$ $(0\leq\delta\leq1.0)$, $Li_{0.20}Ba_{0.60}VO_{3-\delta}$ $(0\leq\delta\leq1.0)$, $Li_{0.20}Ba_{0.60}ReO_{3-\delta}$ $(0\leq\delta\leq1.0)$, $Li_{0.20}Ba_{0.60}GeO_{3-\delta}$ $(0\leq\delta\leq1.0)$, $Li_{0.20}Ba_{0.60}WO_{3-\delta}$ $(0\leq\delta\leq1.0)$, $Li_{0.20}Ba_{0.60}ZrO_{3-\delta}$ $(0\leq\delta\leq1.0)$, $Li_{0.20}Ba_{0.60}MoO_{3-\delta}$ $(0\leq\delta\leq1.0)$, $Li_{0.20}Ba_{0.60}NbO_{3-\delta}$ $(0\leq\delta\leq1.0)$, $Li_{0.20}Ba_{0.60}TaO_{3-\delta}$ $(0\leq\delta\leq1.0)$, $Li_{0.20}Ba_{0.60}HfO_{3-\delta}$ $(0\leq\delta\leq1.0)$, $Li_{0.20}Ba_{0.60}BiO_{3-\delta}$ $(0\leq\delta\leq1.0)$, $Li_{0.25}Ba_{0.50}TiO_{3-\delta}$ $(0\leq\delta\leq1.0)$, $Li_{0.25}Ba_{0.50}MnO_{3-\delta}$ $(0\leq\delta\leq1.0)$, $Li_{0.25}Ba_{0.50}NiO_{3-\delta}$ $(0\leq\delta\leq1.0)$, $Li_{0.25}Ba_{0.50}CrO_{3-\delta}$ $(0\leq\delta\leq1.0)$, $Li_{0.25}Ba_{0.50}CoO_{3-\delta}$ $(0\leq\delta\leq1.0)$, $Li_{0.25}Ba_{0.50}IrO_{3-\delta}$ $(0\leq\delta\leq1.0)$, $Li_{0.25}Ba_{0.50}RuO_{3-\delta}$ $(0\leq\delta\leq1.0)$, $Li_{0.25}Ba_{0.50}FeO_{3-\delta}$ $(0\leq\delta\leq1.0)$, $Li_{0.25}Ba_{0.50}PdO_{3-\delta}$ $(0\leq\delta\leq1.0)$, $Li_{0.25}Ba_{0.50}PbO_{3-\delta}$ $(0\leq\delta\leq1.0)$, $Li_{0.25}Ba_{0.50}RhO_{3-\delta}$ $(0\leq\delta\leq1.0)$, $Li_{0.25}Ba_{0.50}SnO_{3-\delta}$ $(0\leq\delta\leq1.0)$, $Li_{0.25}Ba_{0.50}VO_{3-\delta}$ $(0\leq\delta\leq1.0)$, $Li_{0.25}Ba_{0.50}ReO_{3-\delta}$ $(0\leq\delta\leq1.0)$, $Li_{0.25}Ba_{0.50}GeO_{3-\delta}$ $(0\leq\delta\leq1.0)$, $Li_{0.25}Ba_{0.50}WO_{3-\delta}$ $(0\leq\delta\leq1.0)$, $Li_{0.25}Ba_{0.50}ZrO_{3-\delta}$ $(0\leq\delta\leq1.0)$, $Li_{0.25}Ba_{0.50}MoO_{3-\delta}$ $(0\leq\delta\leq1.0)$, $Li_{0.25}Ba_{0.50}NbO_{3-\delta}$ $(0\leq\delta\leq1.0)$, $Li_{0.25}Ba_{0.50}TaO_{3-\delta}$ $(0\leq\delta\leq1.0)$, $Li_{0.25}Ba_{0.50}HfO_{3}$, $Li_{0.25}Ba_{0.50}BiO_{3-\delta}$ $(0\leq\delta\leq1.0)$, $Li_{0.30}Ba_{0.40}TiO_{3-\delta}$ $(0\leq\delta\leq1.0)$, $Li_{0.30}Ba_{0.40}MnO_{3-\delta}$ $(0\leq\delta\leq1.0)$, $Li_{0.30}Ba_{0.40}NiO_{3-\delta}$ $(0\leq\delta\leq1.0)$, $Li_{0.30}Ba_{0.40}CrO_{3-\delta}$ $(0\leq\delta\leq1.0)$, $Li_{0.30}Ba_{0.40}CoO_{3-\delta}$ $(0\leq\delta\leq1.0)$, $Li_{0.30}Ba_{0.40}IrO_{3-\delta}$ $(0\leq\delta\leq1.0)$, $Li_{0.30}Ba_{0.40}RuO_{3-\delta}$ $(0\leq\delta\leq1.0)$, $Li_{0.30}Ba_{0.40}FeO_{3-\delta}$ $(0\leq\delta\leq1.0)$, $Li_{0.30}Ba_{0.40}PdO_{3-\delta}$ $(0\leq\delta\leq1.0)$, $Li_{0.30}Ba_{0.40}PbO_{3-\delta}$ $(0\leq\delta\leq1.0)$, $Li_{0.30}Ba_{0.40}RhO_{3-\delta}$ $(0\leq\delta\leq1.0)$, $Li_{0.30}Ba_{0.40}SnO_{3-\delta}$ $(0\leq\delta\leq1.0)$, $Li_{0.30}Ba_{0.40}VO_{3-\delta}$ $(0\leq\delta\leq1.0)$, $Li_{0.30}Ba_{0.40}ReO_{3-\delta}$ $(0\leq\delta\leq1.0)$, $Li_{0.30}Ba_{0.40}GeO_{3-\delta}$ $(0\leq\delta\leq1.0)$, $Li_{0.30}Ba_{0.40}WO_{3-\delta}$ $(0\leq\delta\leq1.0)$, $Li_{0.30}Ba_{0.40}ZrO_{3-\delta}$ $(0\leq\delta\leq1.0)$, $Li_{0.30}Ba_{0.40}MoO_{3-\delta}$ $(0\leq\delta\leq1.0)$, $Li_{0.30}Ba_{0.40}NbO_{3-\delta}$ $(0\leq\delta\leq1.0)$, $Li_{0.30}Ba_{0.40}TaO_{3-\delta}$ $(0\leq\delta\leq1.0)$, $Li_{0.30}Ba_{0.40}HfO_{3-\delta}$ $(0\leq\delta\leq1.0)$, $Li_{0.30}Ba_{0.40}BiO_{3-\delta}$ $(0\leq\delta\leq1.0)$, $Li_{0.40}Ba_{0.20}TiO_{3-\delta}$ $(0\leq\delta\leq1.0)$, $Li_{0.40}Ba_{0.20}MnO_{3-\delta}$ $(0\leq\delta\leq1.0)$, $Li_{0.40}Ba_{0.20}NiO_{3-\delta}$ $(0\leq\delta\leq1.0)$, $Li_{0.40}Ba_{0.20}CrO_{3-\delta}$ $(0\leq\delta\leq1.0)$, $Li_{0.40}Ba_{0.20}CoO_{3-\delta}$ $(0\leq\delta\leq1.0)$, $Li_{0.40}Ba_{0.20}IrO_{3-\delta}$ $(0\leq\delta\leq1.0)$, $Li_{0.40}Ba_{0.20}RuO_{3-\delta}$ $(0\leq\delta\leq1.0)$, $Li_{0.40}Ba_{0.20}FeO_{3-\delta}$ $(0\leq\delta\leq1.0)$, $Li_{0.40}Ba_{0.20}PdO_{3-\delta}$ $(0\leq\delta\leq1.0)$, $Li_{0.40}Ba_{0.20}PbO_{3-\delta}$ $(0\leq\delta\leq1.0)$, $Li_{0.40}Ba_{0.20}RhO_{3-\delta}$ $(0\leq\delta\leq1.0)$, $Li_{0.40}Ba_{0.20}SnO_{3-\delta}$ $(0\leq\delta\leq1.0)$, $Li_{0.40}Ba_{0.20}VO_{3-\delta}$ $(0\leq\delta\leq1.0)$, $Li_{0.40}Ba_{0.20}ReO_{3-\delta}$ $(0\leq\delta\leq1.0)$, $Li_{0.40}Ba_{0.20}GeO_{3-\delta}$ $(0\leq\delta\leq1.0)$, $Li_{0.40}Ba_{0.20}WO_{3-\delta}$ $(0\leq\delta\leq1.0)$, $Li_{0.40}Ba_{0.20}ZrO_{3-\delta}$ $(0\leq\delta\leq1.0)$, $Li_{0.40}Ba_{0.20}MoO_{3-\delta}$ $(0\leq\delta\leq1.0)$, $Li_{0.40}Ba_{0.20}NbO_{3-\delta}$ $(0\leq\delta\leq1.0)$, $Li_{0.40}Ba_{0.20}TaO_{3-\delta}$ $(0\leq\delta\leq1.0)$, $Li_{0.40}Ba_{0.20}HfO_{3-\delta}$ $(0\leq\delta\leq1.0)$, $Li_{0.40}Ba_{0.20}BiO_{3-\delta}$ $(0\leq\delta\leq1.0)$, $Li_{0.25}La_{0.50}TiO_{3-\delta}$ $(0\leq\delta\leq1.0)$, $Li_{0.25}La_{0.50}MnO_{3-\delta}$ $(0\leq\delta\leq1.0)$, $Li_{0.25}La_{0.50}NiO_{3-\delta}$ $(0\leq\delta\leq1.0)$, $Li_{0.25}La_{0.50}CrO_{3-\delta}$ $(0\leq\delta\leq1.0)$, $Li_{0.25}La_{0.50}CoO_{3-\delta}$ $(0\leq\delta\leq1.0)$, $Li_{0.25}La_{0.50}IrO_{3-\delta}$ $(0\leq\delta\leq1.0)$, $Li_{0.25}La_{0.50}RuO_{3-\delta}$ $(0\leq\delta\leq1.0)$, $Li_{0.25}La_{0.50}FeO_{3-\delta}$ $(0\leq\delta\leq1.0)$, $Li_{0.25}La_{0.50}PdO_{3-\delta}$ $(0\leq\delta\leq1.0)$, $Li_{0.25}La_{0.50}PbO_{3-\delta}$ $(0\leq\delta\leq1.0)$, $Li_{0.25}La_{0.50}RhO_{3-\delta}$ $(0\leq\delta\leq1.0)$, $Li_{0.25}La_{0.50}SnO_{3-\delta}$ $(0\leq\delta\leq1.0)$, $Li_{0.25}La_{0.50}VO_{3-\delta}$ $(0\leq\delta\leq1.0)$, $Li_{0.25}La_{0.50}ReO_{3-\delta}$ $(0\leq\delta\leq1.0)$, $Li_{0.25}La_{0.50}GeO_{3-\delta}$ $(0\leq\delta\leq1.0)$, $Li_{0.25}La_{0.50}WO_{3-\delta}$ $(0\leq\delta\leq1.0)$, $Li_{0.25}La_{0.50}ZrO_{3-\delta}$ $(0\leq\delta\leq1.0)$, $Li_{0.25}La_{0.50}MoO_{3-\delta}$ $(0\leq\delta\leq1.0)$, $Li_{0.25}La_{0.50}NbO_{3-\delta}$ $(0\leq\delta\leq1.0)$, $Li_{0.25}La_{0.50}TaO_{3-\delta}$ $(0\leq\delta\leq1.0)$, $Li_{0.25}La_{0.50}HfO_{3-\delta}$ $(0\leq\delta\leq1.0)$, $Li_{0.25}La_{0.50}BiO_{3-\delta}$ $(0\leq\delta\leq1.0)$, $Li_{0.05}La_{0.82}Ti_{0.70}O_{3-\delta}$ $(0\leq\delta\leq1.0)$, $Li_{0.05}La_{0.82}Mn_{0.70}O_{3-\delta}$ $(0\leq\delta\leq1.0)$, $Li_{0.10}La_{0.80}Mn_{0.70}O_{3-\delta}$ $(0\leq\delta\leq1.0)$, $Li_{0.20}La_{0.77}Mn_{0.70}O_{3-\delta}$ $(0\leq\delta\leq1.0)$, $Li_{0.05}La_{0.82}Nb_{0.70}O_{3-\delta}$ $(0\leq\delta\leq1.0)$, $Li_{0.10}La_{0.50}Nb_{0.70}O_{3-\delta}$ $(0\leq\delta\leq1.0)$, $Li_{0.20}La_{0.77}Nb_{0.70}O_{3-\delta}$ $(0\leq\delta\leq1.0)$, $Li_{0.05}La_{0.82}Ta_{0.70}O_{3-\delta}$ $(0\leq\delta\leq1.0)$, $Li_{0.10}La_{0.50}Ta_{0.70}O_{3-\delta}$ $(0\leq\delta\leq1.0)$, $Li_{0.20}La_{0.77}Ta_{0.70}O_{3-\delta}$ $(0\leq\delta\leq1.0)$, $Li_{0.05}La_{0.82}V_{0.70}O_{3-\delta}$ $(0\leq\delta\leq1.0)$, $Li_{0.10}La_{0.50}V_{0.70}O_{3-\delta}$ $(0\leq\delta\leq1.0)$, $Li_{0.20}La_{0.77}V_{0.70}O_{3-\delta}$ $(0\leq\delta\leq1.0)$, $Li_{0.05}La_{0.82}W_{0.70}O_{3-\delta}$ $(0\leq\delta\leq1.0)$, $Li_{0.10}La_{0.50}W_{0.70}O_{3-\delta}$ $(0\leq\delta\leq1.0)$, $Li_{0.20}La_{0.77}W_{0.70}O_{3-\delta}$ $(0\leq\delta\leq1.0)$, $Li_{0.05}La_{0.82}Mo_{0.70}O_{3-\delta}$ $(0\leq\delta\leq1.0)$, $Li_{0.10}La_{0.50}Mo_{0.70}O_{3-\delta}$ $(0\leq\delta\leq1.0)$, $Li_{0.20}La_{0.77}Mo_{0.70}O_{3-\delta}$ $(0\leq\delta\leq1.0)$, $Li_{0.05}La_{0.82}Bi_{0.70}O_{3-\delta}$ $(0\leq\delta\leq1.0)$, $Li_{0.10}La_{0.80}Bi_{0.70}O_{3-\delta}$ $(0\leq\delta\leq1.0)$, $Li_{0.20}La_{0.77}Bi_{0.70}O_{3-\delta}$ $(0\leq\delta\leq1.0)$, $Li_{0.05}La_{0.82}Cr_{0.70}O_{3-\delta}$ $(0\leq\delta\leq1.0)$, $Li_{0.10}La_{0.50}Cr_{0.70}O_{3-\delta}$ $(0\leq\delta\leq1.0)$, or $Li_{0.20}La_{0.77}Cr_{0.70}O_{3-\delta}$ $(0\leq\delta\leq1.0)$.

13. The cathode of claim 9, wherein the perovskite compound has an electronic conductivity of about $1\times10^{-6}$ siemens per centimeter to about $1\times10^{1}$ siemens per centimeter, and an ionic conductivity of about $2\times10^{-7}$ siemens per centimeter to about $1\times10^{1}$ siemens per centimeter, at 25° C.

14. The cathode of claim 2, wherein the lithium-containing metal oxide is electrochemically stable with respect to a lithium metal at a voltage of about 2.0 volts to about 4.0 volts.

15. A lithium-air battery comprising:
the cathode according to claim 1;
an anode comprising lithium; and
an electrolyte positioned between the cathode and the anode.

16. The lithium-air battery of claim 15, wherein the electrolyte comprises a solid electrolyte.

17. A cathode configured to use oxygen as a cathode active material, the cathode comprising:
a porous film comprising a metal oxide,
wherein the metal oxide is a lithium containing metal oxide represented by Formula 1, $$Li_xA_yG_zO_{3-\delta} \qquad \text{Formula 1}$$

wherein, in Formula 1,
A and G are each independently at least one of a Group 2 to a Group 16 element,
$0<x<1$, $0<y<1$, $0<x+y\leq 1$, $0<z\leq 1.5$, $\delta$ is an oxygen vacancy content, and $0\leq \delta \leq 1.5$, and
wherein an amount of an organic component in the porous film is 0 weight percent to about 2 weight percent, based on a total weight of the porous film, and
wherein the porous film is a self-standing film.

18. The cathode of claim 1, wherein the cathode does not include a carbon-based conductive material.

19. The cathode of claim 1, wherein the loading level of the porous film is 4.8 milligrams per square centimeter to 8 milligrams per square centimeter.

* * * * *